United States Patent
Steffens et al.

(10) Patent No.: US 11,187,138 B2
(45) Date of Patent: Nov. 30, 2021

(54) CONCRETE MIXER VEHICLE

(71) Applicant: Oshkosh Corporation, Oshkosh, WI (US)

(72) Inventors: Greg Steffens, Oshkosh, WI (US);
Jeremy Andringa, Oshkosh, WI (US);
Connor Hietpas, Oshkosh, WI (US);
Jesse Gander, Larsen, WI (US)

(73) Assignee: Oshkosh Corporation, Oshkosh, WI (US)

( * ) Notice: Subject to any disclaimer, the term of this patent is extended or adjusted under 35 U.S.C. 154(b) by 16 days.

(21) Appl. No.: 16/813,597

(22) Filed: Mar. 9, 2020

(65) Prior Publication Data

US 2020/0291846 A1 Sep. 17, 2020

Related U.S. Application Data

(60) Provisional application No. 62/817,375, filed on Mar. 12, 2019, provisional application No. 62/817,281, filed on Mar. 12, 2019, provisional application No. 62/817,276, filed on Mar. 12, 2019, provisional application No. 62/817,371, filed on Mar. 12, 2019.

(51) Int. Cl.

| *F01P 9/00* | (2006.01) |
| *F01P 5/06* | (2006.01) |
| *F01P 1/00* | (2006.01) |
| *F01P 11/10* | (2006.01) |
| *B62D 25/12* | (2006.01) |
| *B60P 3/16* | (2006.01) |

(52) U.S. Cl.
CPC ................ *F01P 5/06* (2013.01); *B62D 25/12* (2013.01); *F01P 1/00* (2013.01); *F01P 11/10* (2013.01); *B60P 3/16* (2013.01); *F01P 2001/005* (2013.01)

(58) Field of Classification Search
CPC ..... F01P 1/02; F01P 5/06; F01P 11/10; A01D 34/74; A01D 34/001; A01D 34/667; A01D 75/18; B60K 13/02; B60K 13/06; B60K 11/04; F02M 35/48; F02M 35/161; F02M 35/10013; F02M 35/10091
See application file for complete search history.

(56) References Cited

U.S. PATENT DOCUMENTS

| 4,598,786 | A | * | 7/1986 | Kirchweger | ........... | B60K 11/08 180/68.1 |
| 6,520,494 | B1 | | 2/2003 | Andersen et al. | | |
| 6,779,806 | B1 | | 8/2004 | Breitbach et al. | | |
| 9,045,014 | B1 | | 6/2015 | Verhoff et al. | | |
| 9,656,640 | B1 | | 5/2017 | Verhoff et al. | | |

(Continued)

*Primary Examiner* — John Kwon
(74) *Attorney, Agent, or Firm* — Foley & Lardner LLP

(57) ABSTRACT

An engine module for a mixer vehicle includes an engine, a cooling system, and a hood. The cooling system includes a radiator fluidly coupled to the engine and a fan assembly. The fan assembly includes a fan. The hood includes a housing and a door. The housing has a first end configured to be positioned proximate a mixer drum assembly and a second end configured to be positioned proximate a rear end of a chassis of the mixer vehicle. The housing defines an internal cavity within which the engine and the cooling system is disposed. The first end defines an inlet airflow cavity having a bottom surface and an air inlet. The second end defines an opening. The door is pivotally coupled to the second end and positioned to selectively enclose the opening.

11 Claims, 41 Drawing Sheets

(56) References Cited

U.S. PATENT DOCUMENTS

| | | |
|---|---|---|
| D837,702 S | 1/2019 | Gander et al. |
| D843,281 S | 3/2019 | Gander et al. |
| D856,860 S | 8/2019 | Gander |
| D860,887 S | 9/2019 | Gander et al. |
| D863,144 S | 10/2019 | Gander |
| D864,031 S | 10/2019 | Gander et al. |
| D869,332 S | 12/2019 | Gander et al. |
| D871,283 S | 12/2019 | Gander et al. |
| D888,629 S | 6/2020 | Gander et al. |
| D892,002 S | 8/2020 | Gander |
| 2004/0245039 A1 | 12/2004 | Braun et al. |
| 2006/0192361 A1 | 8/2006 | Anderson et al. |
| 2006/0249325 A1 | 11/2006 | Braun et al. |
| 2015/0151651 A1 | 6/2015 | Stingle et al. |
| 2016/0031486 A1* | 2/2016 | Shoen ............... B60K 11/04 180/68.3 |
| 2017/0218832 A1* | 8/2017 | Kurokawa ........... F02M 35/164 |
| 2017/0253221 A1 | 9/2017 | Verhoff et al. |
| 2018/0235150 A1* | 8/2018 | Nogami ................ A01D 75/18 |
| 2019/0185077 A1 | 6/2019 | Smith et al. |
| 2019/0351883 A1 | 11/2019 | Verhoff et al. |
| 2019/0382005 A1* | 12/2019 | Nishi ................ B60W 30/09 |
| 2021/0094619 A1* | 4/2021 | Masuda ................ B62D 25/12 |

\* cited by examiner ual Patent Application No. 62/817,375, filed Mar. 12, 2019, all of which are incorporated herein by reference in their entireties.

CONCRETE MIXER VEHICLE

CROSS-REFERENCE TO RELATED PATENT APPLICATION

This application claims the benefit of U.S. Provisional Patent Application No. 62/817,276, filed Mar. 12, 2019, U.S. Provisional Patent Application No. 62/817,281, filed Mar. 12, 2019, U.S. Provisional Patent Application No. 62/817,371, filed Mar. 12, 2019, and U.S. Provisional Patent Application No. 62/817,375, filed Mar. 12, 2019, all of which are incorporated herein by reference in their entireties.

BACKGROUND

Concrete mixer vehicles are configured to receive, mix, and transport wet concrete or a combination of ingredients that when mixed form wet concrete to a job site. Concrete mixer vehicles include a rotatable mixing drum that receives concrete poured from vehicles or from stationary facilities, such as concrete mixing plants, and mixes the concrete disposed therein. Concrete mixer vehicles may be front discharge concrete mixer vehicles or rear discharge concrete mixer vehicles, which dispense concrete from the front or rear thereof, respectively. Rear discharge concrete mixer vehicles generally feature a drum with an outlet positioned at an aft end and a cab enclosure positioned at a fore end of the concrete mixer truck. Front discharge concrete mixer vehicles include a drum with an outlet supported above the cab enclosure of the concrete mixer vehicle to discharge concrete through a chute extending forward the concrete mixer vehicle. Because front discharge concrete mixer vehicles discharge concrete at the fore end, they can be used to supply concrete to locations having limited access. Concrete mixer vehicles are typically driven by an onboard internal combustion engine.

SUMMARY

One embodiment relates to a concrete mixer vehicle. The concrete mixer vehicle includes a chassis having a front end and a rear end, a cab coupled to the front end of the chassis, a mixer drum assembly coupled to the chassis and positioned rearward of the cab, and an engine module coupled to the chassis and positioned rearward of the mixer drum assembly proximate the rear end of the chassis. The engine module includes an engine, a cooling system, and a hood. The cooling system is positioned rearward of the engine. The cooling system includes a radiator fluidly coupled to the engine and a fan assembly positioned rearward of the radiator. The fan assembly includes a fan. The hood includes an external housing and a door. The external housing has a first end positioned proximate the mixer drum assembly, an opposing second end positioned proximate the rear end of the chassis, and a top surface. The external housing defines an internal cavity within which the engine and the cooling system are disposed. The first end of the external housing defines an inlet airflow cavity having a bottom surface and an air inlet positioned between the top surface and the bottom surface. The air inlet connects the inlet airflow cavity to the internal cavity. The opposing second end of the external housing defines an opening. The door is pivotally coupled to the opposing second end of the external housing and positioned to selectively enclose the opening.

Another embodiment relates to an engine module for a concrete mixer vehicle. The engine module includes an engine, a cooling system positioned rearward of the engine, and a hood. The cooling system includes a radiator fluidly coupled to the engine and a fan assembly positioned rearward of the radiator. The fan assembly includes a fan. The hood includes an external housing and a door. The external housing has a first end, an opposing second end positioned, and a top surface. The external housing defines an internal cavity within which the engine and the cooling system are disposed. The first end of the external housing defines an inlet airflow cavity having a bottom surface and an air inlet positioned between the top surface and the bottom surface. The air inlet connects the inlet airflow cavity to the internal cavity. The opposing second end of the external housing defines an opening. The door is pivotally coupled to the opposing second end of the external housing and positioned to selectively enclose the opening.

Still another embodiment relates to a hood for an engine module of a concrete mixer vehicle. The hood includes an external housing, a diving fin, a divider, a door, and a conical-shaped housing. The external housing has a first end, an opposing second end positioned, and a top surface. The external housing defines an internal cavity. The first end of the external housing defines an inlet airflow cavity having a bottom surface and an air inlet positioned between the top surface and the bottom surface. The air inlet connects the inlet airflow cavity to the internal cavity. The top surface of the external housing at least partially overhangs the inlet airflow cavity, extending forward past the air inlet. The bottom surface of the inlet airflow cavity is sloped such that an end of the bottom surface positioned proximate the first end of the external housing is lower than an opposing end of the bottom surface positioned proximate the air inlet. The opposing second end of the external housing defines an opening. The dividing fin (i) extends between the bottom surface and the top surface and (ii) separates the air inlet into a first air inlet and a second air inlet. The divider extends upward from the bottom surface of the inlet airflow cavity. The divider separates the inlet airflow cavity into a first airflow channel and a second airflow channel. The divider defines an air intake chamber and a third air inlet positioned proximate the first end of the external housing. The divider includes a curved protrusion extending from sidewalls of the divider and around an end of the divider opposite the third air inlet. The door is pivotally coupled to the opposing second end of the external housing and positioned to selectively enclose the opening. The door defines an air outlet positioned to permit air to flow out the opposing second end of the external housing. The conical-shaped housing extends from an interior side of the door. The conical-shaped housing is configured to diffuse the air flowing out of the air outlet.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
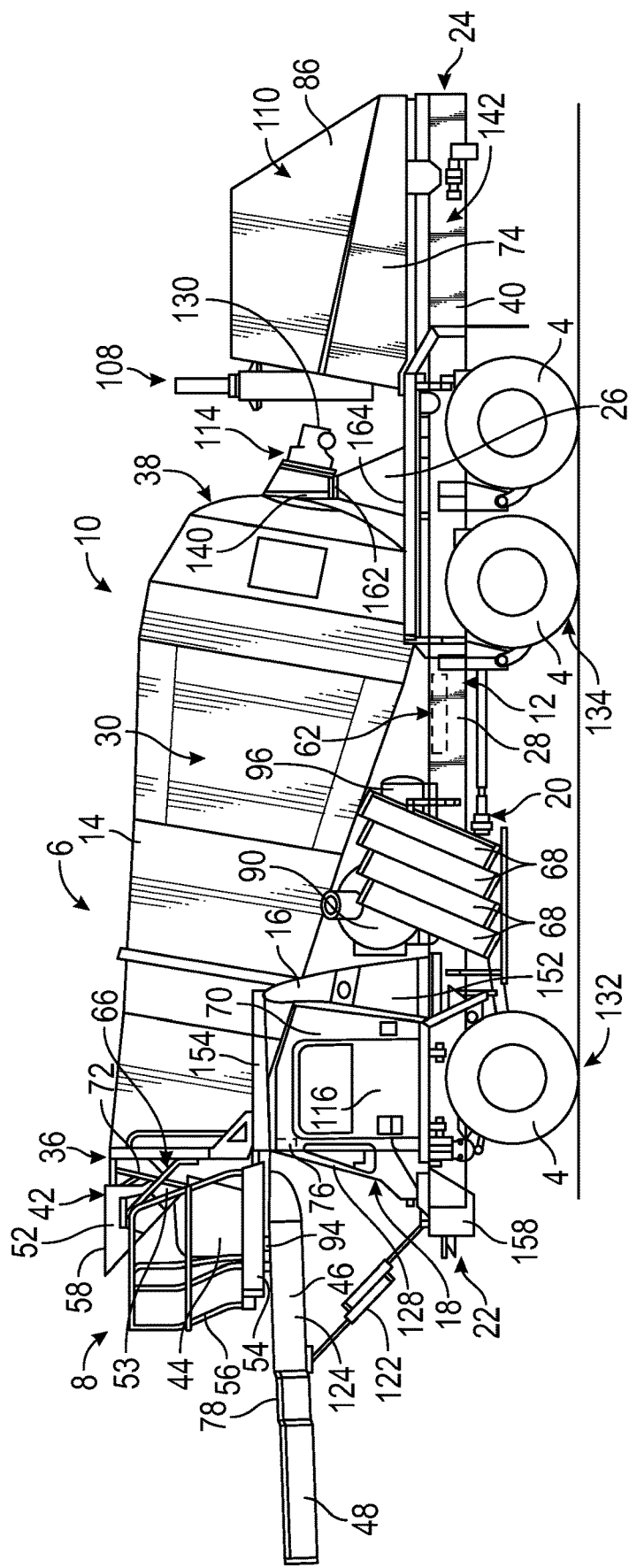
FIG. 1 is a side view of a concrete mixer truck, according to an exemplary embodiment.
Figure 2:
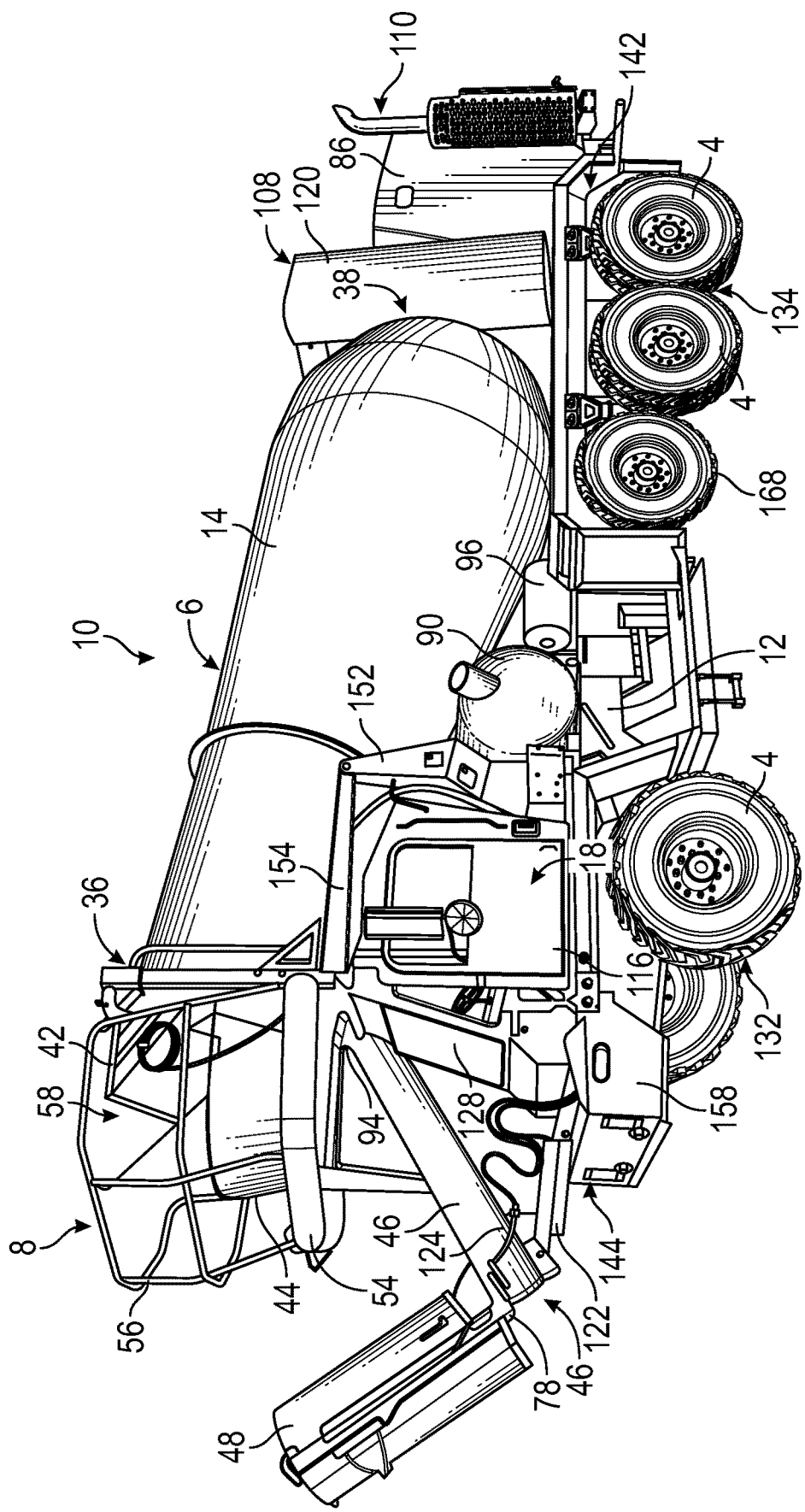
FIG. 2 is a front perspective view of the concrete mixer truck of FIG. 1, according to an exemplary embodiment.
Figure 3:
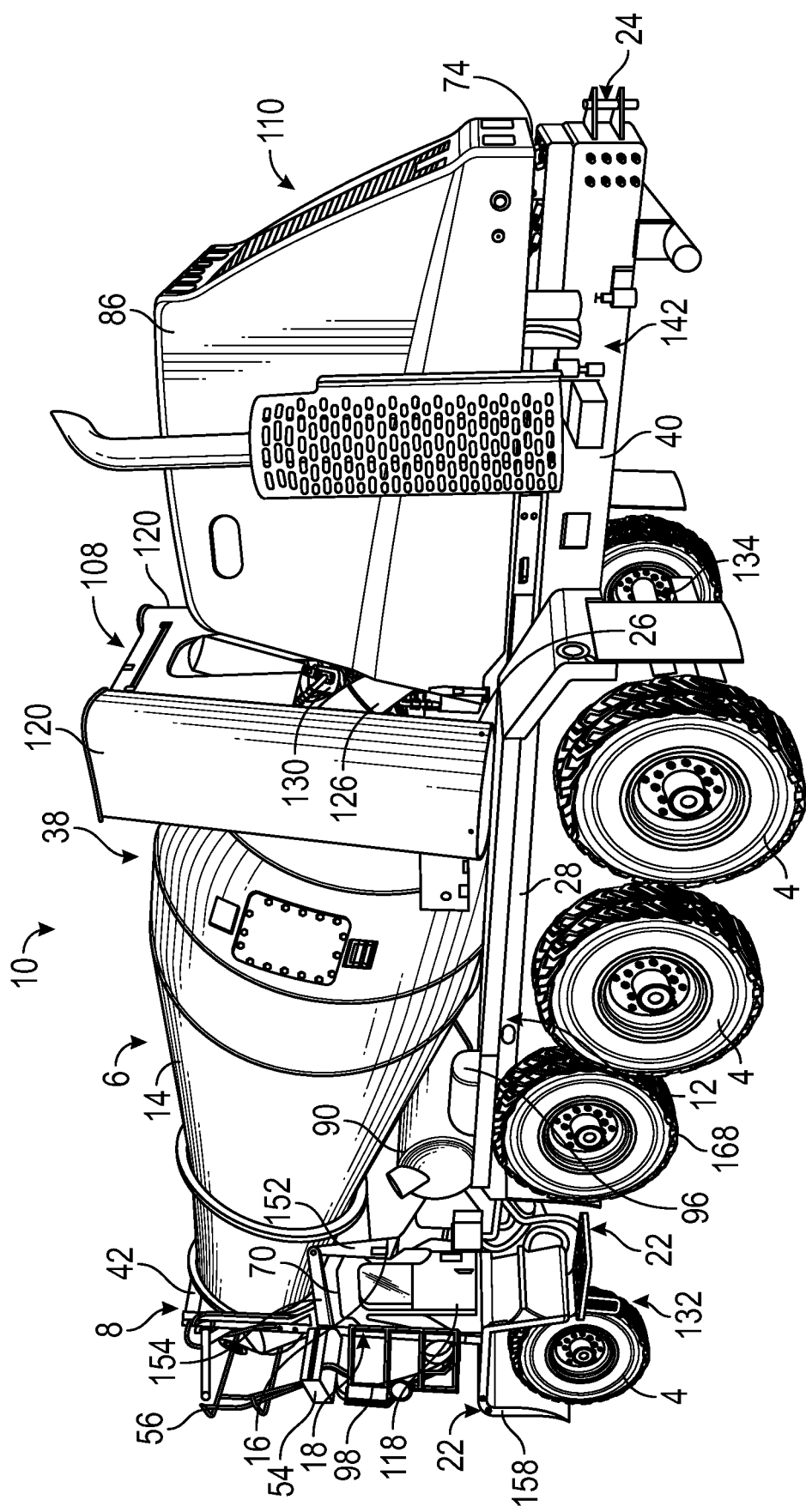
FIG. 3 is a rear perspective view of the concrete mixer truck of FIG. 1, according to an exemplary embodiment.

According to the exemplary embodiment shown in FIGS. 1-3, a vehicle, shown as concrete mixer truck 10, is configured to transport concrete from a loading location (e.g., a batching plant, etc.) to a point of use (e.g., a worksite, a construction site, etc.). In some embodiments, as shown in FIGS. 1-3, the concrete mixer truck 10 is a front discharge concrete mixer vehicle. In other embodiments, the concrete mixer truck 10 is a rear discharge concrete mixer vehicle. The concrete mixer truck 10 includes a chassis 12, a drum assembly 6, a hopper assembly 8, a drive system 20, a fuel system 108, and an engine module 110. The concrete mixer truck 10 may include various additional engine, transmission, drive, electronic, tractive assembly, braking, steering and/or suspension systems, and hydraulic systems that are configured to support the various components of the concrete mixer truck 10. Generally, the chassis 12 supports a mixing drum 14 of the drum assembly 6, a front pedestal 16, a rear pedestal 26, a cab 18, and the engine module 110. Each of the chassis 12, the drum assembly 6, the hopper assembly 8, the drive system 20, the fuel system 108, and the engine module 110 are configured to facilitate receiving, mixing, transporting, and delivering concrete to a job site via the concrete mixer truck 10.

The chassis 12 includes a frame 28 that extends from a front end 22 to a rear end 24 of the concrete mixer truck 10. Wheels 4 are coupled to the frame 28 and moveably support the frame 28 above a ground surface or road. The wheels 4 may be replaced by other ground engaging motive members, such as tracks. In some embodiments, the chassis 12 includes hydraulic components (e.g., valves, filters, pipes, hoses, etc.) coupled thereto that facilitate operation and control of a hydraulic circuit including a drum drive pump and/or an accessory pump. The frame 28 provides a structural base for supporting the mixing drum 14, the front pedestal 16, the rear pedestal 26, the cab 18, and the engine module 110. In some embodiments, the frame 28 includes a widened front portion that extends over and about the wheels 4 positioned at the front end 22 of the chassis 12 to simultaneously support the cab 18 and serve as a fender for the wheels 4 positioned at the front end 22 of the chassis 12. The frame 28 may include lift eyes or other structures that facilitates lifting along the chassis 12 such that the chassis 12 can be manipulated as a subassembly for assembly and/or maintenance of the concrete mixer truck 10. One or more components may be coupled to the chassis 12 using isolating mounts made of a complaint material, such as rubber. The isolating mounts may be configured to reduce the transfer of vibrations between the components and the chassis 12.

The frame 28 includes a pair of frame rails 40 coupled with intermediate cross members, according to an exemplary embodiment. The frame rails 40 extend in a generally-horizontal and longitudinal direction (e.g., extend within 10 degrees of perpendicular relative to a vertical direction, extend within ten degrees of parallel relative to a ground surface when concrete mixer truck 10 is positioned on flat ground, etc.) between the front end 22 and the rear end 24. The frame rails 40 may be elongated "C-channels" or tubular members, according to various exemplary embodiments. In other embodiments, the frame rails 40 include another type of structural element (e.g., monocoque, a hull, etc.). In still other embodiments, the frame rails 40 include a combination of elongated C-channels, tubular members, a monocoque element, and/or a hull element. A first frame rail 41 of the frame rails 40 may be disposed along a first lateral side 142 and a second frame rail 43 of the frame rails 40 may be disposed along a second lateral side 144, respectively, of the concrete mixer truck 10. By way of example, the first lateral side 142 of the chassis 12 may be the left side of the concrete mixer truck 10 (e.g., when an operator is sitting in the cab 18 and positioned to drive the concrete mixer truck 10, etc.) and the second lateral side 144 of the chassis 12 may be the right side of the concrete mixer truck 10 (e.g., when an operator is sitting in the cab 18 and positioned to drive the concrete mixer truck 10, etc.).

The cab 18 is coupled to the frame rails 40 proximate the front end 22 of the chassis 12. According to various embodiments, the cab 18 (e.g., operator cabin, front cabin, etc.) is configured to house one or more operators during operation of the concrete mixer truck 10 (e.g., when driving, when dispensing concrete, etc.), and may include various components that facilitate operation and occupancy of the concrete mixer truck 10 (e.g., one or more seats, a steering wheel, control panels, screens, joysticks, buttons, accelerator, brake, gear lever, etc.). The cab 18 includes a housing 70 that forms the structure of the cab 18. At least one door 116 is affixed to the housing 70 to allow an operator to enter and exit the cab 18. A windshield 128 is disposed along a front side of the housing 70, near the front end 22, and above a front bumper 158 of the concrete mixer truck 10. The windshield 128 is configured to provide visibility to the operator while driving the concrete mixer truck 10, operating a main chute 46, and completing other tasks. The front bumper 158 may be affixed to a bottom portion of the housing 70. In some embodiments, the front bumper 158 is affixed to the frame 28 at the front end 22 of the concrete mixer truck 10.

A control assembly 76 is disposed within the cab 18 and is configured to control one or more components of the concrete mixer truck 10. The control assembly 76 may include controls, buttons, joysticks, and other features that control the movement and orientation of the concrete mixer truck 10, the hopper assembly 8, the main chute 46, a charge hopper 42, a discharge hopper 44, the mixing drum 14, and/or other components of the concrete mixer truck 10. For example, the control assembly 76 may include overhead controls (e.g., in a forward overhead position) that allow an occupant of the cab 18 to toggle a switch from a 'Close' position to an 'Open' position to open and close the charge hopper 42 and/or the discharge hopper 44. In some embodiments, the control assembly 76 includes a user interface with a display and an operator input. The display may be configured to display a graphical user interface, an image, an icon, or still other information. In one embodiment, the display includes a graphical user interface configured to provide general information about the concrete mixer truck 10 (e.g., vehicle speed, fuel level, warning lights, etc.). The graphical user interface may also be configured to display a current mode of operation, various potential modes of operation, or still other information relating to a transmission, modules, the drive system 20, and/or other components of the concrete mixer truck 10.

An air tank 96 is coupled to and supported by the chassis 12 and positioned directly beneath the mixing drum 14. The air tank 96 is configured to store compressed air (e.g., for use in an air brake system, for use when raising and lowering a pusher axle assembly, etc.). A water tank 90 extends laterally across the length of the chassis 12, forward of the air tank 96. The water tank 90 is coupled to the frame rails 40 and positioned beneath the mixing drum 14. The water tank 90 may be used to supply water to wash the concrete mixer truck 10 after pouring a concrete load and/or to add water to the concrete within the mixing drum 14 at the construction site and/or during transit, among other uses.

The drum assembly 6 is configured to store, mix and dispense concrete. The drum assembly 6 includes the mixing drum 14, a drum driver 114, and the hopper assembly 8. The mixing drum 14 extends longitudinally along a majority of the length of concrete mixer truck 10 and may be angled relative to the frame rails 40 (e.g., when viewed from the side of concrete mixer truck 10). The mixing drum 14 has a first end 36 that is positioned toward the front end 22 of the concrete mixer truck 10 and coupled to the front pedestal 16 (e.g., support post, support column, etc.). The first end 36 may at least partially extend over the cab 18. The first end 36 defines a drum opening 72 in communication with the hopper assembly 8 through which concrete may flow (e.g., between the charge hopper 42, the mixing drum 14, the discharge hopper 44, the main chute 46, and extension chutes 48, etc.). The mixing drum 14 has a second end 38 that is positioned toward the rear end 24 of the concrete mixer truck 10 and coupled to the rear pedestal 26 (e.g., support post, support column, etc.). The mixing drum 14 may be rotatably coupled to front pedestal 16 (e.g., with a plurality of wheels or rollers, etc.) and rear pedestal 26 (e.g., with a drum drive transmission, etc.). Each of the front pedestal 16 and the rear pedestal 26 may be a part of a superstructure of the concrete mixer truck 10. The superstructure further includes the frame 28 and the chassis 12. In other embodiments, the mixing drum 14 is otherwise coupled to the frame rails 40. Although the concrete mixer truck 10 illustrated in FIGS. 1-3 is a front discharge concrete mixer vehicle, it is to be understood that in other embodiments the concrete mixer truck 10 may include a drum assembly 6 having any other discharge arrangement (e.g., rear discharge).

The front pedestal 16 includes an upper portion 152 and a lower portion 154. The upper portion 152 is coupled to and supports the hopper assembly 8. The lower portion 154 is coupled to the frame rails 40 and supports the upper portion 152 of the front pedestal 16 and the first end 36 of the mixing drum 14. The rear pedestal 26 includes an upper portion 162 and a lower portion 164. The lower portion 164 is coupled to the frame rails 40 and supports the upper portion 162. The upper portion 162 supports a bottom interface of a drum drive transmission 140 (e.g., a bottom portion of the housing thereof) and/or the second end 38 of the mixing drum 14. In some embodiments, the rear pedestal 26 includes a pair of legs extending between the frame rails 40 and the drum drive transmission 140.

The drum opening 72 at the first end 36 of the mixing drum 14 is configured to receive a mixture, such as a concrete mixture, or mixture ingredients (e.g., cementitious material, aggregate, sand, etc.) such that the mixture can enter and exit an internal volume 30 of the mixing drum 14. The mixing drum 14 may include a mixing element (e.g., fins, etc.) positioned within the internal volume 30. The mixing element may be configured to (i) agitate the contents of mixture within the mixing drum 14 when the mixing drum 14 is rotated in a first direction (e.g., counterclockwise, clockwise, etc.) and (ii) drive the mixture within the mixing drum 14 out through the drum opening 72 when the mixing drum 14 is rotated in an opposing second direction (e.g., clockwise, counterclockwise, etc.). During operation of the concrete mixer truck 10, the mixing elements of the mixing drum 14 are configured to agitate the contents of a mixture located within the internal volume 30 of the mixing drum 14 as the mixing drum 14 is rotated in a counterclockwise and/or a clockwise direction by the drum driver 114.

The drum driver 114 is configured to provide an input (e.g., a torque, etc.) to the mixing drum 14 to rotate the mixing drum 14 relative to the chassis 12. The drum driver 114 may be configured to selectively rotate the mixing drum 14 clockwise or counterclockwise, depending on the mode of operation of the concrete mixer truck 10 (i.e., whether concrete is being mixed or dispensed). The drum driver 114 is coupled to a rear or base portion of the second end 38 of the mixing drum 14 and a top end of the lower portion 164 and/or a lower end of the upper portion 162 of the rear pedestal 26. The drum driver 114 includes a transmission, shown as drum drive transmission 140, and a driver, shown as drum drive motor 130, coupled to drum drive transmission 140. The drum drive transmission 140 extends rearward (e.g., toward the rear end 24 of the concrete mixer truck 10, toward the engine module 110, etc.) from the second end 38 of mixing drum 14 and the drum drive motor 130 extends rearward from drum drive transmission 140. In some embodiments, the drum drive motor 130 is a hydraulic motor. In other embodiments, the drum drive motor 130 is another type of actuator (e.g., an electric motor, etc.). The drum drive motor 130 is configured to provide an output torque to the drum drive transmission 140, according to an exemplary embodiment, which rotates the mixing drum 14 about a rotation axis. The drum drive transmission 140 may include a plurality of gears (e.g., a planetary gear reduction set, etc.) configured to increase the turning torque applied to the mixing drum 14, according to an exemplary embodiment. The plurality of gears may be disposed within a housing. In some embodiments, a drum drive pump and/or accessory pump may be configured to receive rotational mechanical energy and output a flow of pressurized hydraulic fluid to drive one or more components of the concrete mixer truck 10.

The hopper assembly 8 is positioned at the drum opening 72 of the mixing drum 14. The hopper assembly 8 is configured to introduce materials into and allow the materials to flow out of the internal volume 30 of the mixing drum 14 of the concrete mixer truck 10. The hopper assembly 8 is configured to prevent loss of material or spillage when the material enters and exits the mixing drum 14. The hopper assembly 8 includes the charge hopper 42, the discharge hopper 44, a hopper actuator 66, a platform 54, and the main chute 46, which are positioned above at least partially forward of the cab 18 of the concrete mixer truck 10. The charge hopper 42 is configured to direct the materials (e.g., cement precursor materials, etc.) into the drum opening 72 of the mixing drum 14. The discharge hopper 44 is configured to dispense mixed concrete from the internal volume 30 of the mixing drum 14 to the main chute 46 and, ultimately, the desired location.

The platform 54 includes a perforated surface that surrounds the charge hopper 42 and the discharge hopper 44. In some embodiments, the platform 54 includes an asymmetric base. The platform 54 includes platform sides extending beneath the perforated surface. A guardrail 56 is coupled to the platform 54 and follows the contour of a periphery of the platform 54. The platform 54 is situated at a position near the drum opening 72 of the mixing drum 14 to facilitate access by the operator to the drum opening 72, the internal volume 30, the charge hopper 42, the discharge hopper 44, and/or the main chute 46. In some embodiments, the concrete mixer truck 10 includes a ladder 98 that extends downward from a side of the platform 54 to allow an operator to climb and reach the platform 54.

The charge hopper 42 includes a first portion 52 that is configured to receive materials during a charging/loading operation. The first portion 52 has a rim 58 (e.g., opening) formed at a free end of the first portion 52. The charge hopper 42 includes a second portion 53 aligned with the bottom of the first portion 52. According to an exemplary embodiment, the charge hopper 42 is selectively repositionable/movable. In some embodiments, the charge hopper 42 is configured to rotate about a horizontal, lateral axis. In some embodiments, the charge hopper 42 is configured to raise and lower vertically. Specifically, the charge hopper 42 is configured to lift, pivot, or otherwise move between a first position (e.g., a lowered position, loading position, a charging position, etc.) and a second position (e.g., a raised position, a dispensing position, a pivoted position, etc.) above or shifted from the first position. In the first position, the charge hopper 42 is configured to direct material (e.g., concrete, etc.) from a source positioned above the concrete mixer truck 10 (e.g., a batch plant, etc.) through the drum opening 72 and into the internal volume 30 of the mixing drum 14. The first position may also facilitate transport of the concrete mixer truck 10 by lowering the overall height of the concrete mixer truck 10. In the second position, the charge hopper 42 moves (e.g., lifts, pivots, etc.) away from the drum opening 72 and facilitates material flowing unobstructed out of the drum opening 72 and into the discharge hopper 44 and the main chute 46.

A hopper actuator 66 is positioned to move the charge hopper 42 between the first position and the second position. The hopper actuator 66 facilitates selectively controlling movement of the charge hopper 42 between the first position and the second position. The hopper actuator 66 is coupled to and extends between the charge hopper 42 and the platform 54. In some embodiments, the hopper actuator 66 is a hydraulic cylinder. In other embodiments, the hopper actuator 66 is another type of actuators (e.g., a pneumatic cylinder, a lead screw driven by an electric motor, an electric motor, etc.).

When receiving the material, the charge hopper 42 may be in the first position and the main chute 46 may be in a first configuration (e.g., a transport configuration, a stored configuration, etc.). Accordingly, material can be deposited into the charge hopper 42, and the charge hopper 42 directs the material into the internal volume 30 of the mixing drum 14 through the drum opening 72. While material is being added to the mixing drum 14, the drum driver 114 may be operated to drive the mixing drum 14 to agitate the material and facilitate fully loading/packing the mixing drum 14. Alternatively, the mixing drum 14 may be stationary while material is added to the mixing drum 14. When discharging and the charge hopper 42 is in the second position, the discharge hopper 44 funnels material from the mixing drum 14 into the main chute 46.

The main chute 46 functions as an outlet of the mixing drum 14 and is used to direct concrete dispensed from the internal volume 30 of the mixing drum 14 and through the discharge hopper 44 to a target location near the concrete mixer truck 10. The main chute 46 is pivotally coupled to the platform 54 and/or the discharge hopper 44 such that the main chute 46 is configured to rotate about both a vertical axis and a horizontal axis. The main chute 46 includes a base section 124 that may be pivotally coupled to the platform 54 and/or the discharge hopper 44. An extension chute 48 (e.g., a folding section, a second chute section, etc.) is pivotally coupled to the distal end of the base section 124. In some embodiments, a plurality of extension chutes 48 are pivotally connected to one another. One or more removable/detachable extension chutes 68 may be selectively coupled to the distal end of the extension chute 48. The main chute 46 is selectively reconfigurable between a first configuration (e.g., a storage configuration, a transport configuration, etc.) and a second configuration (e.g., a use configuration, a dispensing configuration, etc.). In the first configuration, (i) the base section 124 may be selectively oriented substantially horizontal and extending laterally outward, (ii) the extension chute 48 may be selectively pivoted relative to the base section 124 and extending substantially vertically, and (iii) the removable extension chutes 68 may be removed from the extension chute 48 and stored elsewhere in the concrete mixer truck 10 (e.g., coupled to the chassis 12 beneath the mixing drum 14, etc.). In the first configuration, the main chute 46 may, therefore, minimally obscure the view of an operator positioned within the cab 18. In the second configuration, (i) the extension chute 48 may be pivoted relative to the base section 124 from the substantially vertical orientation to a substantially horizontal orientation such that the base section 124 and the extension chute 48 are aligned with one another to form a continuous path through which material can flow, and (ii) one or more of the removable extension chutes 68 may be coupled to the distal end of the extension chute 48 to increase the length of the main chute 46 (e.g., to distribute concrete further away from the concrete mixer truck 10, etc.).

A first chute actuator 122 (e.g., a chute raising/lowering actuator, etc.) is coupled to and extends between the main chute 46 (e.g., a distal end thereof, etc.) and the chassis 12. In some embodiments, the first chute actuator 122 is extends between the main chute 46 and the front bumper 158. The first chute actuator 122 is configured to raise and lower the main chute 46 to control the orientation of the main chute 46 relative to a horizontal plane (e.g., the ground, etc.). In some embodiments, the first chute actuator 122 is a pair of opposing hydraulic cylinders. In other embodiments, the first chute actuator 122 is another type of actuator (e.g., a pneumatic cylinder, a lead screw driven by an electric motor, a single hydraulic cylinder, etc.). In some embodiments, the first chute actuator 122 and the main chute 46 are both configured to rotate about the same or substantially the same vertical axis (e.g., as the main chute 46 is pivoted about the vertical axis as described in more detail herein).

A second chute actuator 94 (e.g., a chute pivot/rotation actuator, etc.) is coupled to the base section 124 of the main chute 46 and the platform 54. The second chute actuator 94 is configured to rotate the main chute 46 about a vertical axis. The second chute actuator 94 is configured to move the distal end of the main chute 46 through an arc along the left, front, and right sides of the chassis 12 (e.g., a 150 degree arc, a 180 degree arc, a 210 degree arc, etc.). In one embodiment, the second chute actuator 94 is a hydraulic motor. In other embodiments, the second chute actuator 94 is another type of actuator (e.g., a pneumatic motor, an electric motor, etc.).

A third chute actuator 78 (e.g., a chute folding/unfolding actuator, etc.) is configured to reposition (e.g., extend and retract, fold and unfold, etc.) the extension chute 48 relative to the base section 124 of the main chute 46. The third chute actuators 78 may be coupled to and extend between the base section 124 and the extension chute 48. In some embodiments, the third chute actuator 78 includes a plurality of actuators positioned to reposition a first extension chute 48 relative to the base section 124 and one or more second extension chutes 48 relative to the first extension chute 48.

The first chute actuator 122, the second chute actuator 94, and the third chute actuator 78 facilitate selectively reconfiguring the main chute 46 between the first configuration and the second configuration. In some embodiments, a controller (e.g., joystick) is configured to facilitate providing commands to control operation of the first chute actuator 122, the second chute actuator 94, and the third chute actuator 78 to direct the main chute 46 and concrete flow therefrom. In some embodiments, a hopper pump may be coupled to the chassis 12 and configured to provide pressurized hydraulic fluid to power the first chute actuator 122, the second chute actuator 94, and/or the third chute actuator 78. The hopper pump may be a variable displacement pump or a fixed displacement pump. Additionally or alternatively, a pneumatic pump and/or an electrical storage and/or generation device is used to power one or more of the first chute actuator 122, the second chute actuator 94, and/or the third chute actuator 78.

Once at the job site, the concrete mixer truck 10 may be configured to dispense the material to a desired location (e.g., into a form, onto the ground, etc.). The charge hopper 42 may be repositioned into the second position from the first position by the hopper actuator 66. The extension chute(s) 48 may be extended by the third chute actuator(s) 78 to reconfigure the main chute 46 into the second configuration from the first configuration. An operator can then couple one or more removable extension chutes 68 to the distal end of the extension chute 48 to increase the overall length of the main chute 46 (as necessary). Once the main chute 46 is in the second configuration, the operator can control the first chute actuator 122 and/or the second chute actuator 94 to adjust the orientation of the main chute 46 (e.g., about a vertical axis, about a lateral axis, etc.) and thereby direct the material onto the desired location. Once the main chute 46 is in the desired orientation, the operator can control the drum driver 114 to rotate the mixing drum 14 in the second direction, expelling the material through the drum opening 72, into the discharge hopper 44, and into the main chute 46. The operator may control the speed of the mixing drum 14 to adjust the rate at which the material is delivered through the main chute 46. Throughout the process of dispensing the material, the operator can change the location onto which the material is dispensed by varying the orientation of the main chute 46 and/or by controlling the drive system 20 to propel/move the concrete mixer truck 10.

The drive system 20 is configured to propel the concrete mixer truck 10 and may drive other systems of the concrete mixer truck 10 (e.g., the drum driver 114, etc.). The drive system 20 includes driven tractive assemblies that include a front axle assembly 132 and a pair of rear axle assemblies 134, each coupled to various wheels 4. In some embodiments, the drive system 20 includes a driveshaft coupled to the front axle assembly 132 and/or the rear axle assemblies 134. The front axle assembly 132 and the rear axle assemblies 134 are coupled to the power plant module 62 through the drive system 20 such that the front axle assembly 132 and the rear axle assemblies 134 at least selectively receive mechanical energy (e.g., rotational mechanical energy) and propel the concrete mixer truck 10. In some embodiments, a pusher axle assembly 168 (e.g., tag axle assembly, etc.) is configured to be raised and lowered to selectively engage the support surface (e.g., based on the loading of the concrete mixer truck 10, etc.). Such a configuration distributes the pressure exerted on the ground by the concrete mixer truck 10, which may be required, for example, when traveling through certain municipalities under load.

The power plant module 62 (e.g., prime mover module, driver module, etc.) is configured to supply rotational mechanical energy to drive the concrete mixer truck 10. The power plant module 62 is coupled to the chassis 12 and positioned near the longitudinal center of the concrete mixer truck 10, beneath the mixing drum 14. According to an exemplary embodiment, the power plant module 62 receives a power input from the engine module 110. In some embodiments, the power plant module 62 includes a transmission and/or an electromagnetic device (e.g., an electrical machine, a motor/generator, etc.) coupled to the transmission. In some embodiments, the transmission and the electromagnetic device are integrated into a single device (e.g., an electromechanical infinitely variable transmission, an electromechanical transmission, etc.). The electromagnetic device is configured to provide a mechanical energy input to the transmission. By way of example, the electromagnetic device may be configured to supply a rotational mechanical energy input to the transmission (e.g., using electrical energy generated from the mechanical power input provided by the engine module 110, etc.). In some embodiments, the power plant module 62 and/or the drive system 20 includes additional pumps (hydraulic fluid pumps, water pumps, etc.), compressors (e.g., air compressors, air conditioning compressors, etc.), generators, alternators, and/or other types of energy generation and/or distribution devices configured to transfer the energy from the power plant module 62 to other systems.

The fuel system 108 is configured to provide fuel to the engine module 110 and/or other components of the concrete mixer truck 10. Specifically, the fuel system 108 may be configured to provide fuel to an engine 74 of the engine module 110. The engine 74 may use the fuel in an internal combustion process to generate a mechanical power output that is provided to the power plant module 62 (e.g., to generate electricity, to power onboard electric motors used to at least one of rotate wheel and tire assemblies, to drive the transmission etc.) and/or to power the drum driver 114. The fuel system 108 may include one or more valves, hoses, regulators, filters, and/or various other components configured to facilitate providing fuel to the engine 74. The fuel system 108 includes a container 126 (e.g., a vessel, reservoir, tank, etc.) that is configured to store a fluid (e.g., fuel, air, hydraulic fluid, etc.). The container 126 is disposed behind the drum driver 114 along the chassis 12. In other embodiments, the container 126 is coupled to a side of the rear pedestal 26. In some embodiments, the container 126 is coupled to the chassis 12 and positioned directly beneath the mixing drum 14. According to an exemplary embodiment, the container 126 includes a fuel tank that stores fuel used to power the engine 74. In some embodiments, the container 126 additionally or alternatively includes an air tank configured to store compressed air (e.g., for use in an air brake system, for use when raising and lowering the pusher axle assembly 168, etc.). In some embodiments, the container 126 additionally or alternatively includes a hydraulic tank configured to store hydraulic fluid for use in one or more hydraulic circuits (e.g., a hydraulic circuit that includes the drum driver 114, etc.).

A cover assembly 120 including a plurality of cover panels is positioned between the second end 38 of the mixing drum 14 and the engine module 110. The cover assembly 120 is disposed around the fuel system 108 (e.g., the container 126, etc.), the drum driver 114, and the rear pedestal 26. The cover assembly 120 is configured to protect the various internal components from debris. Such debris may be encountered while the concrete mixer truck 10 is driven along a roadway, for example. The cover assembly 120 may also protect the various internal components from damage due to collisions with trees, poles, or other structures at a jobsite or while transporting concrete. In some embodiments, all or some of the fuel system 108 is incorporated under a hood 86 of the engine module 110.

The engine module 110 is coupled to the frame rails 40 proximate the rear end 24 of the chassis 12. The engine module 110 is configured to directly, or indirectly, supply the various components of the concrete mixer truck 10 with the power needed to operate the concrete mixer truck 10. By way of example, the engine module 110 may be configured to provide mechanical energy (e.g., rotational mechanical energy) (i) to one or more components directly (e.g., via a power-take-off, etc.) to drive the one or more components (e.g., a hydraulic pump of the drum driver 114, etc.) and/or (ii) to the power plant module 62 to drive the one or more components indirectly. The engine module 110 may be defined by any number of different types of power sources. According to an exemplary embodiment, the engine module 110 includes the engine 74 coupled to the frame rails 40 and disposed within the hood 86. The engine 74 may include an internal combustion engine configured to utilize one or more of a variety of fuels (e.g., gasoline, diesel, bio-diesel, ethanol, natural gas, etc.) to output mechanical energy. In some embodiments, at least one of the drum drive motor 130, the first chute actuator 122, the second chute actuator 94, and the third chute actuator 78 is electrically driven (i.e., powered using electrical energy) rather than hydraulically driven.

In some embodiments, the engine module 110 additionally or alternatively includes multiple battery modules (e.g., batteries, capacitors, ultra-capacitors, etc.) spread throughout the concrete mixer truck 10, which cooperate to act collectively as an energy storage device. The engine module 110 can be charged through an onboard energy source (e.g., through use of an onboard generator powered by an internal combustion engine, by operating the electromagnetic device as a generator, during regenerative braking, through an onboard fuel cell, through an onboard solar panel, etc.) or through an external energy source (e.g., when receiving mains power from a power grid, etc.). In some embodiments, the concrete mixer truck 10 is a purely electric vehicle that does not include an internal combustion engine and, as such, is driven by electrical energy in all modes of operation. In such embodiments, the concrete mixer truck 10 may not include a fuel tank.

Chassis

According to an exemplary embodiment, a frame configuration is described. The rearward cross-member configuration includes utilizing a rear cross-member and a front cross-member positioned forward of the rear cross-member to mount various concrete mixer truck components. A fluid tank is positioned between the frame rails in a lateral (e.g., transverse) direction and coupled to the front cross-member. Mounting the fluid tank between the frame rails reduces the exposure of the fluid tank to foreign objects and thereby reduces the likelihood of damage to the fluid tank. A remote fill is utilized to fill the fluid tank, and conduits to and from the tank are shortened because the fluid tank is in a central location along the chassis. A battery box is positioned between the front cross-member and rear cross-member rearward of the fluid tank. By mounting the battery box between the frame rails, the need for an additional mounting location and corresponding mounting components is eliminated, resulting in a lighter load on the chassis and reducing the number of components needed to house the batteries. Additionally, mounting the battery box in between the frame rails protects the battery box from damage. Specifically, the battery box does not extend outward from the side of the frame rail at the rear of the concrete mixer truck, like in conventional systems.

According to an exemplary embodiment, a front cross-member is described. The front cross-member is configured to couple to a steering assembly (e.g., axle assembly). This integrated design permits the steering gears to be moved rearward along the frame and placed directly a set of spring hangers, thereby reducing the front overhang of the steering assembly. By packaging all these components in a small area formed between the existing front cross-member and structure, this arrangement facilitates high steering cramp angles with large tires. Further packaging all these components together reduces the front overhang of the vehicle. Beneficially, the front cross-member is configured to be removable to facilitate access when servicing the steering assembly. The front cross-member may be configured to include a front leaf spring mounting, a chute pivot support mounting, a hydraulic chute control manifold, and a front vehicle recovery provision along with the steering assembly mounting.

According to an exemplary embodiment, an engine mount is described. The engine mount is positioned directly under the engine and couples the engine to the chassis, thereby reducing a cantilever effect on the mount. The engine mount implements a single isolator and is mounted directly to a cross-member of the chassis, thereby eliminating the need for additional cross-members, components, and mounting assemblies. Beneficially, the engine mount includes one or more chassis routings for HVAC routings, fuel filter mountings, and electrical clippings.

According to an exemplary embodiment, a routing assembly is described. The routing assembly includes an HVAC hose cluster, a tube assembly, and an electric cover that extends from the cab, along the frame rails, to the engine. Both the HVAC hose cluster and the tube assembly extend along internal portions of a respective rail in the frame rails. The routing assembly provides an organized and protected route for electrical, air, hydraulic, fuel, and HVAC connectors within the chassis, and the positions of the wires and hoses inside of the frame rails ensure that the frame rails protect these wires and hoses from exposure to foreign objects.

Rearward Cross-Members

Figure 4:
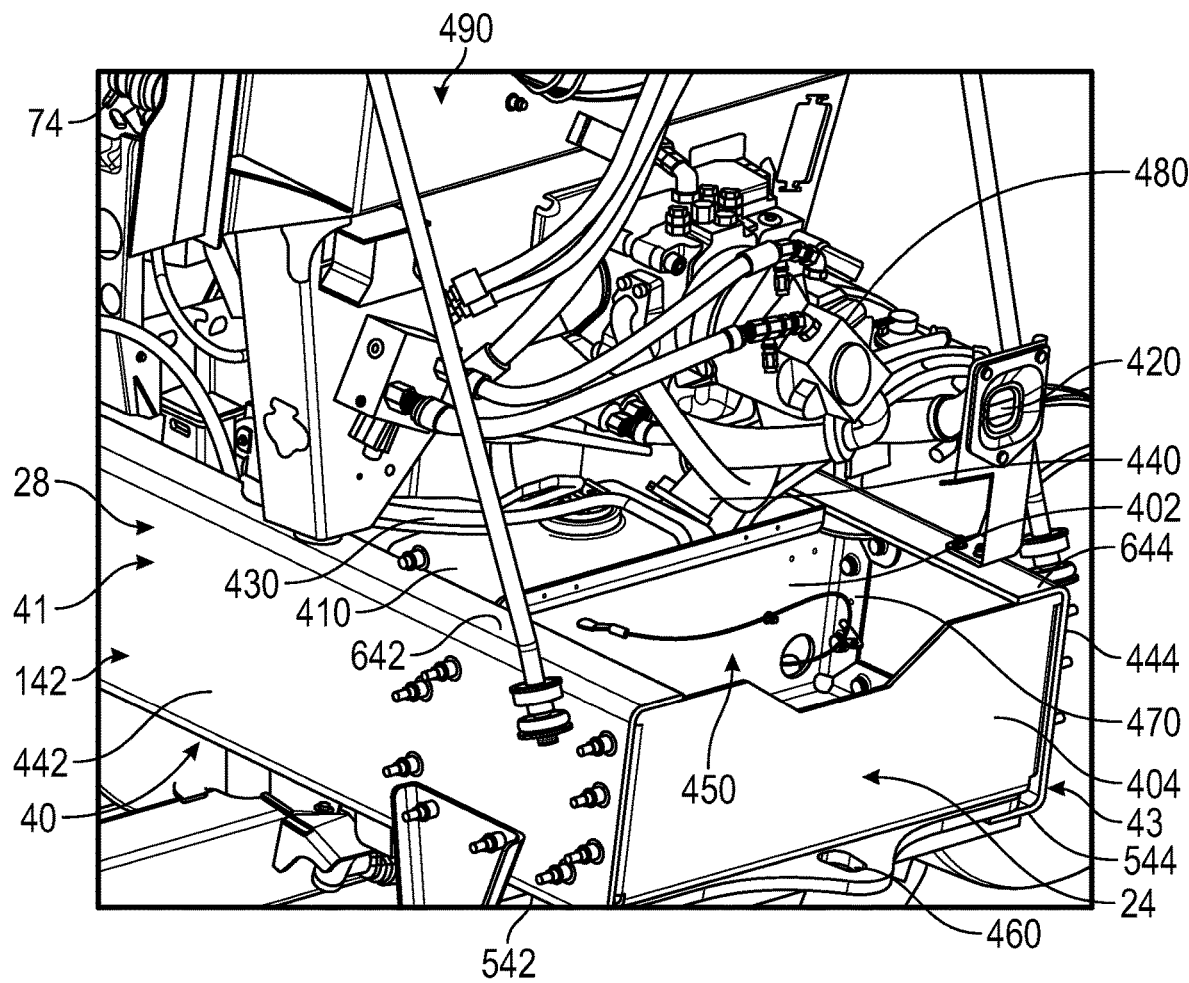
FIG. 4 is a top perspective view of a rearward cross-member of a chassis of the concrete mixer truck of FIG. 1, according to an exemplary embodiment.
Figure 5:
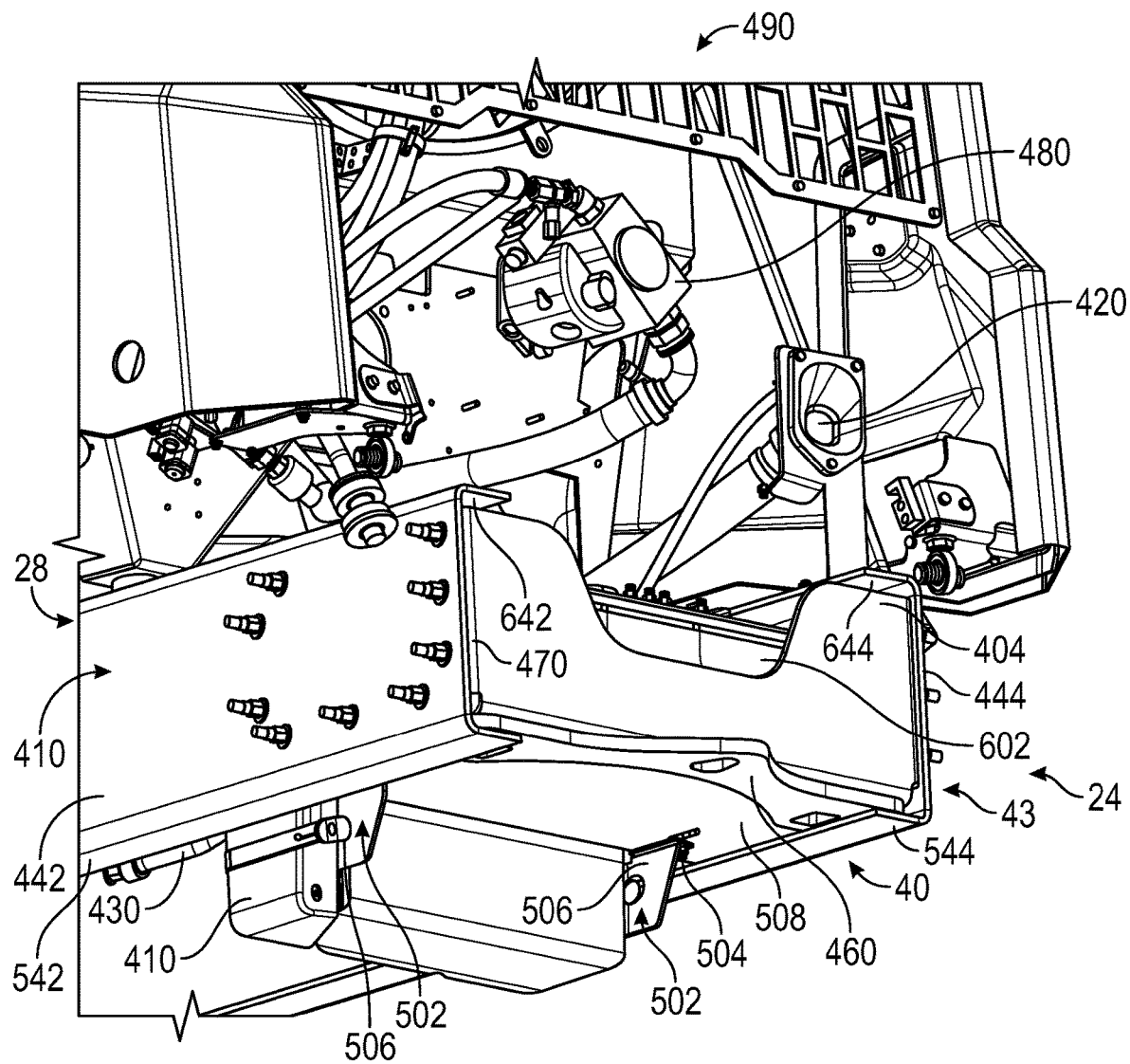
FIGS. 5 and 6 are various perspective views of the rearward cross-member of FIG. 4 with a battery box, according to an exemplary embodiment.
Figure 6:
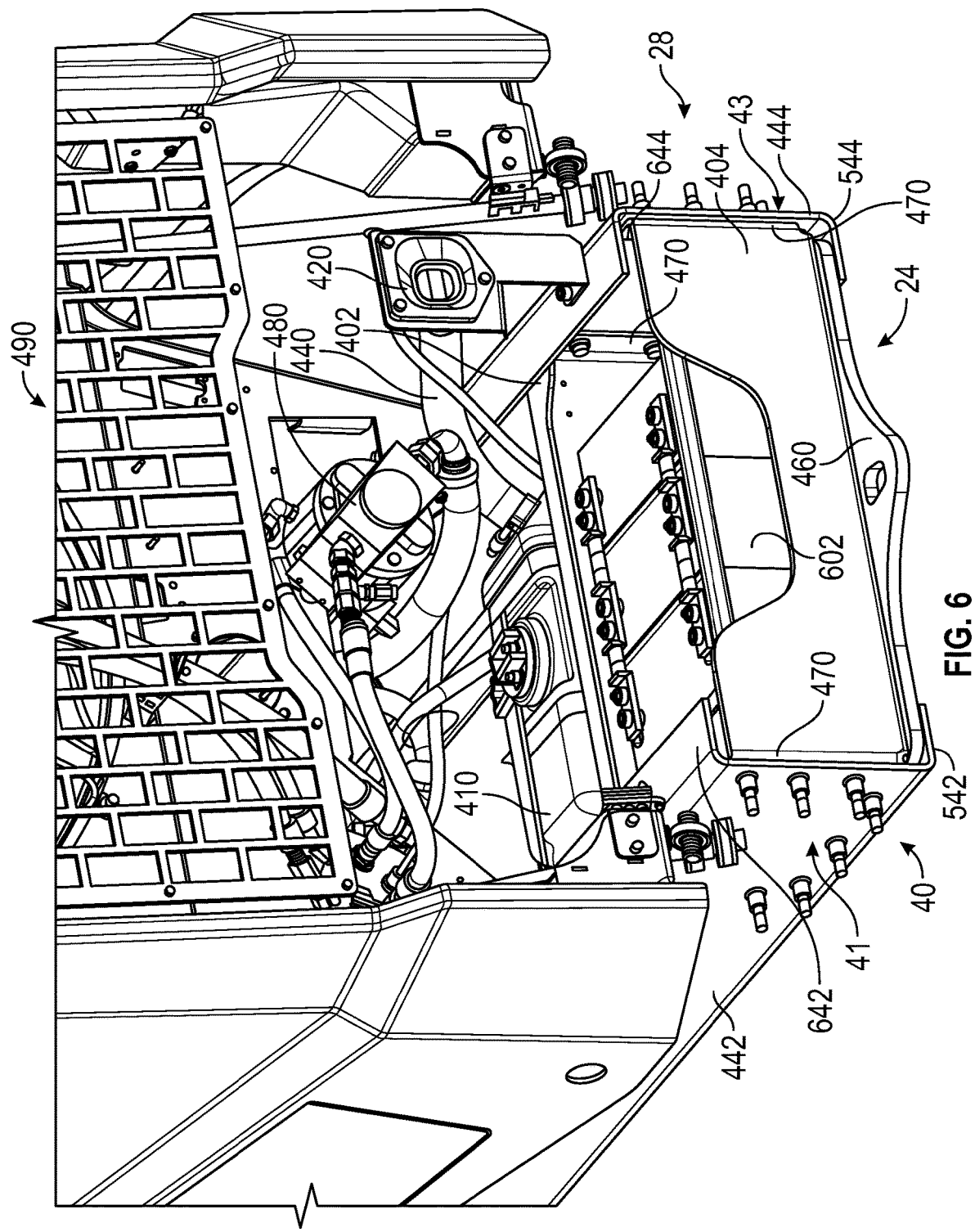

Referring to FIG. 4-6, the frame 28 includes a rearward cross-member configuration. The rearward cross-member configuration includes a pair of frame members, shown as cross-member 402 and rear cross-member 404. The cross-member 402 is positioned forward of the rear cross-member 404. As shown, the frame rails 40 each have a C-shaped cross-section (i.e., are C-channels) that includes a base and two legs oriented perpendicular to the base such that the legs define a horizontal width of the frame rail 40, and the base defines a vertical height of the frame rail 40. The first frame rail 41 on the first lateral side 142 includes a first base rail 442 (e.g., a base portion, a vertical portion, etc.), a first upper leg 642 (e.g., a horizontal portion, a protrusion, etc.), and a first lower leg 542 (e.g., a horizontal portion, a protrusion, etc.). The second frame rail 43 on the second lateral side 144 includes a second base rail 444, a second upper leg 644, and a second lower leg 544. In other embodiments, the frame rails 40 may have a different cross-sectional shape (e.g., tubular, etc.).

The cross-member 402 is coupled to the first base rail 442 and extends laterally toward, and is coupled to the second base rail 444. The cross-member 402 includes a pair of frame coupling members, shown as flanges 470, positioned on opposite ends of the cross member 402 and coupled to an interior surface of each frame rail. Specifically, the flanges 470 may be fastened (e.g., bolted), welded, fixed, etc., to the frame rails 40. As shown, the flanges 470 are bolted to the frame rails 40. The cross-member 402 may be made from a wide variety of materials (e.g., steel, aluminum, etc.) with wide variety of cross-sections (e.g., square tube, C-channel, angle, etc.). As shown in FIGS. 4-6 the cross-member 402 is generally C-shaped with the flanges 470 positioned at each end. The cross-member 402 is positioned substantially below (e.g., directly below) a cooling system 490 and a pump 480. The cross-member 402 is offset a longitudinal distance forward of the rear cross-member 404 such that a volume, shown as cross-member cavity 450, is positioned therebetween. A horizontal plate, shown as base plate 508 is coupled to the cross-member 402, the rear cross-member 404, and the frame rails 40 and defines the bottom of the cross-member cavity 450.

The rear cross-member 404 is coupled to the first base rail 442 and extends laterally toward, and is coupled to a second base rail 444. The rear cross-member 404 includes a pair of frame coupling members, shown as flanges 470, positioned on opposite ends of the cross member 402 and coupled to an interior surface of each frame rail. Specifically, the flanges 470 may be fastened (e.g., bolted), welded, fixed, etc., to the frame rails 40. As shown, the flanges 470 are bolted to the frame rails 40. The rear cross-member 404 may be made from a wide variety of materials (e.g., steel, aluminum, etc.) with wide variety of cross-sections (e.g., square tube, C-channel, angle, etc.). As shown in FIGS. 4-6, the cross-member 402 has a substantially flat base defining a tapered recess or opening at the top (e.g., two angled portions and a flat position disposed therebetween) and with a leg extending forward from the bottom of the base. The rear cross-member 404 is positioned at the rear end 24 of the concrete mixer truck 10.

Referring to FIGS. 4 and 5, a fluid tank 410 is coupled to the frame 29. The fluid tank 410 is positioned between the frame rails 40 and extends in a lateral (e.g., transverse) direction. The fluid tank 410 is positioned forward of the cross-member 402 and is coupled to a front side of the cross-member 402. The fluid tank 410 may be further coupled to the base plate 508 disposed under the cross-member cavity 450. As shown, a pair of brackets 502 may be used to couple the fluid tank 410 to the base plate 508. A strap 506 extends around a bottom portion of the fluid tank 410 from one bracket 502 to the other bracket 502, coupling the fluid tank 410 to the brackets 502. A series of fasteners 504 couple the brackets 502 to the base plate 508. In some embodiments, the fluid tank 410 is a diesel exhaust fluid (DEF) tank. In other embodiments the fluid tank 410 contains another type of fluid (e.g., water, fuel, hydraulic fluid, etc.). The fluid tank 410 is fluidly coupled to an outlet conduit 430 configured to provide fluid to one or more components (e.g., the engine 74, through the pump 480, etc.). An inlet conduit 440 is coupled to the fluid tank 410 and defines a remote fill opening 420 disposed near the rear end 24. The remote fill opening 420 permits an operator to pour a fluid into the remote fill opening 420 to fill the fluid tank 410.

Due to the positioning of the fluid tank 410 below the pump 480 and inside of the chassis 12, conduits to and from the fluid tank 410 are shortened and are protected by the frame rails 40 and other components along the chassis 12. In some embodiments, the pump 480 is configured to provide fluid from the fluid tank 410 to one or more components along the concrete mixer truck 10. Additionally, by mounting the fluid tank 410 between the frame rails 40 it reduces the exposure of the fluid tank 410 to the environment and therefore decreases the likelihood of damage. Conventionally, concrete mixer trucks position fluid tanks outside of a set of frame rails and near an engine. In contrast, the rearward cross-member configuration provides protection to the fluid tank 410 against intrusion from a wide variety of directions due to the protection provided by the frame rails 40.

Referring to FIGS. 5 and 6, a container, shown as battery box 602, is positioned in the cross-member cavity 450 between the frame rails 40 in a lateral (e.g., transverse) direction and is coupled to the rear cross-member 404. The battery box 602 may contain or include one or more energy storage devices, such as batteries or capacitors. In some embodiments, the battery box 602 is additionally or alternatively coupled to the cross-member 402. By positioning the battery box 602 between the frame rails 40, the exposure of the battery box 602 to the environment is reduced, and therefore the likelihood of damage to the battery box 602 and the need for a separate mounting structure is eliminated. In conventional concrete mixer trucks, a battery box is mounted to an exterior surface of a frame at the rear of the concrete mixer truck. In contrast, the rearward cross-member configuration utilizes existing structures to mount the battery box 602, thereby eliminating the need for an additional mounting location and corresponding mounting components and resulting in a lighter load onto the chassis 12 and reducing the number of components needed to house the batteries in the battery box 602.

The rearward cross-member configuration provides improvements over conventional concrete mixer truck designs. The rearward cross-member configuration provides structure to the chassis 12. In some embodiments, the rearward cross-member configuration provides mounting locations (e.g., apertures) for one or more LSTA auxiliary axles. In some embodiments, the rearward cross-member configuration provides one or more lift and/or tow provisions (e.g., tow points, lift points, apertures, mounts, etc.). As shown in FIGS. 5 and 6, the base plate 508 may includes a protrusion, shown as receiver 460, that extends outwardly away from the chassis 12. Specifically, the receiver 460 extends rearward of the rear cross-member 404. The receiver 460 is configured as an interface for a connection to another object (e.g., with a strap or chain), may facilitate towing (e.g., push, pull) another object, and/or for the vehicle to be towed. Specifically, the receiver 460 defines an aperture configured to receive one or more objects (e.g., hooks, straps, etc.).

Front Cross-Member

Figure 7:
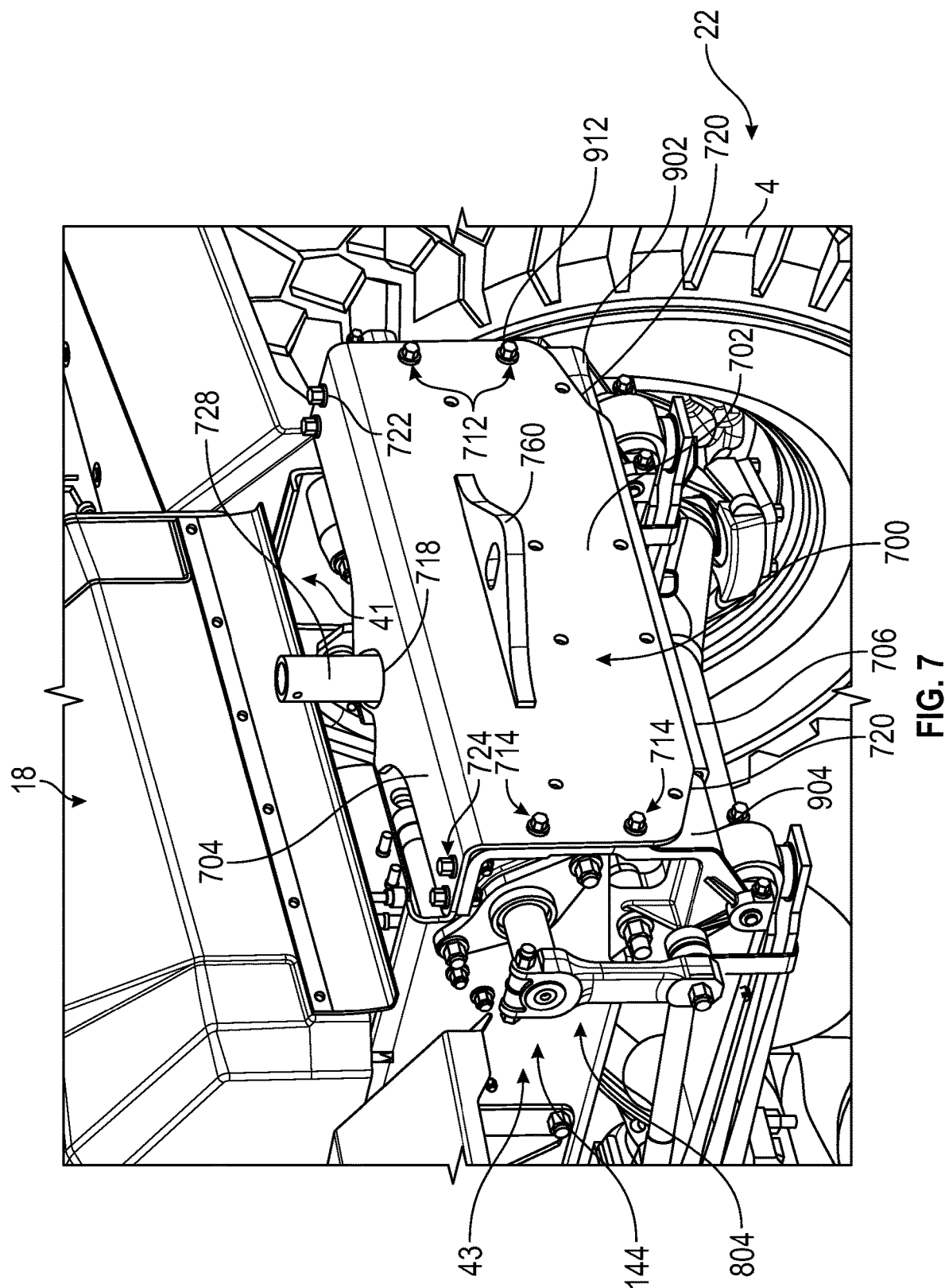
FIGS. 7 and 8 are various perspective views of a front cross-member and steering assembly of a chassis of the concrete mixer truck of FIG. 1, according to an exemplary embodiment.
Figure 8:
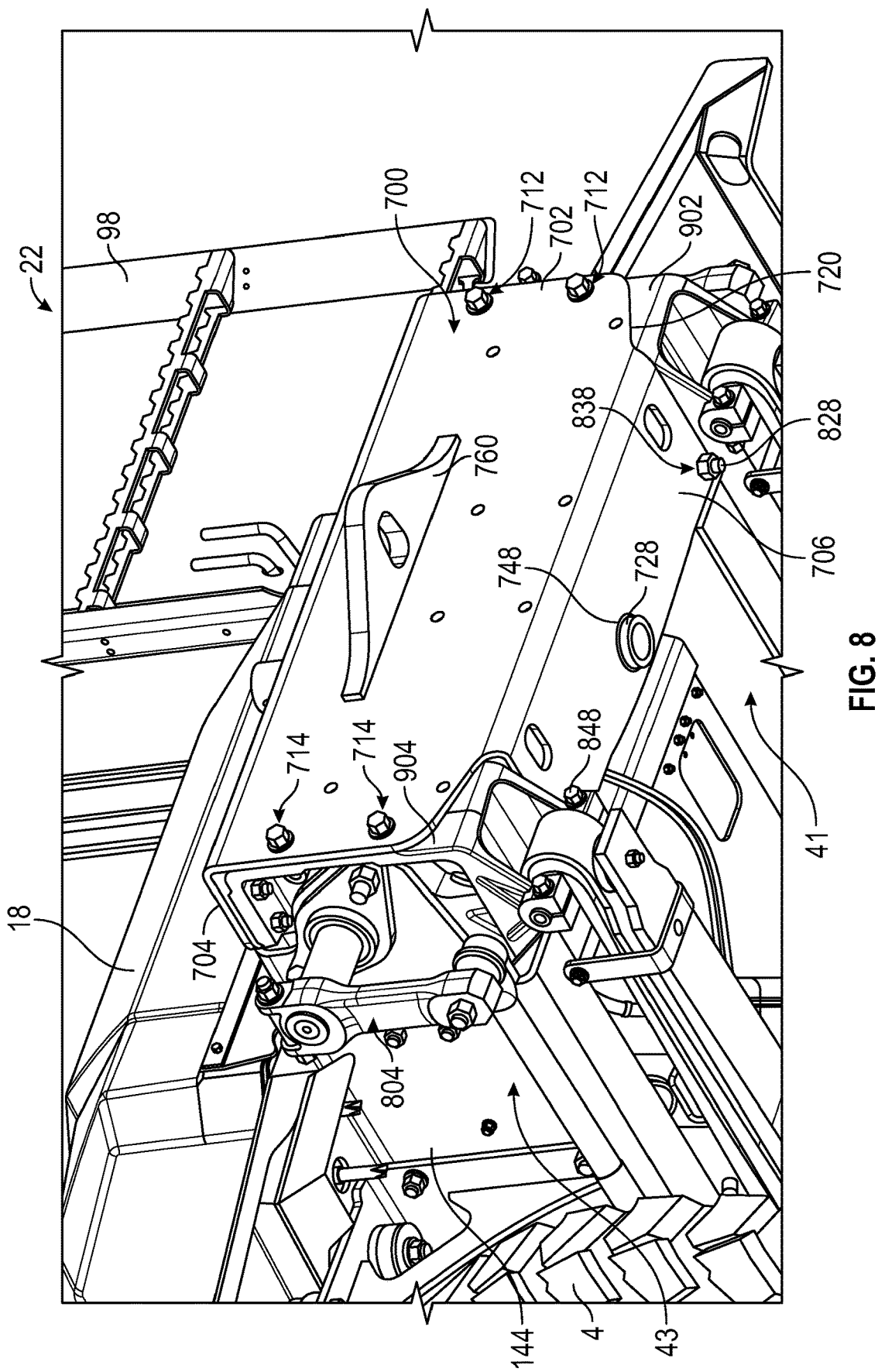
Figure 9:
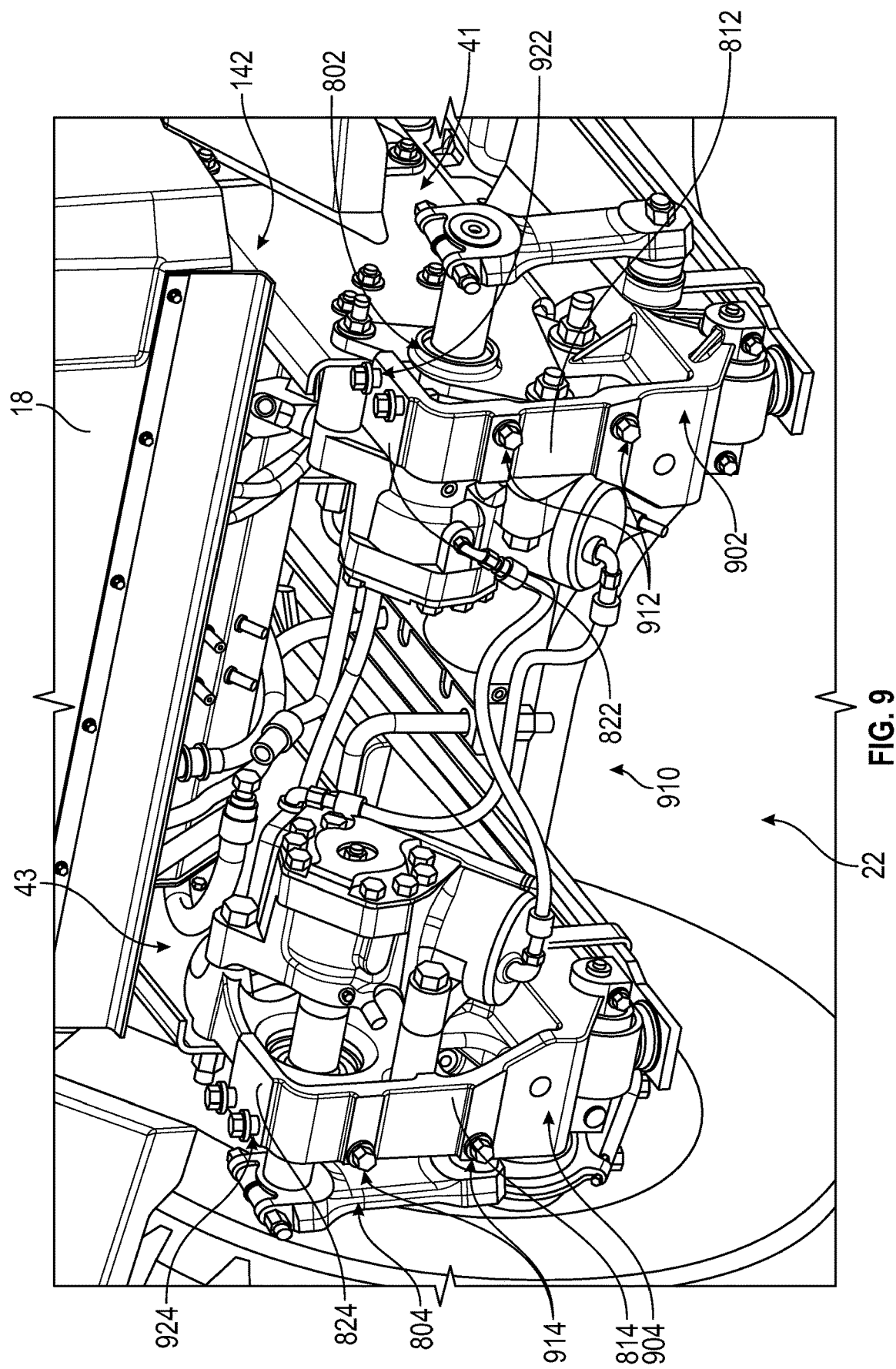
FIG. 9 is a top perspective view of the steering assembly of FIGS. 7 and 8, according to an exemplary embodiment.

Referring to FIGS. 7-9, the frame 28 includes a frame member, shown as front cross-member 700, according to an exemplary embodiment. The front cross-member 700 is configured to couple to a steering assembly 910 along the frame rails 40. The front cross-member 700 is positioned at the front end 22 of the concrete mixer truck 10 and is coupled to the steering assembly 910 adjacent the front end 22. The front cross-member 700 includes a base 702 (e.g., a base portion, a vertical portion, etc.), an upper leg 704 (e.g., a horizontal portion, a protrusion, etc.) oriented perpendicular to the base 702, and a lower leg 706 (e.g., a horizontal portion, a protrusion, etc.) oriented perpendicular to the base 702, parallel to and offset above the upper leg 704. The front cross-member 700 has a C-channel cross-section such that the upper leg 704 and a lower leg 706 define a width of the front cross-member 700, and the base 702 defines a height of the front cross-member 700. In other embodiments, the front cross-member 700 may have a different cross-sectional shape (e.g., tubular, etc.). As shown in FIG. 9, the steering assembly 910 is included as part of a first wheel assembly 802 and a second wheel assembly 804. The wheel assembly 802 and the wheel assembly 804 are configured to be connected with a drive shaft of the vehicle, receiving rotational energy from the engine 74 (e.g., prime mover) and allocating torque provided by the engine 74 between the half shafts and/or wheel assemblies. The half shafts and/or wheel assemblies deliver the rotational energy to each wheel-end assembly.

The first wheel assembly 802 includes a first wheel bracket 902 and may include various components of the drive system 20 including brakes, a gear reduction, steering components, a wheel hub, a wheel, and other features. The first wheel bracket 902 includes a first bracket face 812 and a first bracket leg 822. The first bracket face 812 is coupled to a pair of first front coupling members 912 (e.g., fasteners, bolts, etc.). The first bracket leg 822 is coupled to a pair of first upper coupling members 922 (e.g., fasteners, bolts, etc.). The second wheel assembly 804 includes a second wheel bracket 904 and may include various components of the drive system 20 including brakes, a gear reduction, steering components, a wheel hub, a wheel, and other features. The second wheel bracket 904 includes a second bracket face 814 and a second bracket leg 824. The second bracket face 814 is coupled to a pair of second front coupling members 914 (e.g., fasteners, bolts, etc.). The second bracket leg 824 is coupled to a pair of second upper coupling members 924 (e.g., fasteners, bolts, etc.).

The base 702 includes a bottom portion 720 that tapers and curves as the base 702 transitions to the lower leg 706. As shown in FIG. 8, the bottom portion 720 is configured to fit the lower shape and components of the steering assembly 910, including the first wheel assembly 802 and a second wheel assembly 804. The base 702 is coupled to a protrusion, shown as receiver 760, that extends outwardly away from the chassis 12. Specifically, the receiver 760 extends forward of the base 702. The receiver 760 is configured as an interface for a connection to another object (e.g., with a strap or chain). The receiver 760 may facilitate towing (e.g., push, pull) another object and/or may facilitate towing the concrete mixer truck 10. As shown, the receiver 760 defines an aperture (e.g., a vertical aperture) configured to receive another object (e.g., a hook, a strap, etc.). The base 702 defines a first front set of holes 712 or apertures adjacent to the first lateral side 142. The first front set of holes 712 are configured to receive the first front coupling members 912 of the first wheel bracket 902. The base 702 includes a second front set of holes 714 or apertures adjacent to the second lateral side 144. The second front set of holes 714 are configured to receive the second front coupling members 914 of the second wheel bracket 904. The shape of the base 702 is complementary to the shape of the first bracket face 812 and the second bracket face 814 such that the base 702 engages the first bracket face 812 and the second bracket face 814.

The upper leg 704 defines a shaft opening 718 or aperture positioned centrally and configured to receive an actuator shaft 728. The actuator shaft 728 is configured to couple with the first chute actuator 122 to move the main chute 46. The upper leg 704 defines a first upper set of holes 722 or apertures adjacent to the first lateral side 142. The first upper set of holes 722 are configured to receive the first upper coupling members 922 of the first wheel bracket 902. The upper leg 704 defines a second upper set of holes 724 or apertures adjacent to the second lateral side 144. The second upper set of holes 724 are configured to receive the second upper coupling members 924 of the second wheel bracket 904. The shape of the upper leg 704 is complementary to the shape of the first bracket leg 822 second bracket leg 824 such that the upper leg 704 engages the first bracket leg 822 second bracket leg 824.

The lower leg 706 defines a shaft opening 748 or aperture positioned centrally and configured to receive the bottom portion of the actuator shaft 728. The actuator shaft 728 is supported by and able to rotate within the shaft opening 748 and the shaft opening 718 of the upper leg 704. The lower leg 706 defines one or more lower holes 838 or apertures adjacent to the first lateral side 142. The lower holes 838 are each configured to receive a coupling member 828 (e.g., a fastener, a bolt, etc.) that couples the lower leg 706 to a bottom surface of one of the frame rails 40. The shape of the lower leg 706 is complementary to the shape of the frame rails 40 such that the lower leg 706 engages the frame rails 40.

As shown in FIGS. 7-9, the integrated design of the front cross-member 700 facilitates moving the steering assembly 910 rearward along the concrete mixer truck 10 and placed directly above spring hangers, thereby reducing the overhang on the front end 22. Additionally, the relatively close spacing between the front cross-member 700 and the steering assembly 910 components in a small area facilitates having high steering cramp angles with large tires. As shown in FIG. 9, the front cross-member 700 is removable (e.g., by unscrewing the coupling members from the holes) to allow for easy servicing of the steering assembly 910 components and other components of the drive system 20. In some embodiments, the front cross-member 700 may be configured to include a front leaf spring mounting, a chute pivot support mounting, a hydraulic chute control manifold, and a front vehicle recovery provision along with the steering gear mounting.

Engine Mounting

Figure 10:
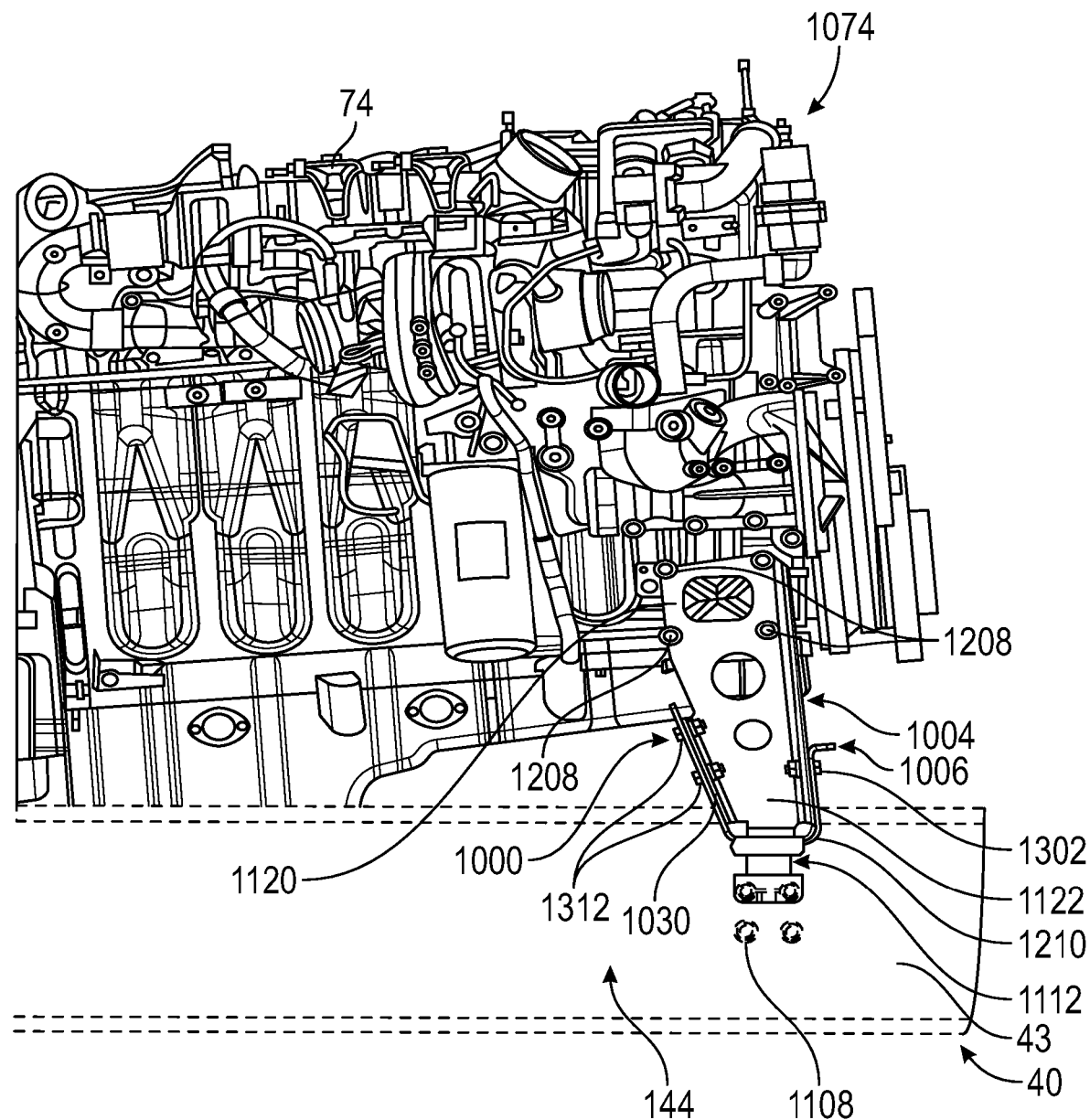
FIGS. 10-13 are various views an engine mount coupled to a chassis of the concrete mixer truck of FIG. 1, according to an exemplary embodiment.
Figure 11:
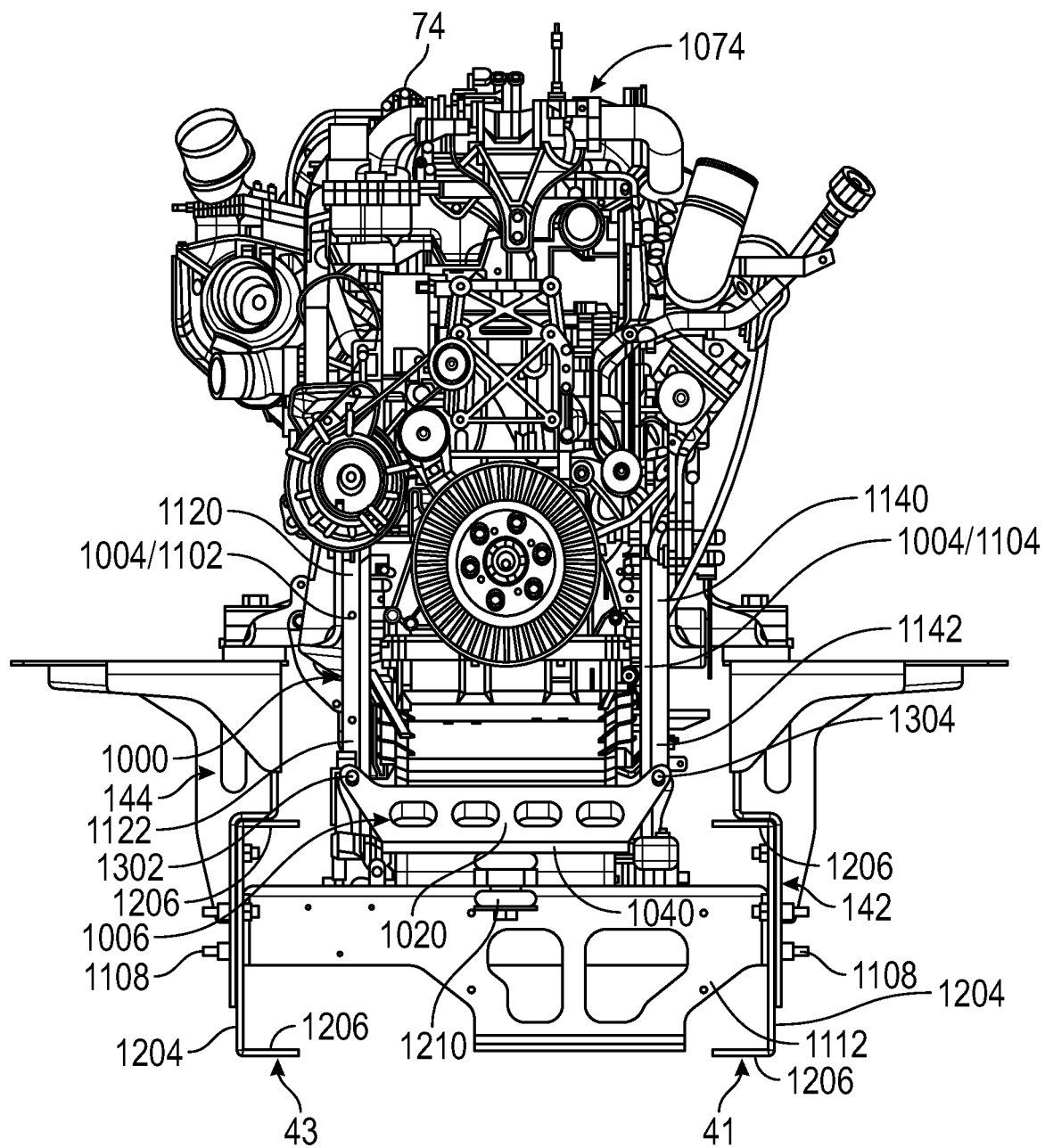
Figure 12:
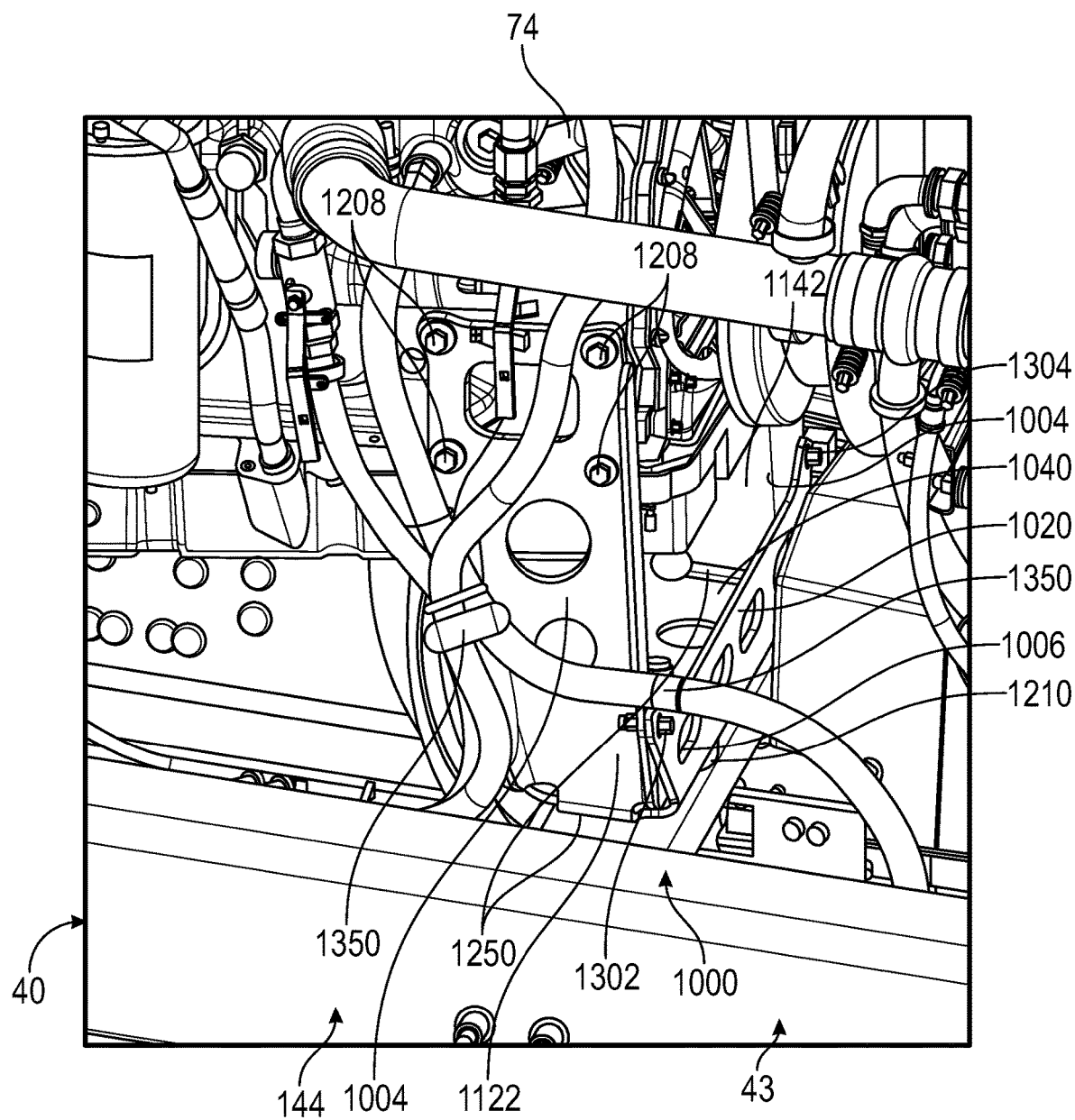

Referring to FIG. 10-14, the concrete mixer truck 10 further includes a frame assembly, shown as an engine mount 1000. The engine mount 1000 is coupled to the engine 74 and to the chassis 12. The engine mount 1000 is positioned directly under the engine 74 and adjacent a front end 1074 of the engine 74. The engine mount 1000 is directly coupled to a cross-member in the chassis 12, shown as a mid-section cross-member 1112 (e.g., a frame member). The engine mount 1000 eliminates the need for additional cross-members and a robust, heavy bracket mount that is offset from the engine 74. Such engine mounts may be offset from an engine by 7.5" in some conventional systems. The engine mount 1000 includes a pair of mounting arms 1004 or mounting members coupled to a bracket 1006 or frame member that extends laterally along the mid-section cross-member 1112. The mounting arms 1004 are configured to couple the engine 74 to the bracket 1006. The bracket 1006 is configured to couple the engine 74 to the chassis 12. The bracket 1006 includes a base portion 1040, a front leg 1020, and rear leg 1030. As shown in FIG. 12, the mounting arms 1004 and the bracket 1006 are formed as a single continuous piece with bends or curved portions 1250 extending between each portion.

The frame rails 40 have a C-channel cross-section that includes a base 1204 (e.g., a base portion, a vertical portion) and a pair of legs 1206 (e.g., horizontal portions, protrusions, etc.) oriented perpendicular to the base 1204. In other embodiments, the frame rails 40 may have a different cross-sectional shape (e.g., tubular, etc.). The legs 1206 define a width of the frame rail 40, and the base 1204 defines a height of the frame rail 40. The mid-section cross-member 1112 is coupled to the frame rails 40 by fasteners, shown as coupling members 1108. The mid-section cross-member 1112 extends from the frame rail 40 on the first lateral side 142 to the frame rail on the second lateral side 144. In some embodiments, a frame liner may be coupled (e.g., bolted, welded, etc.) to the interior of the frame rails 40 and provide additional structural rigidity (e.g., in areas of high stress, etc.). In areas with lesser stresses, the frame liners may be omitted from the frame rails 40 in order to reduce weight. In some embodiments, the frame liners have a C-channel cross-section. In other embodiments, the frame liners have various cross-sections (e.g., angle, rectangular tube, etc.).

The pair of mounting arms 1004 are shaped, sized, and oriented to fit between the frame rails 40 and have a length to support the engine 74 in a desired orientation. The pair of mounting arms 1004 includes a first mounting arm 1102 and a second mounting arm 1104 oriented substantially parallel to, and laterally offset from, the first mounting arm 1102. The first mounting arm 1102 includes a first top portion 1120 and a first lower portion 1122. A plurality of coupling members 1208 or fasteners positioned along the first top portion 1120 couple the first mounting arm 1102 to a side of the engine 74. The second mounting arm 1104 includes a second top portion 1140 and a second lower portion 1142. A plurality of coupling members 1308 or fasteners positioned along the second top portion 1140 couple the second mounting arm 1104 to a side of the engine 74 opposite the first mounting arm 1102.

Figure 13:
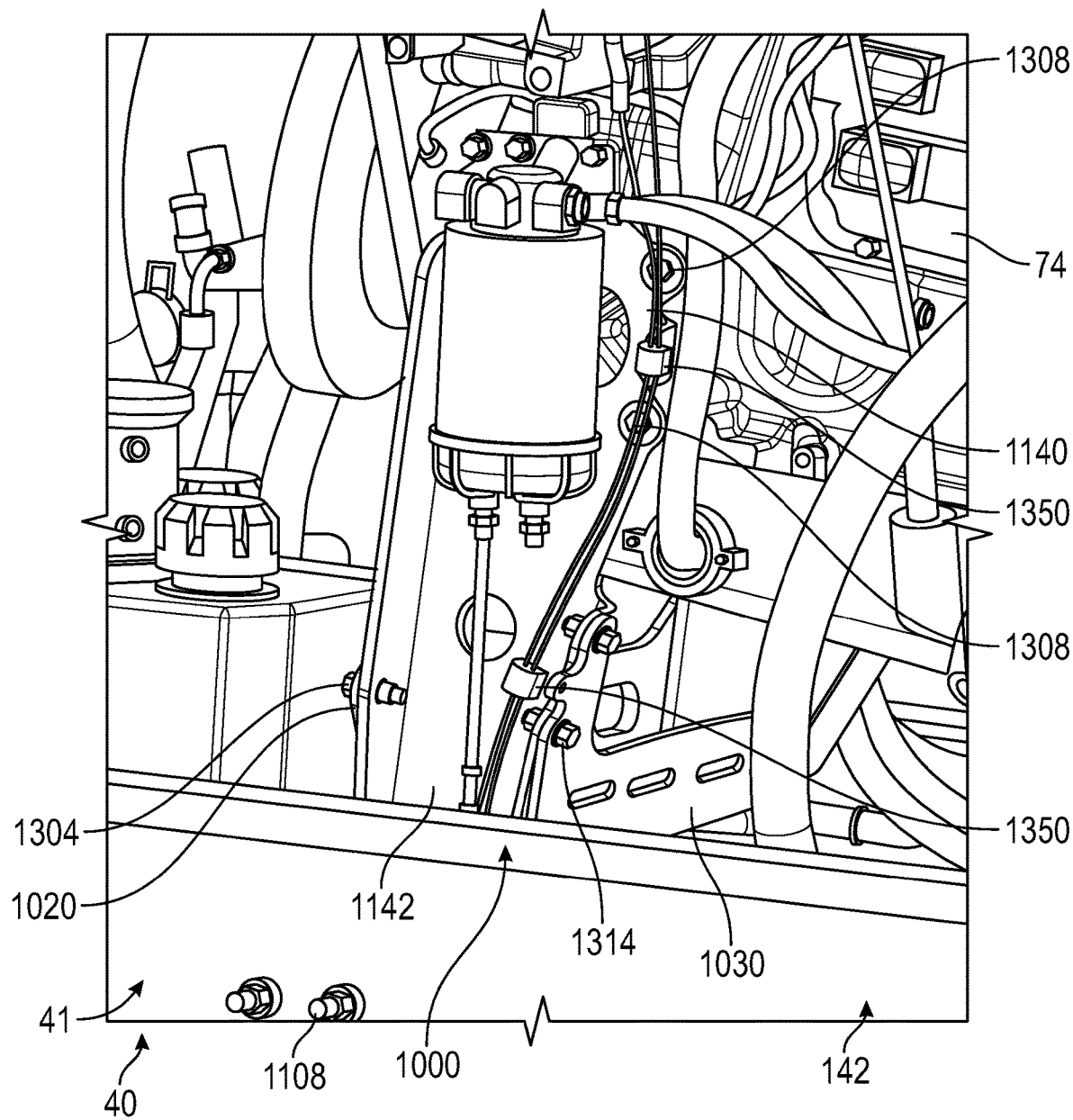

As shown in FIG. 12, the mounting arms 1004 and the bracket 1006 are formed as a single continuous piece. Specifically, the mounting arms 1004 are coupled to the bracket by bends or curved portions 1250. To provide additional mounting support, the first lower portion 1122 and the second lower portion 1142 are each configured to couple with the front leg 1020 and rear leg 1030 to provide lateral support to the engine mount 1000. A front surface of the first lower portion 1122 and a front surface of the second lower portion 1142 are configured to couple with the front leg 1020 of the bracket 1006. As shown in FIGS. 11 and 12, a first coupling member 1302 or fastener adjacent the second lateral side 144 is configured to couple the first lower portion 1122 with the front leg 1020 of the bracket 1006 and a second coupling member 1304 or fastener adjacent the first lateral side 142 is configured to couple the second lower portion 1142 to the front leg 1020 of the bracket 1006. Additionally, a rear surface of the first lower portion 1122 and a rear surface of the lower second portion 1142 are coupled to a rear leg 1030 of the bracket 1006. As shown in FIGS. 10 and 13, a third coupling member 1312 adjacent the second lateral side 144 is configured to couple the first lower portion 1122 with the rear leg 1030 of the bracket 1006 and a fourth coupling member 1314 adjacent the first lateral side 142 is configured to couple the lower second portion 1142 to the rear leg 1030 of the bracket 1006.

The base portion 1040 of the bracket 1006 is coupled to the top portion of the mid-section cross-member 1112. In some embodiments, a single isolator 1210 is implemented between the base portion 1040 and the mid-section cross-member 1112. Because the bracket 1006 is disposed directly below the engine 74 and couples the engine 74 to chassis 12 through the mid-section cross-member 1112, the cantilever effect on the engine mount 1000 is less than conventional mounting systems. Additionally, as shown in FIG. 13, the engine mount 1000 is configured with a plurality of guidance elements 1350 (e.g., clips, mounts, etc.) that are positioned along the mounting arms 1004, bracket 1006, and other portions to provide for one or more connections for securing and routing HVAC tubes, fuel filters, and electrical wires.

Chassis Routing

Referring to FIGS. 14-19, the concrete mixer truck 10 includes a conduit assembly, shown as routing assembly 1400. The routing assembly 1400 includes an HVAC hose cluster 1450 (e.g., one or more conduits) and a tube assembly 1410 (e.g., one or more conduits). Both the HVAC hose cluster 1450 and the tube assembly 1410 extend along internal portions of a respective rail in the frame rails 40. As shown, each of the frame rails 40 have a C-channel cross-section that includes a base 442 (e.g., a base portion, a vertical portion, etc.) and a pair of legs 542 and 642 (e.g., horizontal portions, protrusions, etc.) oriented perpendicular to the base 442. Specifically, the leg 542 extends along a bottom side of the base 442, and the leg 642 extends along a top side of the base 442. In other embodiments, the frame rails 40 may have a different cross-sectional shape (e.g., tubular, etc.). The legs 542 and 642 define a width of the frame rail 40, and the base 442 defines a height of the frame rail 40. The frame rails 40 include the first frame rail 41 that extends along the first lateral side 142 and the second frame rail 43 that extends along the second lateral side 144.

The HVAC hose cluster 1450 includes one or more HVAC hoses (e.g., conduits that transport one or more HVAC fluids, such as coolant) that extend along an internal portion (e.g., between the legs 542 and 642 and the base 442) of the first frame rail 41. The HVAC hose cluster 1450 may be coupled to the internal portion by a series of brackets 1460 (e.g., P clamps) at multiple locations separated longitudinally along the internal portion of the first frame rail 41 to secure the hoses in the HVAC hose cluster 1450. In some embodiments, the HVAC hose cluster 1450 is clipped to brackets along first frame rail 41. In some embodiments, the HVAC hose cluster 1450 includes three HVAC hoses. In other embodiments, the HVAC hose cluster 1450 includes more or fewer hoses and/or a different type of hose or wire.

Figure 15:
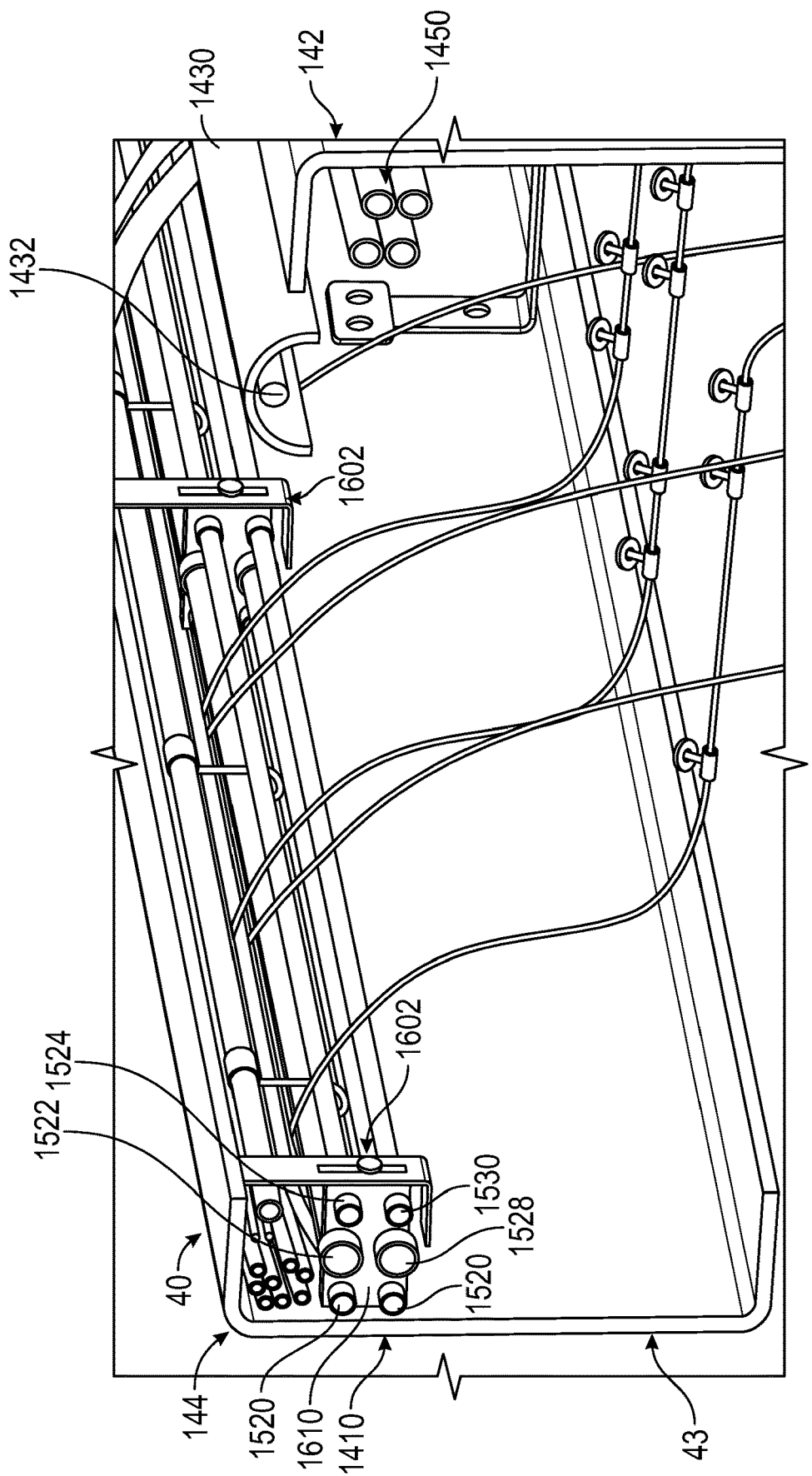
Figure 16:
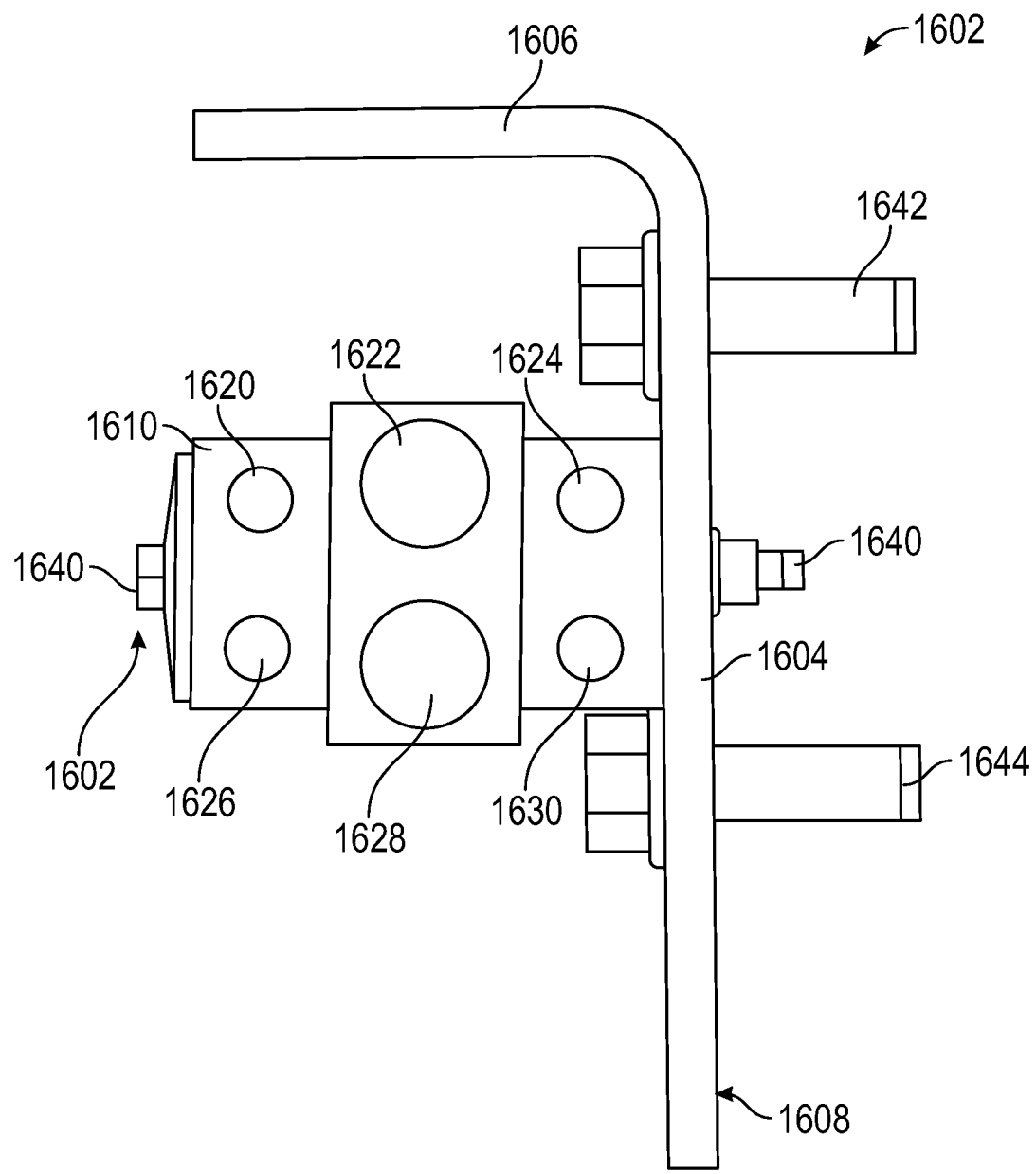

As shown, the tube assembly 1410 includes six tubes (e.g., conduits) that are connected by an adapter 1610 (e.g., a plate defining a series of apertures that each receive a tube) and extend along an internal portion (e.g., between the legs 542 and 642 and the base 442) of the second frame rail 43. As shown in FIG. 15, the tube assembly 1410 includes a first tube 1520, a second tube 1522, a third tube 1524, a fourth tube 1526, a fifth tube 1528, and a sixth tube 1530. In some embodiments, the tube assembly 1410 includes a first fuel line, a second fuel line, an air compressor discharge line, a first hydraulic line, a second hydraulic line, and a third hydraulic line, respectively. Referring to FIG. 16, the tube assembly 1410 includes a tube mounting member 1602 (e.g., an assembly) that includes the adapter 1610, which defines a series of apertures including a first tube receiver 1620, a second tube receiver 1622, a third tube receiver 1624, a fourth tube receiver 1626, a fifth tube receiver 1628, and a sixth tube receiver 1630 configured to receive the first tube 1520, the second tube 1522, the third tube 1524, the fourth tube 1526, the fifth tube 1528, and the sixth tube 1530, respectively. In some embodiments, each tube receiver includes an O-ring (e.g., configured to engage an outer surface of the corresponding tube).

The tube assembly 1410 is coupled to an internal portion of the second frame rail 43. The tube mounting member 1602 includes the adapter 1610 and a bracket 1608. The adapter 1610 is coupled to the bracket 1608 by a coupling member 1640 or fastener. Specifically, the coupling member extends through a bracket base portion 1604 of the bracket 1608 (e.g., a vertical portion). The bracket 1608 further includes bracket arm 1606 (e.g., a horizontal portion) that provides additional protection to the tubes in the tube assembly 1410. The bracket arm 1606 may extend substantially parallel to the leg 642 of the second frame rail 43, such that the tube assembly 410 is protected from above and below by the leg 642 and the bracket arm 1606, respectively. In some embodiments, a first clamp 1642 (e.g., a fastener) and a second clamp 1644 (e.g., a fastener) couple the bracket 1608 to the frame rail 43. The first clamp 1642 and the second clamp 1644 may be configured to facilitate adjusting the location of the adapter 1610, and in turn the tubes, along the vertical direction. In some embodiments, the tubes of the tube assembly 1410 are stainless steel to reduce corrosion. While the tube assembly 1410 is shown with six tubes, a wide variety of number of tubes may be implemented with the tube assembly 1410, varying in width, type, and length, to accommodate a variety of cables, wires, connectors, conduits, and other chassis routing members. Additionally or alternatively, the tube assembly 1410 may accommodate (e.g., receive, support, etc.) one or more wires.

Figure 14:
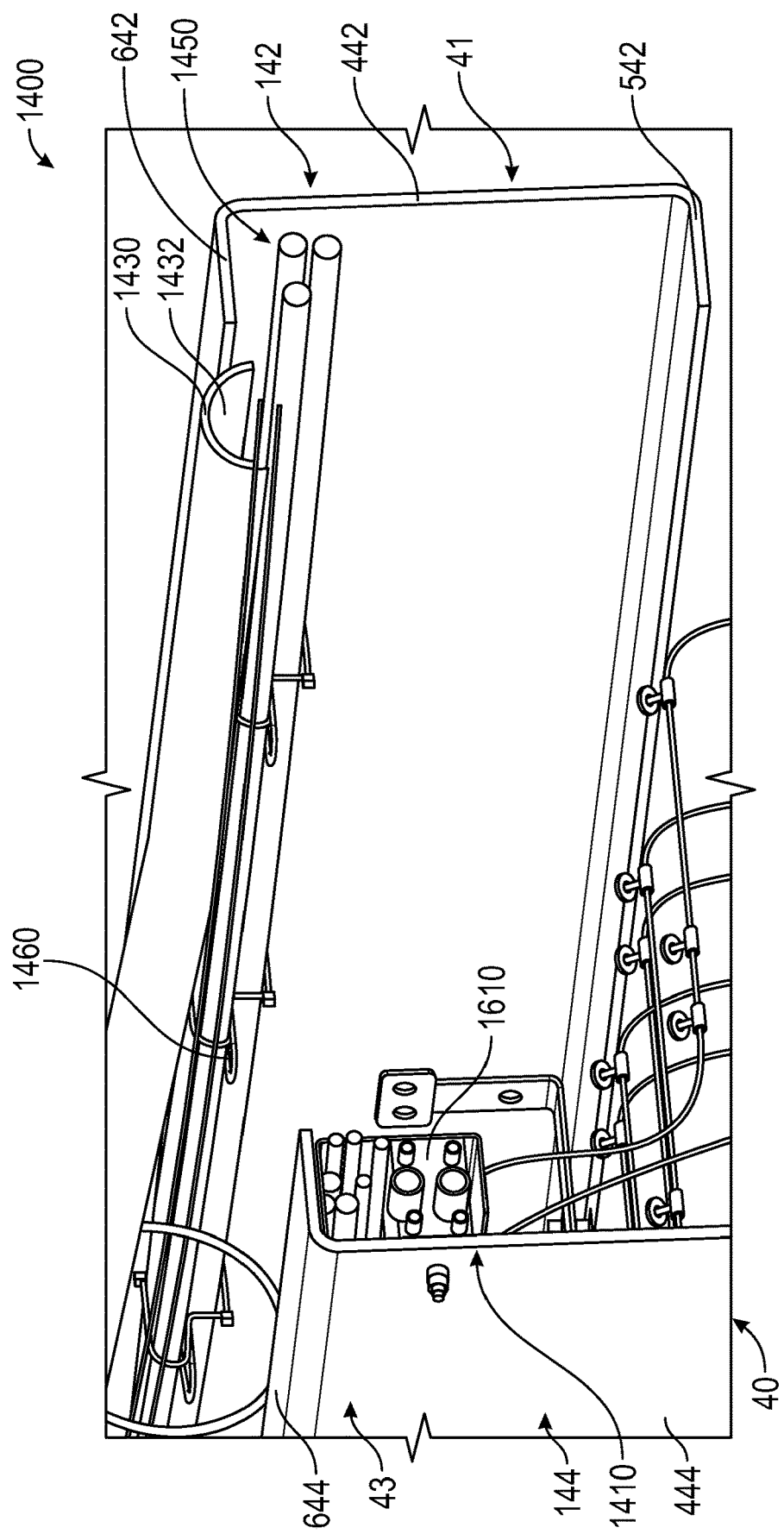
FIGS. 14-19 are various views of a tube assembly of a chassis of the concrete mixer truck of FIG. 1, according to an exemplary embodiment.
Figure 18:
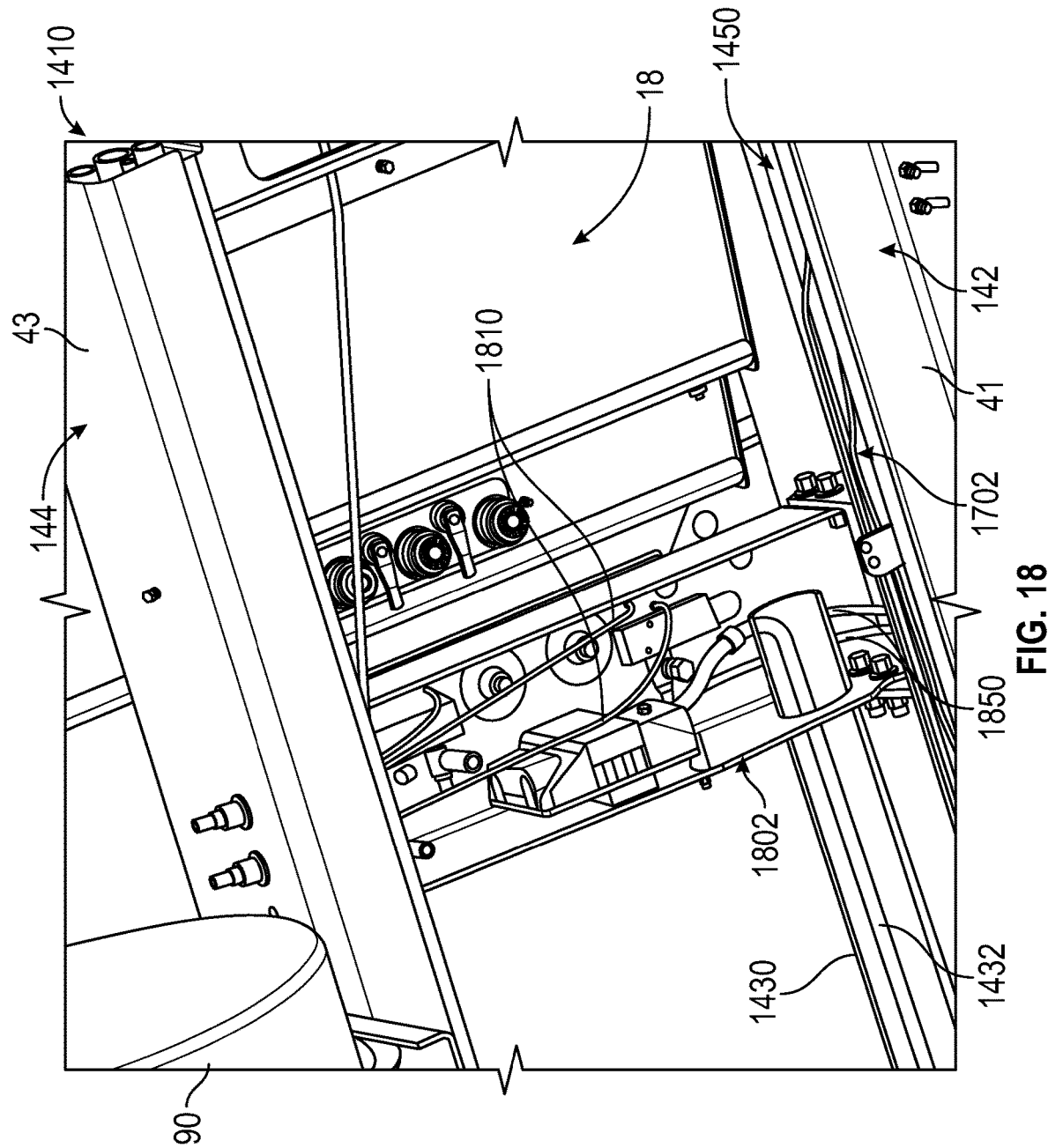

As shown in FIGS. 14 and 15, an electrical cover 1430 extends along the chassis 12, adjacent the first frame rail 41, from the cab 18 to the engine 74. The electrical cover 1430 may be a cover that protects and routes electrical wiring 1432 along the chassis 12 to various components. In some embodiments, the electrical cover 1430 is made from a composite material. As shown in FIG. 18, as the electrical wiring 1432 exits the cab 18, the electrical wiring 1432 is routed through a frame member, shown as cross-member 1802, to shield the electrical wiring 1432 (e.g., from water used in a washdown process). The cross-member 1802 extends between and is coupled to the frame rails 40. The electrical cover 1430 is routed into (e.g., extends into) such that the electrical wiring 1432 is covered along its entire length (e.g., without a gap between the electrical cover 1430 and the cross-member 1802). Beneficially, this provides further protection to the electrical wiring 1432 in an area prone to concrete buildup and exposure to wash water (e.g., as a result of attempts to clean up the concrete buildup).

Figure 17:
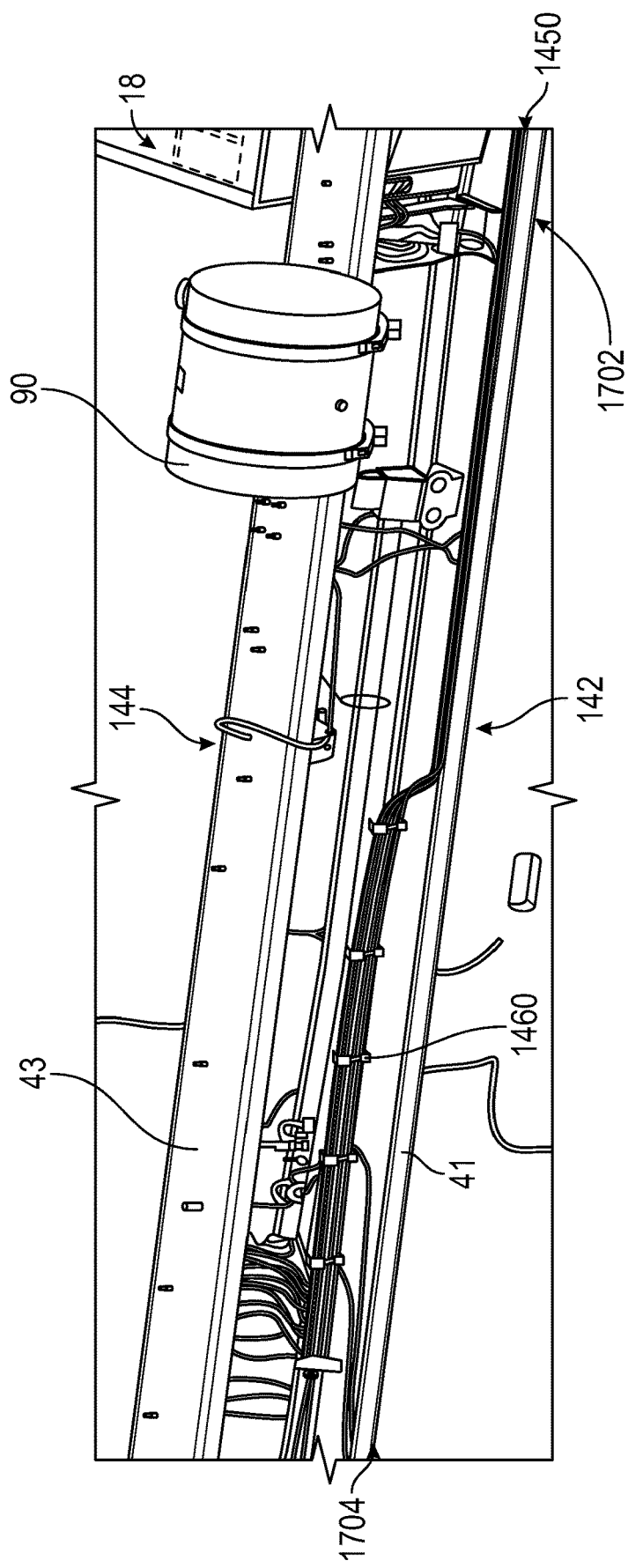

FIG. 17 is a bottom perspective view of the concrete mixer truck 10. As seen along the internal portion of the first frame rail 41, the HVAC hose cluster 1450 extend from a first location 1702 along the internal portion of the first frame rail 41 to a second location 1704. The first location 1702 is positioned near the front pedestal 16 and the cab 18 toward the front end 22. The second location 1704 is positioned along the chassis near the engine 74 and rear pedestal 26. Referring to FIG. 18, a pair of HVAC hoses 1850 extend laterally inward form the HVAC hose cluster 1450 and into the cross-member 1802. In some embodiments, the HVAC hose cluster 1450 provides air conditioning to the cabin of the cab 18 through the pair of HVAC hoses 1850 (e.g., the HVAC hoses 1850 provide refrigerant to the cab 18, the HVAC hoses 1850 are fluidly coupled to an inlet defined by the cab 18, etc.).

Figure 19:
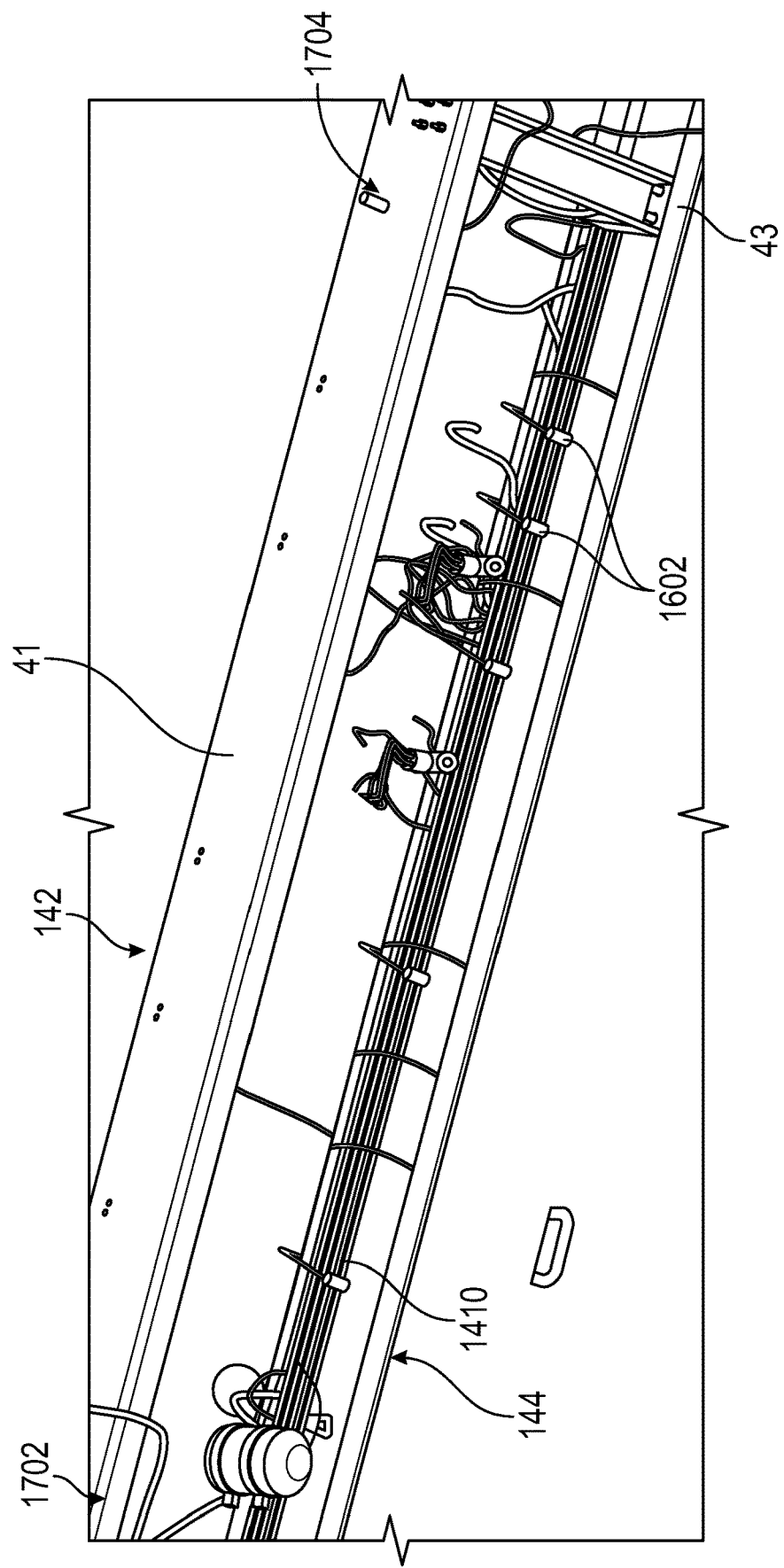

FIG. 19 is a bottom perspective view of the concrete mixer truck 10. As shown, the tube assembly 1410 extends from a first location 1702 along the internal portion of the second frame rail 43 to a second location 1704. The first location 1702 is positioned along the chassis 12 near the front pedestal 16 and cab 18 toward the front end 22. The second location 1704 is positioned along the chassis near the engine 74 and rear pedestal 26. The tube assembly 1410 may not include additional mounting members in between each tube mounting member 1602 to reduce the change of leaks or snags. Referring to FIG. 18, a pair of connectors 1810 extend laterally inward from the tube assembly 1410 toward the center portion of the chassis 12 and into the crossmember 1802. In some embodiments, the pair of connectors 1810 include an electrical wire and a hydraulic conduit and provide electrical energy and hydraulic fluid to components of the concrete mixer truck 10. By providing the connections for a wide variety of components in a predetermined, dedicated location, the routing assembly 1400 provides ease of servicing and management.

Cab

According to an exemplary embodiment, a cab with improved visibility and ergonomics is described. The single occupancy cab may include aluminum extrusions, fiberglass front and roof portions, and a curved windshield configured to increase operator visibility. One or more cab pillars are designed to optimize side visibility, thereby eliminating the need for side windows as found in conventional cab designs. A control panel (e.g., dash) is more compact than traditional control panel designs to increase windshield surface area—and therefore increase visibility—without sacrificing required controls. An overhead console is raised to further increase the windshield surface area and, in turn, the viewing area of the operator. Beneficially, the increased visibility improves operator control and comfort by minimizing blind spots and extraneous cab space compared to convention cab designs.

According to an exemplary embodiment, one or more aspects of the cab are configured to accommodate an operator and operation of the concrete mixer truck. The cab floor plan is configured to provide greater surface area of the floor space by removing extraneous frame rails, including a top flange of the frame rail, and altering the geometry of the floor compared to conventional floor layouts by altering the size of door components. The cab door is larger than conventional cab doors to provide greater clearance and comfort to the entrance and exit of operators through the cab. A removable panel is implemented that provides structural support for an interior panel and is coupled to an interior handle and window regulator. Front cab pillars are configured to receive a curved windshield and minimize obstruction of the side views of the operator. The windshield is curved to provide a greater longitudinal length of the dash. A number of electrical modules and wire harnesses are disposed within a storage space (e.g., a cabinet) on a right side of the cab thereby facilitating greater a greater range of positioning for the seat and ease of access compared traditional cabs that dispose electrical modules and wire harnesses in a door panel. An HVAC unit may be disposed on the right hand side of the cab such that the heat and air conditioning cores run parallel with the frame rails. Beneficially, the orientation and location allow for ease of service of the cores, blowers, and other components, and for removal of the filter element.

Figure 20:
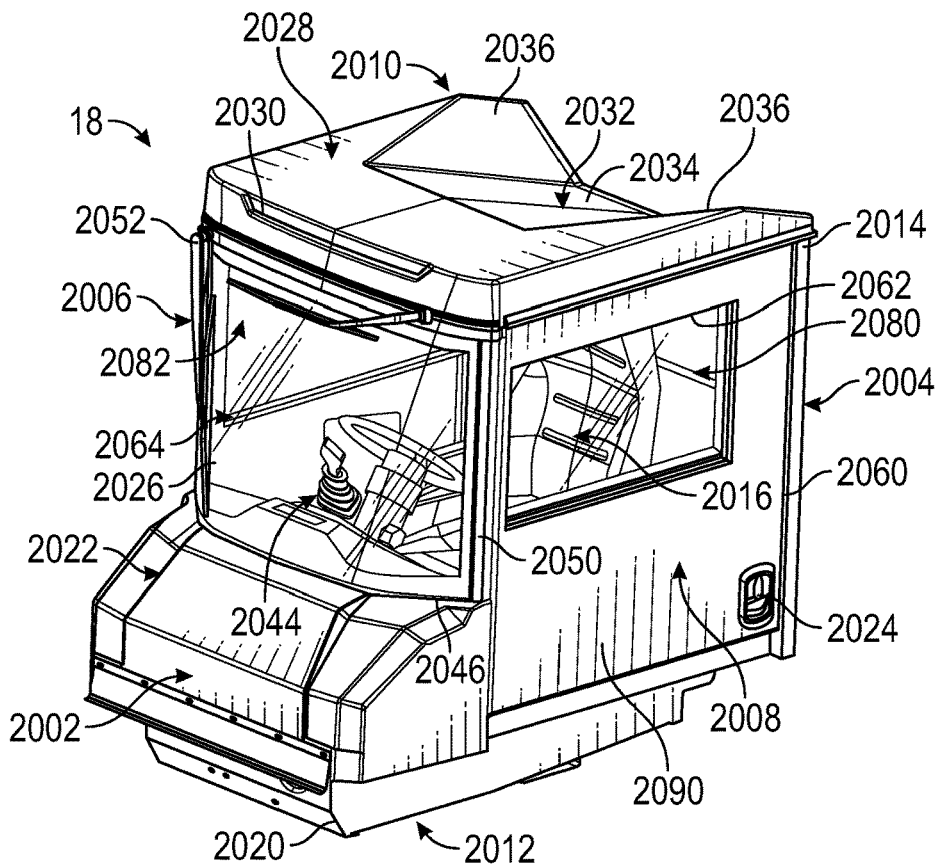
FIGS. 20-22 are various views of a cab of the concrete mixer truck of FIG. 1, according to an exemplary embodiment.
Figure 21:
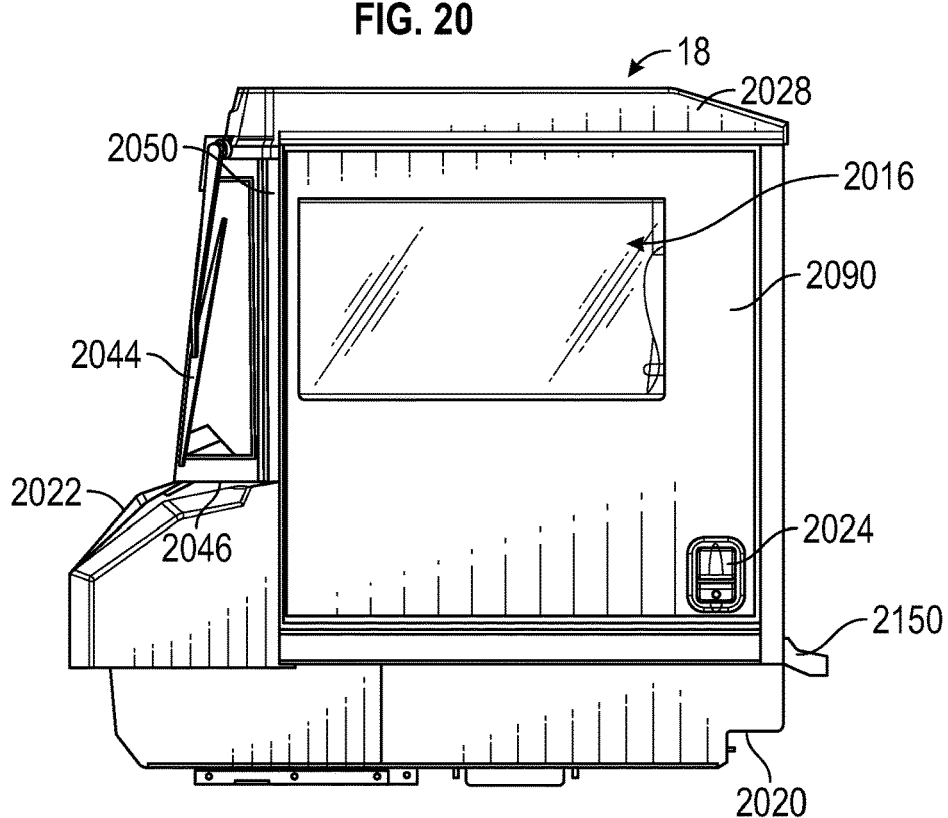
Figure 26:
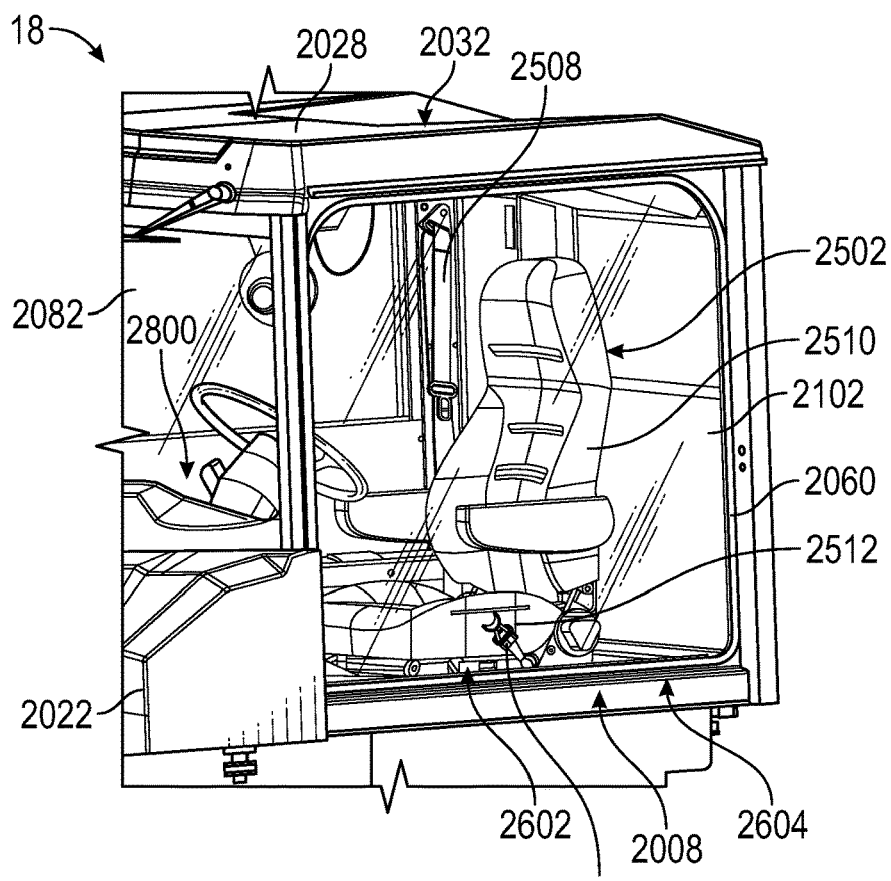
FIGS. 26-29 are various views of an internal cabin within the cab of FIGS. 20-22, according to an exemplary embodiment.
Figure 27:
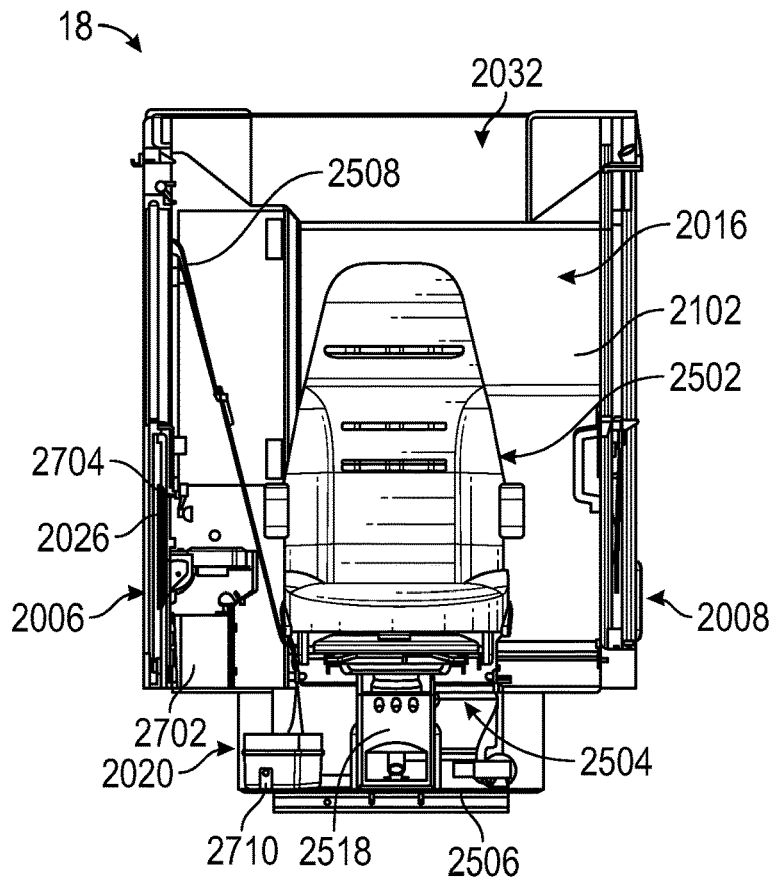

Referring to FIGS. 20 and 21, the cab 18 is shown according to an exemplary embodiment. The cab 18 has a front end 2002, a rear end 2004 disposed longitudinally rearward from the front end 2002, a top end 2010, a bottom end 2012 disposed vertically below the top end 2010, a first end 2008 (e.g., a left side) adjacent the first lateral end 142, and a second end 2006 (e.g., a right side) laterally offset from the first end 2008 and positioned adjacent the second lateral end 144. A cab frame 2014 includes a bottom portion 2020, a hood 2022, a roof 2028, a door frame 2060, a first window frame 2062, a second window frame 2064, a first pillar 2050, and a second pillar 2052. The cab frame 2014 forms an internal cabin 2016 (e.g., an internal volume, a cabin volume, a passenger compartment, etc.) which contains operator components (e.g., user interfaces, a steering wheel, seats, pedals, etc.). The bottom portion 2020 is disposed adjacent the bottom end 2012 and forms the bottom portion of the cab frame 2014. As shown in FIGS. 26 and 27, the bottom portion 2020 includes an internal cavity 2504 that receives a seat 2502 (e.g., operator chair) and form the floor portion 2506 of the cab 18. The bottom portion 2020 is configured to be disposed between the frame rails 40 when the cab 18 is coupled to the chassis 12.

Figure 35:
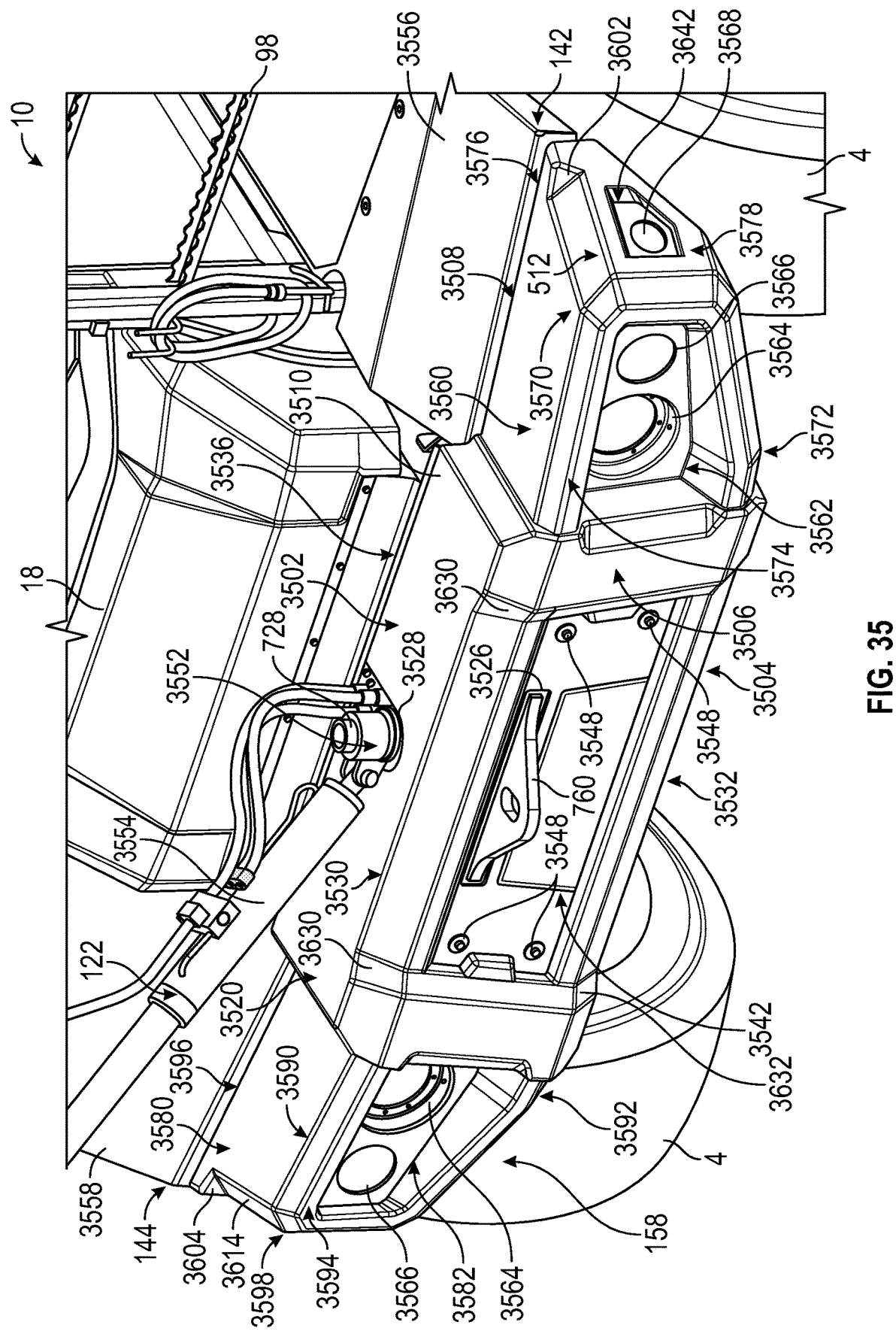
FIGS. 35-41 are various views of a front bumper of the concrete mixer truck of FIGS. 1-3, according to an exemplary embodiment.

The hood 2022 extends from the windshield frame 2046 toward the front end 2002. The hood 2022 may include one or more electrical or mechanical components within. The hood 2022 may be configured to receive a front bumper 158 (e.g., as shown in FIG. 35). The roof 2028 is disposed adjacent the top end 2010 and forms the top portion of the cab frame 2014. The roof 2028 defines a first notch 2030 (e.g., a recess, an indent, etc.) located near the leading edge and a second notch 2032 (e.g., a recess, an indent, etc.) disposed near the trailing edge. The first notch 2030 is configured to provide clearance to a component of the hopper assembly 8. The second notch 2032 is configured to provide clearance for (e.g., not interfere with) the mixing drum 14. The second notch 2032 includes a pair of angled side portions 2036 and an inclined central portion 2034 that are configured to accommodate the round shape of the mixing drum 14. A second window frame 2064 is disposed along the wall 2026 of the cab frame 2014 that extends along the second end 2006. The second window frame 2064 is configured to receive a second window 2082 on the second lateral side 144. The wall 2026 may not be configured to open (e.g., not a door) and forms an end of the internal cabin 2016.

Figure 23:
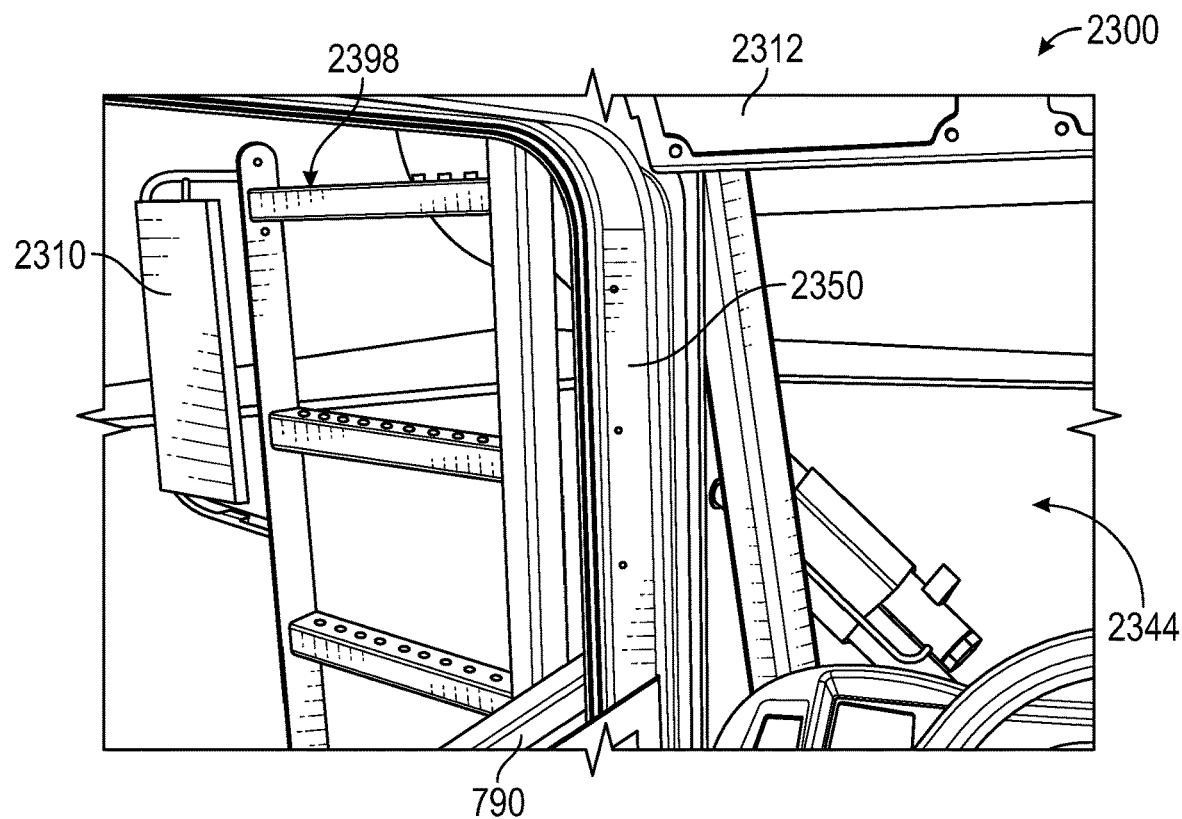
FIG. 23 is an operator view from within an internal cabin of a conventional cab.
Figure 24:
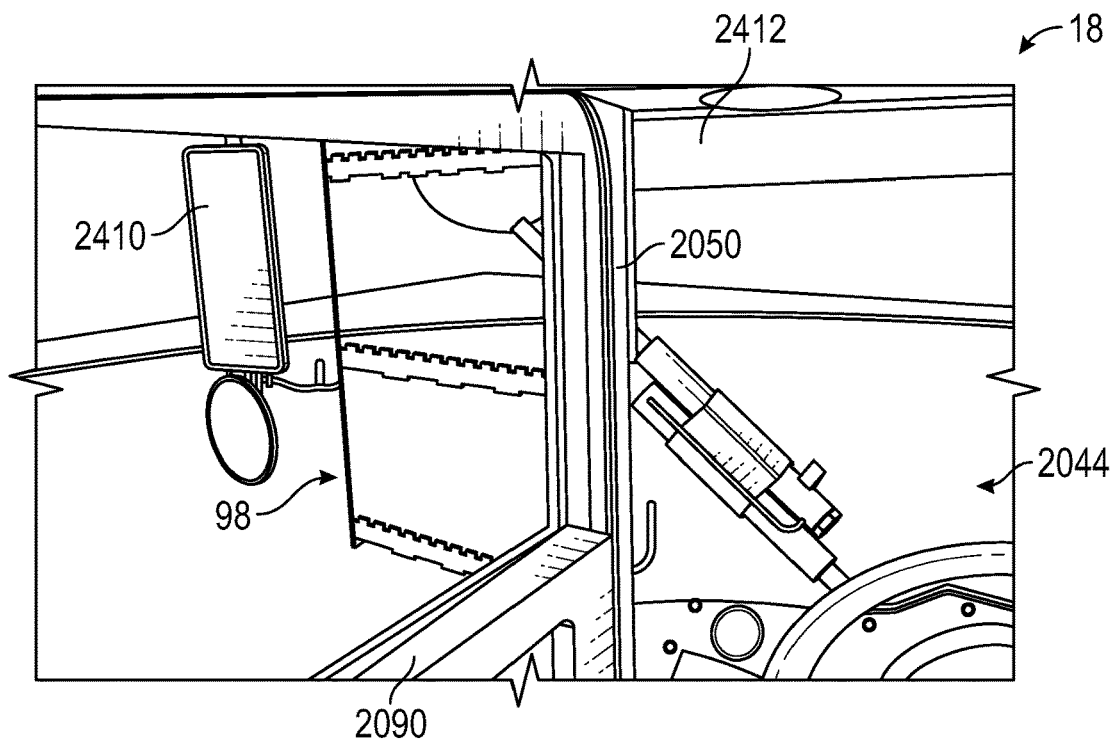
FIG. 24 is an operator view from within an internal cabin of the cab of FIGS. 20-22, according to an exemplary embodiment.

A first pillar 2050 extends from a bottom portion of the roof 2028 substantially vertically downward toward a top portion of the hood 2022. The first pillar 2050 is positioned adjacent the first end 2008. A second pillar 2052 extends from a bottom portion of the roof 2028 substantially vertically downward toward a top portion of the hood 2022. The second pillar 2052 is substantially parallel to the first pillar 2050 and is adjacent the second end 2006. The first pillar 2050 and the second pillar 2052 have a reduced width that improves visibility for an operator in the internal cabin 2016 compared to conventional cab designs that obstruct more of the operator's view. As shown in FIG. 23, a conventional cab 2300 includes a first pillar 2350, a ladder 2398, and a door 790. This arrangement obstructs a relatively large portion of an operator's view through a windshield 2344 and out of a side window. Additionally, the pillar 2350 and the ladder 2398 are positioned such that the side mirror 2310 has an orientation that produces a relatively large number of blind spots. The conventional cab 2300 further includes a relatively tall overhead console 2312. In contrast, the cab 18 is shown in FIG. 24. In the cab 18, the first pillar 2050 and a ladder 98 are configured to obstruct relatively less of the operator's view. The orientation of the side mirror 2410 of the cab 18 produces relatively fewer blind spots. The internal cabin 2016 of the cab 18 includes a shorter overhead console 2412 than the overhead console 2312 of the conventional cab 2300. Accordingly, an operator in the cab 18 can see through more of the windshield 2044 than an operator in the conventional cab 2300 looking through the windshield 2344.

Figure 22:
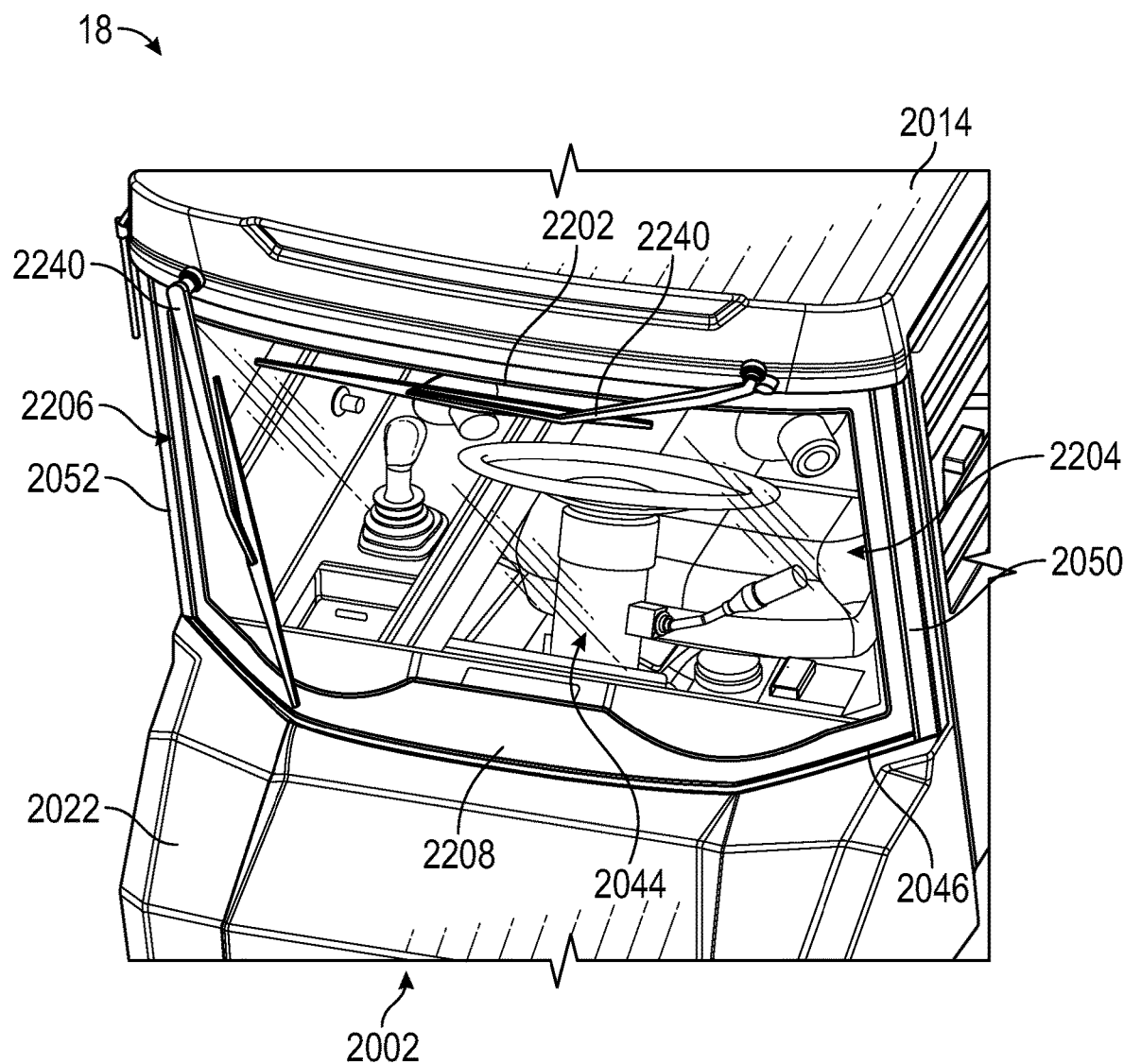

Referring to FIG. 22, the first pillar 2050 and the second pillar 2052 are configured to receive the windshield 2044 therebetween. In some embodiments, a windshield frame 2046 that is similarly shaped to the windshield 2044 extends around the front face of the cab frame 2014 and couples the windshield 2044 to the cab frame 2014. The windshield 2044 is a single piece that includes a first curved portion 2204, a second curved portion 2206, and central portion 2202 disposed between the first curved portion 2204 and the second curved portion 2206. The bottom portion of the central portion 2202 has a sloped portion 2208 that slopes toward the front end 2002 to provide space for an instrument panel 2380 (e.g., shown in FIG. 28). Beneficially, neither the windshield 2044 nor the cab frame 2014 have a front corner structure that is found in conventional cabs. In some embodiments, the windshield maintains an 8" raid to prevent visual distortion and manufacturing issues. A pair of windshield wipers 2240 are pivotally coupled to the cab frame 2014 and configured to remove fluid from an outer portion of the windshield 2044.

Figure 25:
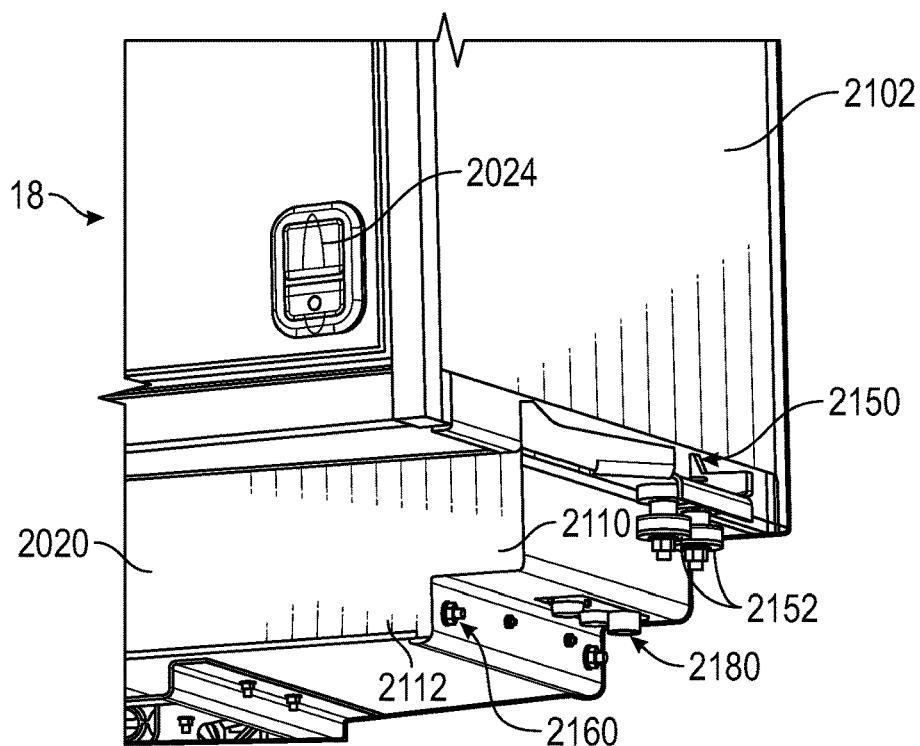
FIG. 25 is a perspective view of a portion of the cab of FIGS. 20-22, according to an exemplary embodiment.

Referring to FIG. 25, a rear perspective view of the cab 18 is shown. A rear cab mount isolator member 2150 including a pair of rear cab mount isolators 2152 extends from a bottom portion of a rear wall 2102 of the cab frame 2014 downward away from the cab 18. The rear cab mount isolators 2152 are configured to couple the cab 18 to the frame 28, the frame rails 40, or another portion of the chassis 12. The rear cab mount isolator member 2150 includes mounting bolts that are accessible from the exterior when installing or removing the cab 18. An electrical bulkhead 2180 extends from the internal cabin 2016, through a surface on an upper section 2110 of the bottom portion 2020. The electrical bulkhead 2180 is configured to route power and data from a location inside the internal cabin 2016 to another location along the concrete mixer truck 10 outside of the internal cabin 2016. In some embodiments, the electrical bulkhead 2180 includes connections that are incorporated into a bracket and located to protect the connections from moisture on the floor portion 2506 from wash water coming down the rear wall 2102 or other surfaces of the cab 18. A seat tether mount 2160 is disposed along a lower section 2112 of the base portion. The seat tether mount 2160 may include one or more fasteners that couple the seat 2502 to the cab frame 2014. In some embodiments, the seat tether mount 2160 incorporated into a bracket with the electrical bulkhead 2180. The upper section 2110 and lower section 2112 are configured to fit along the frame rails 40 and to not interfere with cross members extending laterally along the frame rails 40.

Referring to FIGS. 26 and 27, a side perspective view and a front view, respectively, of the internal cabin 2016 without a door 2090 is shown. The seat 2502 includes a seat bottom 2512 configured to support an occupant's bottom and a seat back 2510 configured to support an occupant's back, head, neck, and/or upper back. A seat belt 2508 is located on the second end 2006 of the cab 18 and selectively extends from an upper section of the second end 2006 downward to a seat belt buckle 2608 positioned the seat bottom 2512 adjacent the first end 2008. Positioning the seat belt 2508 on the second end 2006 instead of the first end 2008 allows the door opening (e.g., door frame 2060) to increase in size to facilitate access when entering or exiting the concrete mixer truck 10. The seat 2502 may be movable along the longitudinal direction between a first position 2602 located proximate a dash 2800 and a second position 2604 proximate to the rear wall 2102 to facilitate unobstructed movement of the occupant throughout the internal cabin 2016. The seat bottom 2512 may be rotatably coupled to the floor portion 2506 by a seat assembly coupling member 2518 (e.g., a frame). The seat assembly coupling member 2518 permits the seat 2502 to selectively be translated in the longitudinal direction and rotated left or right (e.g., about a vertical axis) to accommodate instances where the operator is dispensing concrete through the main chute 46.

A second window handle 2704 is disposed on the wall 2026 and is configured to raise and lower the second window 2082. A side dash 2702 (e.g., a user interface) is disposed adjacent to the seat bottom 2512 and the wall 2026. In some embodiments, the side dash 2702 includes one or more components of an HVAC system. The floor portion 2506 is configured to provide more floor space in the occupant's foot area by cutting out the top flange of the frame rail 40 and changing the geometry of the bottom portion 2020. Additionally, the floor portion 2506 is configured to minimize the width of the lower door tube to shorten the step over distance from the fender step to the floor portion 2506. In some embodiments, the floor portion 2506 is configured to reduce the step over distance by 3.6", which is approximately 50% of conventional cabs 2300. The internal area of the bottom portion 2020 may include an emergency material compartment 2710 or container (e.g., containing a fire extinguisher, a first aid kit, etc.).

Figure 28:
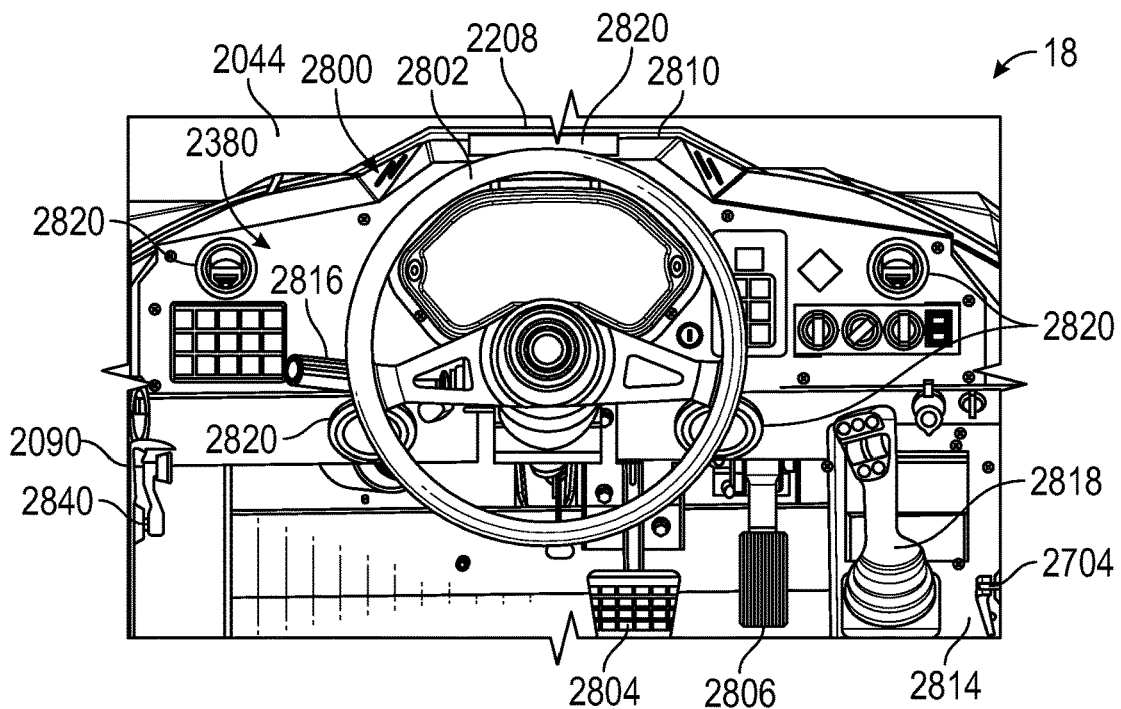
Figure 29:
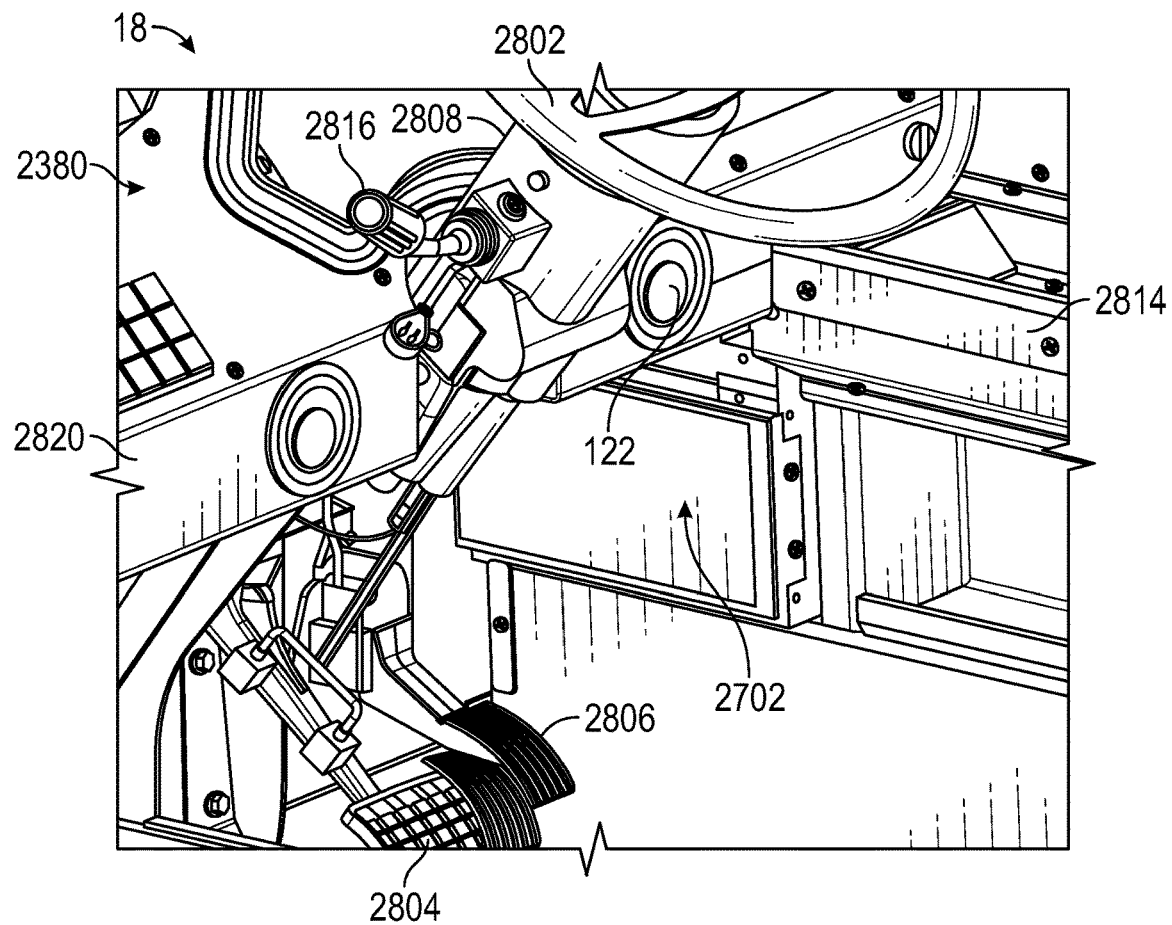

Referring to FIGS. 28 and 29, the dash 2800 (e.g., a user interface) includes an instrument panel 2380. The dash 2800 includes a steering wheel 2802 coupled to a steering column 2808, the instrument panel 2380, a plurality of AC vents 2820, and a sloped portion 2810. The dash 2800 is configured to be shorter compared to conventional dashes, thereby providing a larger area for the windshield 2044 and permitting the operator to view the front bumper 158 when the operator is seated. In some embodiments, the dash 2800 is made of aluminum that is designed to withstand cleaners and a concrete environment. The sloped portion 2810 is configured to match (e.g., have a similar angle to) the sloped portion 2208 that slopes toward the front end 2002 on the windshield. The steering column 2808 includes a lever 2816 (e.g., a shift lever, a turn signal lever, etc.) and includes one or more joints (e.g., universal joints) and shafts. Turning the steering wheel 2802 rotates the universal joints and the shafts, which in turn rotates an input to a steering box or element that actuates the other steering components of the concrete mixer truck 10 to steer the concrete mixer truck 10 in response to an input to the steering wheel 2802. The concrete mixer truck 10 may be controlled by the pressing and depressing of an accelerator pedal 2806 and a brake pedal 2804 disposed near the floor portion 2506. In some embodiments, the instrument panel 2380 may include additional components (e.g., electrical components in a cab area of the vehicle such as dashboard displays, radios, or other components that are configured to enhance operator comfort and monitor/control vehicle operations). These additional components may include radios for communication or entertainment, a camera system configured to provide parking assistance, displays (e.g., dashboard displays for navigation, vehicle speed reporting, health monitoring of electronic equipment, etc.), seat heaters, electric motors for windshield wiper control, an electronic control module for a cruise control system, etc. These components may be disposed between the cab frame 2014 and the internal cabin 2016, may be coupled directly or indirectly to a forward part of the cab frame 2014 proximate to where an operator would be positioned, or may be otherwise positioned along the cab frame 2014.

The side dash 2702 has a top surface 2814 that defines one or more openings and/or includes one or more features to provide accessibility and comfort to the operator, for example, a cup holder, a storage space, and the like. In some embodiments, a joystick 2818 is positioned along the top surface 2814 in a location that is ergonomic and convenient to allow the operator to monitor and control discharge operations with the main chute 46. In some embodiments, the internal portion of the side dash 2702 includes electrical modules and wire harnesses that are packaged therein to allow the seat 2502 slide an additional 1.8 inches. Beneficially, placement of the electrical modules and wire harnesses in the side dash 2702 alleviate the need to store such components in the door 2090.

Figure 30:
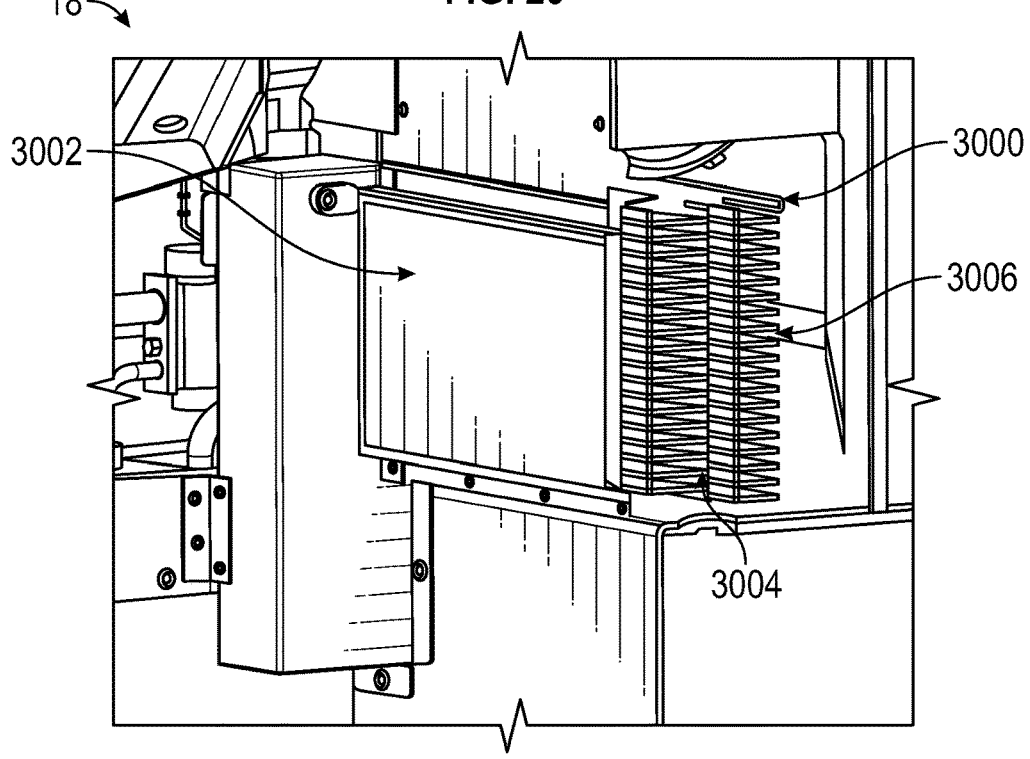
FIG. 30 is a detailed view of a portion of a HVAC system positioned in the internal cabin FIGS. 26-29, according to an exemplary embodiment.
Figure 31:
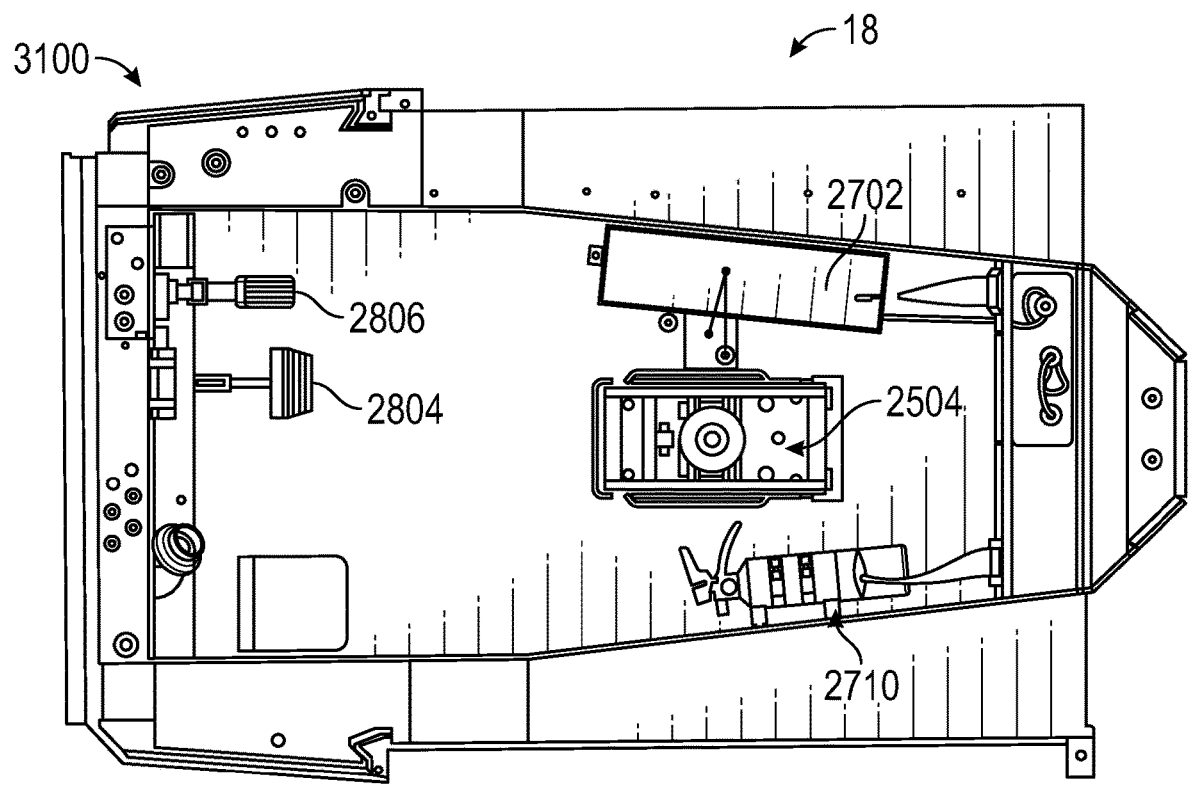
FIG. 31 is a cross-sectional bottom view of the cab of FIGS. 20-22, according to an exemplary embodiment.

In some embodiments, as shown in FIG. 30, the side dash 2702 includes an HVAC unit 3000 that is configured to control the heating and cooling operations within the cab 18. The HVAC unit 3000 includes an air filter 3002, an AC core 3004 (e.g., an evaporator), and a heater core 3006 (e.g., a radiator). The AC core 3004 is accessible without removing the heater core 3006, which allows operators to add AC as a service kit and facilitates service of both the AC core 3004 and the heater core 3006 without removing the HVAC unit 3000. Additionally, the orientation and placement of the HVAC unit 3000 facilitates ease of access to and replacement of the air filter 3002. FIG. 31 is a cross-sectional bottom plan view 3100 of the cab 18.

Figure 32:
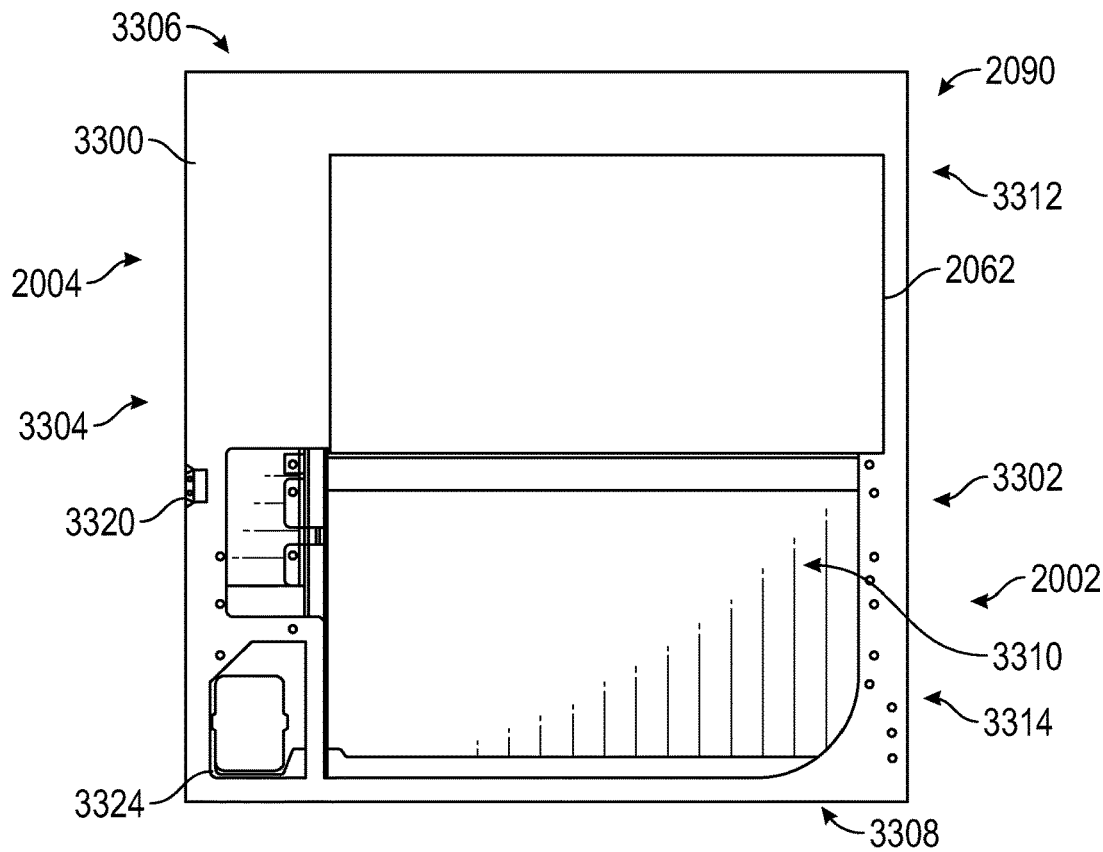
FIG. 32 is an exterior side view of a door of the cab of FIGS. 20-22, according to an exemplary embodiment.

Referring to FIG. 32, the door 2090 has a door frame 3300 a door front end 3302 adjacent the front end 2002, a door rear end 3304 disposed longitudinally rearward from the front door end and adjacent the rear end 2004, a door bottom end 3308, and a door top end 3306 disposed vertically above from the door bottom end 3308. The first window frame 2062 is disposed in a top portion 3312 of the door frame 3300. The first window frame 2062 is configured to receive the first window 2080 or a similar transparent portion (e.g., as shown in FIG. 20). The first window 2080 facilitates the operator seeing out of the side of the internal cabin 2016. In some embodiments, the first window 2080 is made from glass. The first window 2080 is held in place relative to the door 2090 by the first window frame 2062. The first window frame 2062 may clamp the first window 2080, provide a recess in which the first window 2080 resides, fasten to the first window 2080, or otherwise couple to the first window 2080.

The door 2090 is rotatably coupled to the first pillar 2050 or adjacent surface of the cab frame 2014 through a pair of hinges that connect to a set of apertures. In some embodiments, a spring and/or damper is coupled to both the door 2090 and the first pillar 2050 and is configured to provide a damping force and/or a biasing force to assist an operator in opening or closing the door 2090. By way of example, the spring may provide a biasing force to assist the operator in opening the door 2090. By way of another example, the spring may provide a dampening force to prevent the door 2090 from swinging open or closed too quickly.

Figure 33:
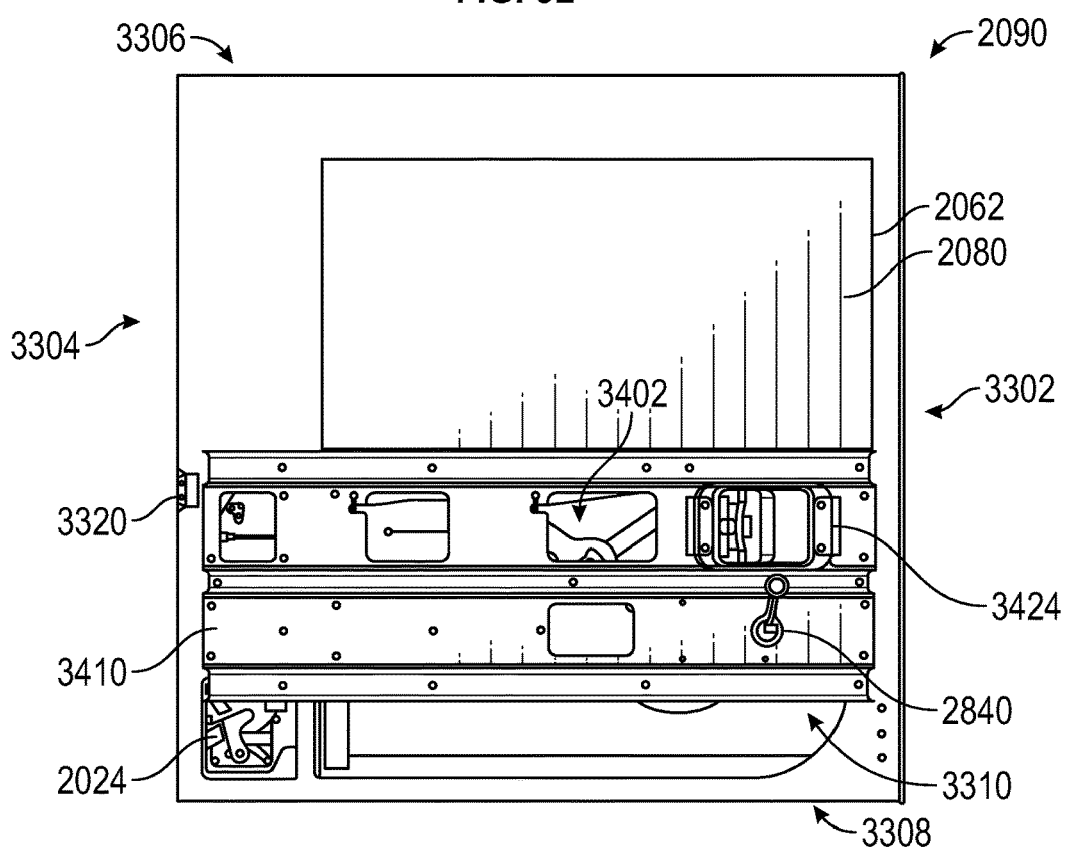
FIG. 33 is an interior side view of the door of FIG. 32, according to an exemplary embodiment.

Referring to FIGS. 32 and 33, the lower portion 3314 of the door frame 3300 includes a door cavity 3310 and a latch assembly frame 3324. The latch assembly frame 3324 is configured to receive a lower latch assembly 2024 or lock assembly. The lower latch assembly 2024 may include a handle that can be pulled to open a latch 3320. The lower latch assembly 2024 may be disengaged (e.g., unlatched) from outside of the cab 18 to selectively provide access to an interior of the internal cabin 2016. In some embodiments, the lower latch assembly 2024 is additionally configured to be selectively locked such that unauthorized access is prevented (e.g., the latch 3320 cannot be moved to an open position unless a user provides an indication of authorization, such as a key). As shown in FIG. 33, a panel 3410 extends from the door front end 3302 to the door rear end 3304 and covers a portion of the door cavity 3310. The panel 3410 is configured to provide structural support for one or more components in or around the door cavity 3310. An upper latch assembly 3424 is coupled to and accessible through a portion of the panel 3410. The upper latch assembly 3424 may include a handle that can be pulled to open the latch 3320. The upper latch assembly 3424 is disengaged from an interior of the internal cabin 2016 to provide access to an exterior of the internal cabin 2016. The latch 3320 is positioned centrally along the door rear end 3304 and is configured to selectively prevent opening of the door 2090. The latch 3320 is operably connected to an access assembly 3402 that is configured to unlatch and latch the latch 3320. The access assembly 3402 includes one or more levers, shafts, paddles, and linkages that transfer motion from the lower latch assembly 2024 and/or the upper latch assembly 3424 to unlatch the latch 3320. The access assembly 3402 may additionally or alternatively transfer motion between the lower latch assembly 2024 and the upper latch assembly 3424. In other words, the upper latch assembly 3424 and the lower latch assembly 2024 are actuated between the engaged and disengaged positions by a series of linkages connected to a link or lever, shown as access assembly 3402. In some embodiments, the access assembly 3402 is coupled to a paddle such that when a handle link in the access assembly 3402 rotates clockwise, the paddle rotates to the engaged (e.g., locked) position and when the handle link in the access assembly 3402 rotates clockwise, the paddle rotates to the disengaged (e.g., unlocked) position. When the latch 3320 is engaged, the door 2090 is unable to be opened, conversely, when the latch 3320 is disengaged, the door 2090 is able to swing open freely.

Figure 34:
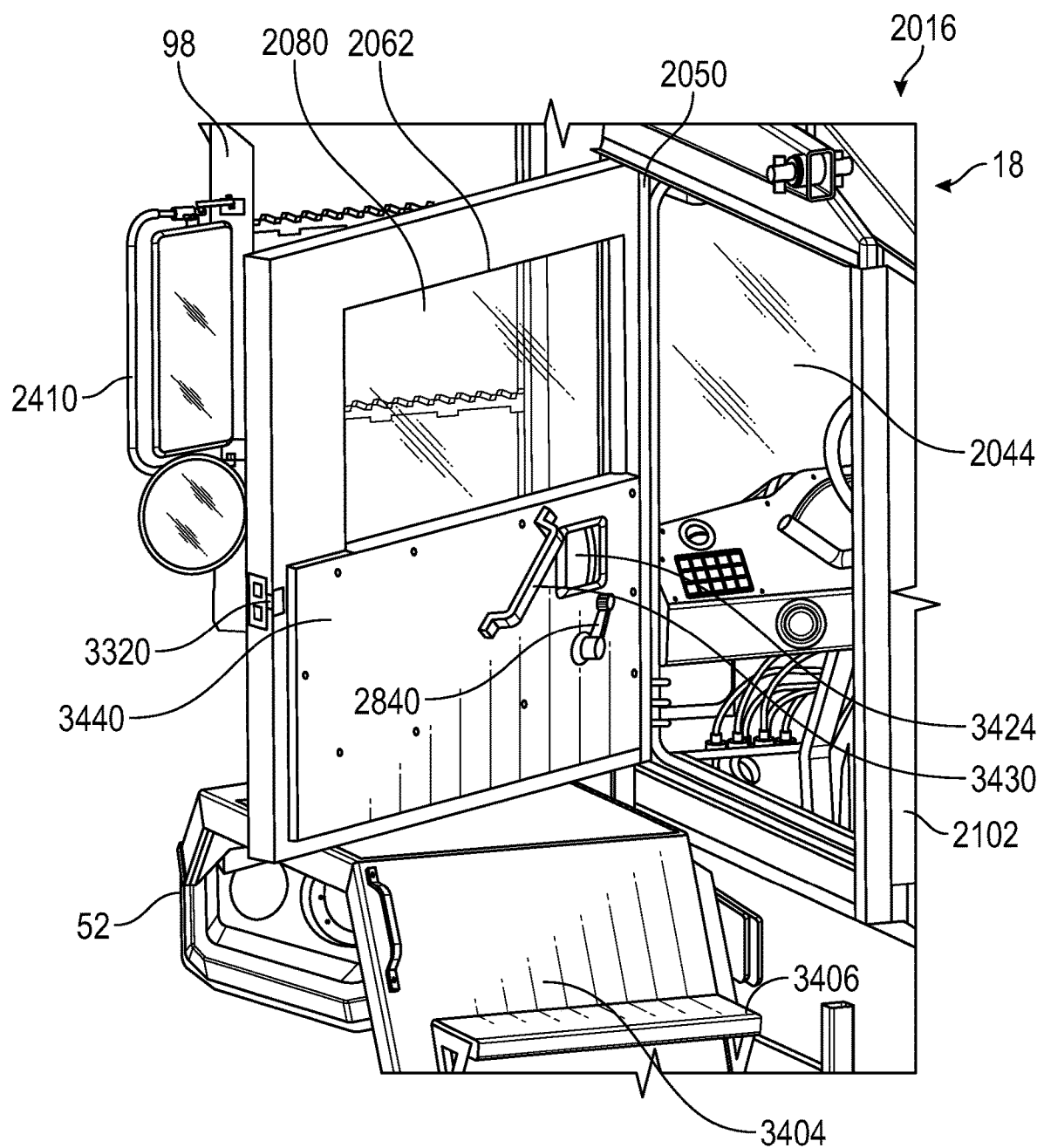
FIG. 34 is a rear perspective view of the door of FIGS. 32 and 33 coupled to the cab of FIGS. 20-22 in an open position, according to an exemplary embodiment.

As shown in FIG. 33, a panel 3410 extends from the door front end 3302 to the door rear end 3304 and covers a portion of the door cavity 3310. A first window handle 2840 is disposed on the panel 3410, toward the door front end 3302, and is configured to raise and lower a window within the first window frame 2062. Referring to FIG. 34, a plate 3440 or panel is installed over the lower portion 3314 of the door frame 3300 such that only the first window handle 2840, the upper latch assembly 3424, and a grip 3430 (e.g., a handle) are accessible from an interior side of the door 2090. The grip 3430 is an interface member that provides an operator with an interface through which to apply a pulling or pushing force to open or close the door 2090. As shown, the grip 3430 extends from the interior surface of the door 2090, forming a loop. The grip 3430 may also be used to support an operator entering the cabin by climbing a step 3406 along a wheel frame 3404. The plate 3440 and panel 3410 may be removable to facilitate access to the components in the door cavity 3310. In some embodiments, the door 2090 is fully sealed and implements aluminum extrusions. In those embodiments, a center extrusion may be configured to keep water out of the area that houses the lower latch assembly 2024 and other components to prevent corrosion issues. Linkages of the access assembly 3402 may be sealed with grommets to prevent water from entering the door 2090.

Bumper

As a general overview, the front bumper 158 is formed as a unitary, single piece. Due to the single piece design, the front bumper 158 eliminates the need for the assembly of deck plates, steering gear covers, and other multi-component bumper assemblies. This provides for the simplified installation and removal of the front bumper 158, improving accessibility and serviceability to steering gears and hydraulic components of the concrete mixer truck 10. The front bumper 158 is mounted directly to the front cross-member 700. The front bumper 158 includes outer corners and sides that are chamfered and that extend rearward to increase clearance during turns and while operating other components near the front bumper 158. The front bumper 158 is configured to provide sufficient clearance to allow for a full 180-degree swing of the main chute 46 in a lowered state (e.g., a dispensing position). The front bumper 158 incorporates surfaces that are angled downward and configured to shed water and concrete debris to prevent damage and buildup of material, dirt, concrete, or other debris. The front bumper 158 includes a plurality of light surfaces and apertures that are recessed to protect the lights disposed therein from debris.

Figure 37:
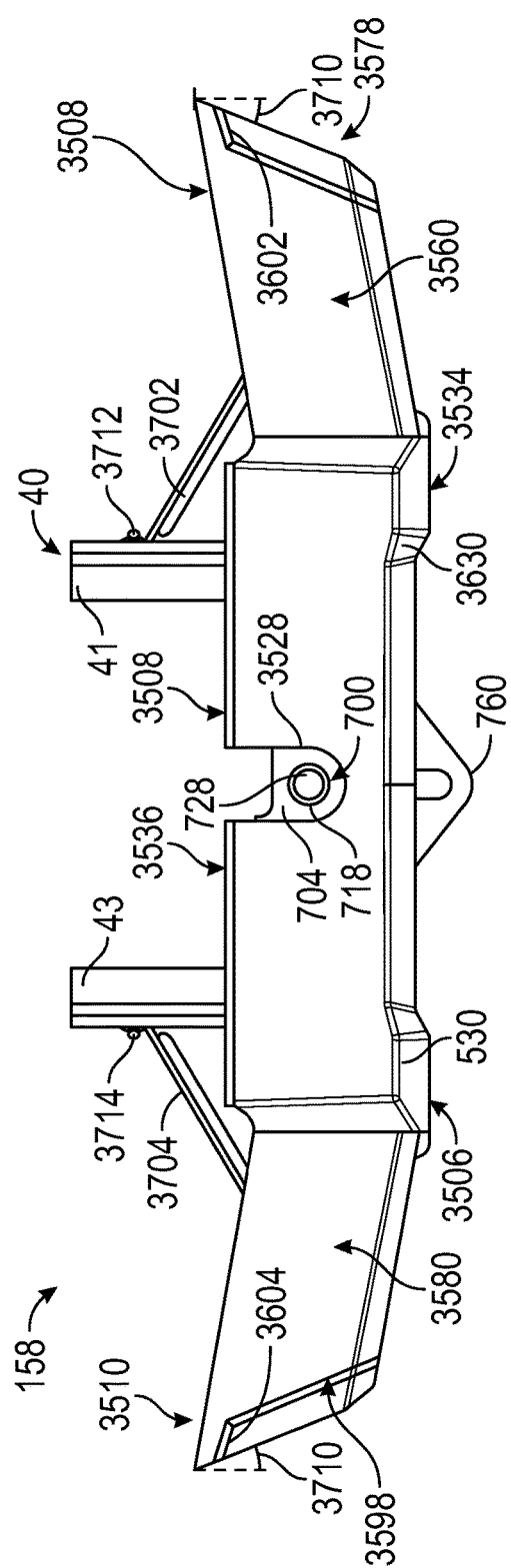
Figure 38:
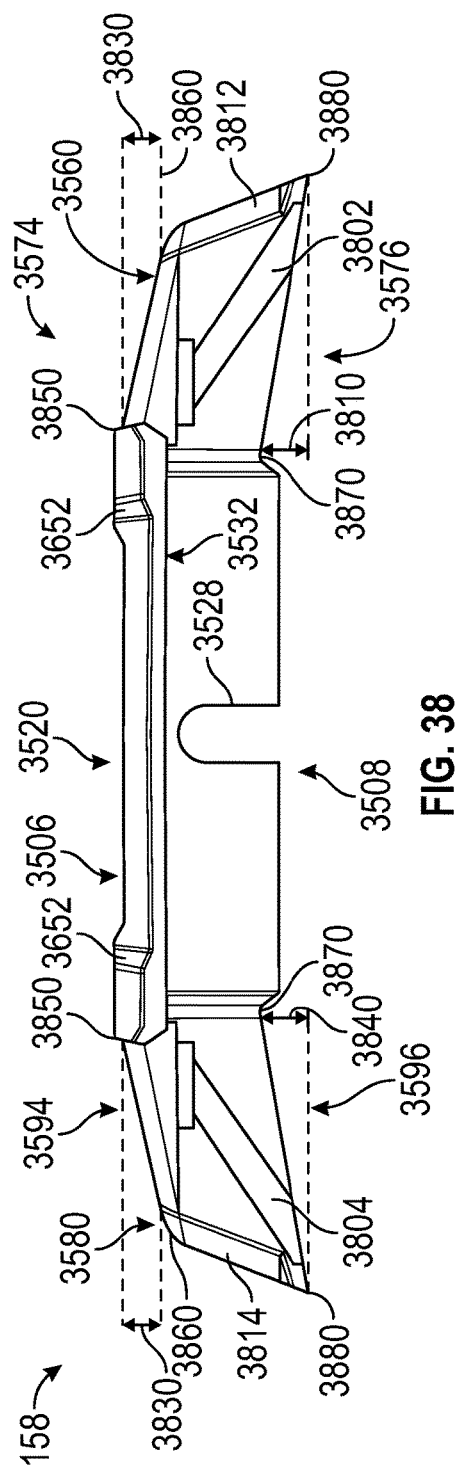
Figure 39:
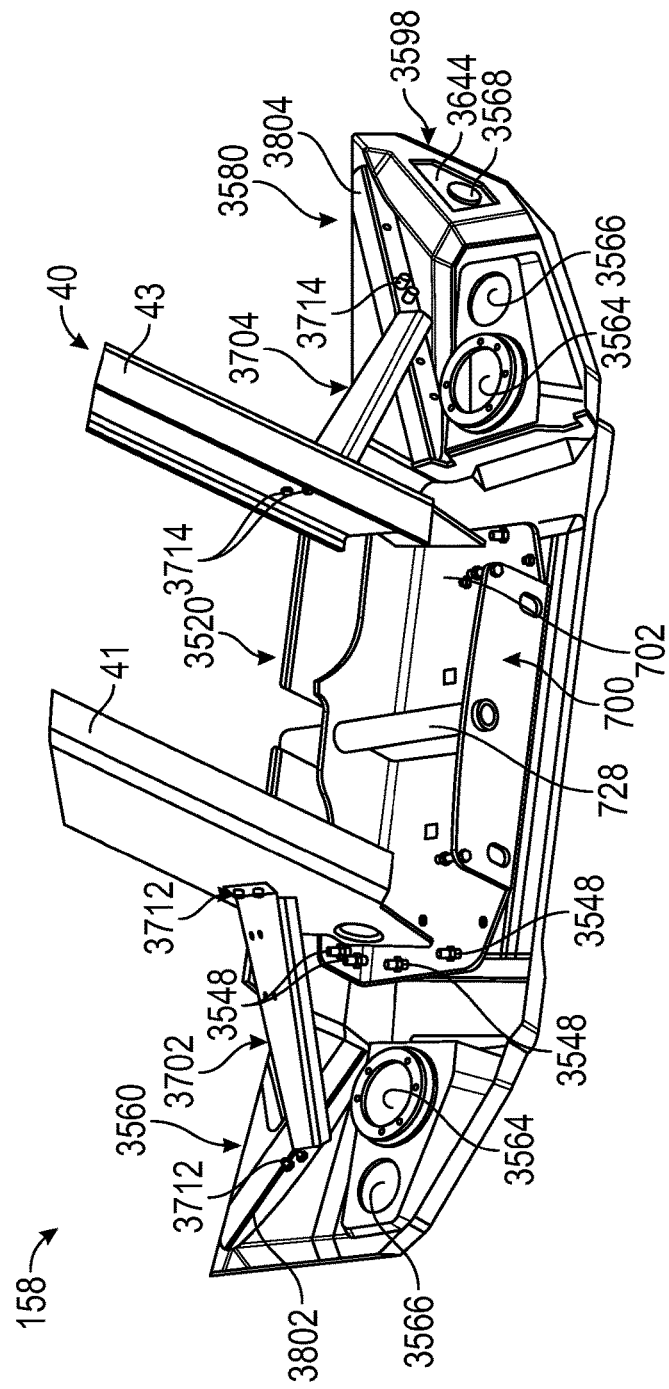
Figure 42:
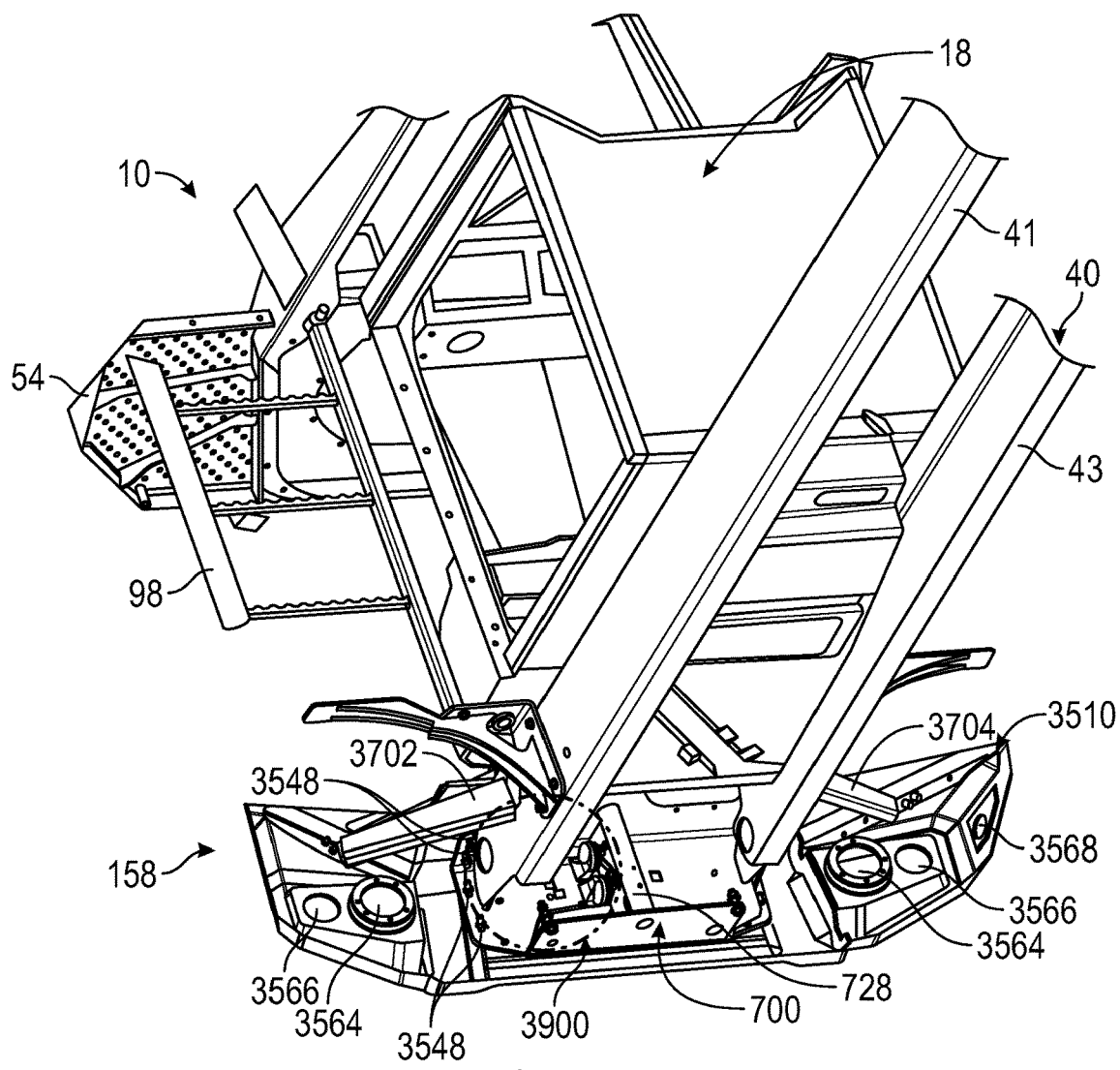
FIG. 42 is a rear perspective view of the front bumper of FIGS. 35-41 with a noise emitting system, according to an exemplary embodiment.

Referring now to FIGS. 35-42, the front bumper 158 is shown, according to an exemplary embodiment. Contrary to conventional front bumpers that are designed by incorporating multiple components and pieces bolted together to form a bumper assembly, the front bumper 158 is formed as a unitary, single piece. Due to the single piece design, the front bumper 158 eliminates the need for the assembly of deck plates, steering gear covers, and other multi-component bumper assemblies. As shown in FIGS. 39 and 42, the front bumper 158 is mounted directly to the front cross-member 700 of the chassis 12, which may improve forward and downward visibility of an operator of the concrete mixer truck 10 from the cab 18. In one embodiment, the front bumper 158 includes structural elements configured to absorb energy in an impact.

As shown in FIGS. 35-40 and 42, the front bumper 158 includes a bumper frame 3510 that is formed as a single piece (e.g., a single, discrete unit). The bumper frame 3510 includes a top bumper end 3502, a bottom bumper end 3504 disposed axially away from the top bumper end 3502, a front bumper end 3506 adjacent the front end 22 of the chassis 12, and a rear bumper end 3508 disposed longitudinally away from the front bumper end 3506 and adjacent the cab 18. The bumper frame 3510 includes (e.g., is formed with) outer corners and sides including a first side portion 3560 and a second side portion 3580 that are chamfered and extending (e.g., pulled) toward the rear end 24 of the chassis 12 to increase clearance during turns and while operating other components (e.g., the main chute 46, the extension chute 48, etc.) near the front bumper 158. According to an exemplary embodiment, the front bumper 158 provides a greater clearance than that of a conventional front bumper (e.g., a conventional bumper 160 is shown with a dotted line in FIG. 41). For example, the front bumper 158 is configured and positioned to provide the clearance sufficient to allow for a wide variety of movement of the main chute 46 in a lowered state (e.g., dispensing state), such that the main chute 46 may rotate a full 180-degrees between the first lateral side 142 and the second lateral side 144 while at a lowered depression angle.

As shown in FIGS. 35-39 and 42, the bumper frame 3510 has a central portion 3520 that is centrally positioned, the first side portion 3560 extending from the central portion 3520 in a direction toward the first lateral side 142 (e.g., direction that is left of an operator seated in the cab 18), and the second side portion 3580 extending from the central portion 3520 in a direction toward the second lateral side 144 (e.g., direction that is right of an operator seated in the cab 18). The central portion 3520, the first side portion 3560, and the second side portion 3580 are configured (e.g., shaped) to provide clearance around a wide variety of vehicle components. For example, the first side portion 3560 is configured to fit in front of a first wheel covering 3556 and the second side portion 3580 is configured to fit in front of a second wheel covering 3558 when the bumper frame 3510 is coupled with a front cross-member 700, or similar cross-member. In some embodiments, the bumper frame 3510 is designed to satisfy or exceed various regulatory requirements (e.g., the Pennsylvania DOT (PennDOT) requirements for a front underride, etc.).

Figure 40:
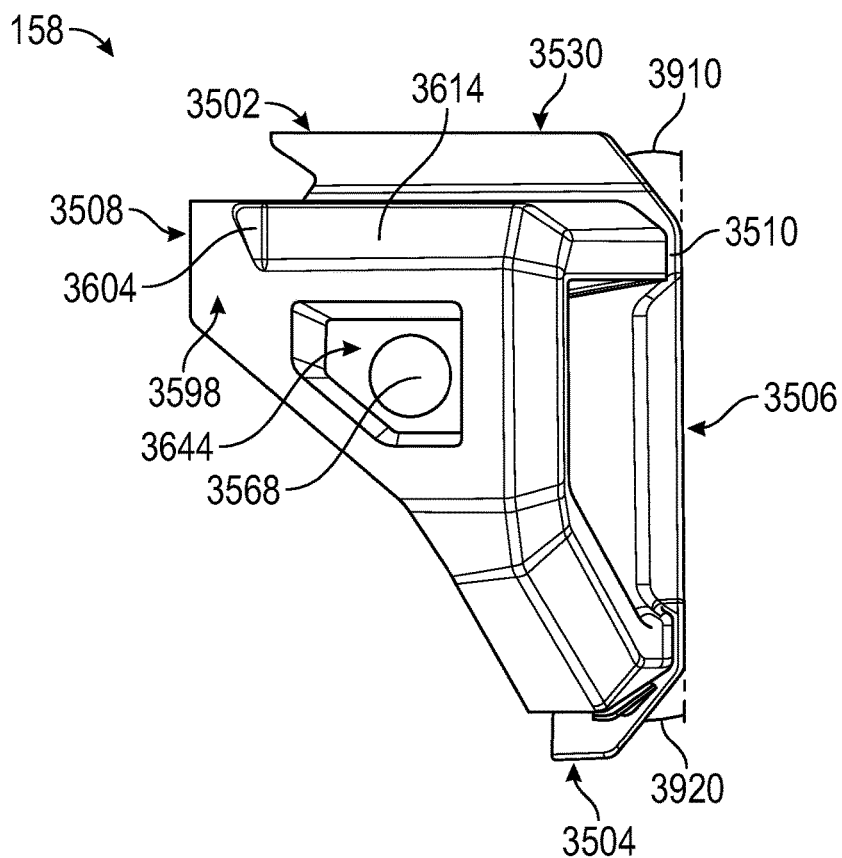
Figure 41:
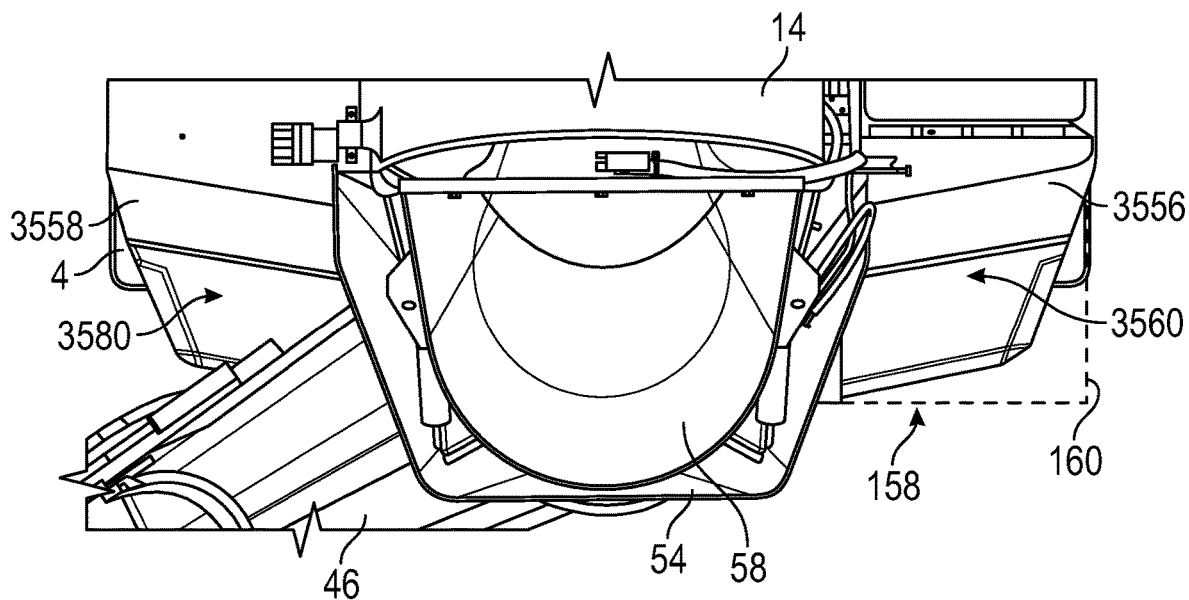

As shown in FIGS. 35-38 and 40, the central portion 3520 includes a central top end 3530, a central bottom end 3532 disposed axially away from the central top end 3530, a front central end 3534 adjacent the front end 22, and a rear central end 3536 disposed longitudinally away from the front central end 3534 and adjacent the cab 18. The central top end 3530 extends equal to (e.g., same height as) the top bumper end 3502, the central bottom end 3532 extends equal to (e.g., same height as) the bottom bumper end 3504. As shown in FIG. 35, the front central end 3534 defines a central recessed portion 3542. As shown in FIGS. 35 and 40, the central top end 3530 is angled outward as the surface extends downward toward the central recessed portion 3542 at an angle 3910 and the central bottom end 3532 is angled outward at an angle 3920 as the surface extends upward toward the central recessed portion 3542. As shown in FIG. 40, the angle 3920 may be similar to the angle 3910. In some embodiments, the angle 3910 or angle 3920 may be at any angle in the range of 30 degrees to 50-degrees with respect to a horizontal plane. As shown in FIG. 35, the sides of the central recessed portion 3542 are angled outward as the surface extends outward toward the first side portion 3560 and second side portion 3580, respectively. The surfaces are angled and configured to shed water and debris to prevent damage and build-up of material, dirt, concrete, and other debris.

As shown in FIGS. 35, 37, and 38, the central top end 3530 defines an actuator slot 3528. The actuator slot 3528 is configured to receive the actuator shaft 728. As shown in FIG. 39, the actuator shaft 728 is connected to the front cross-member 700. The actuator shaft 728 is configured to provide support to the first chute actuator 122 coupled to the main chute 46. An end 3552 of the first chute actuator 122 is coupled to the top of the actuator shaft 728 to pivotally couple the actuator body 3554 of the first chute actuator 122 to the actuator shaft 728 to allow the first chute actuator 122 to move the main chute 46 around the front 180-degrees portion of the concrete mixer truck 10.

Figure 44:
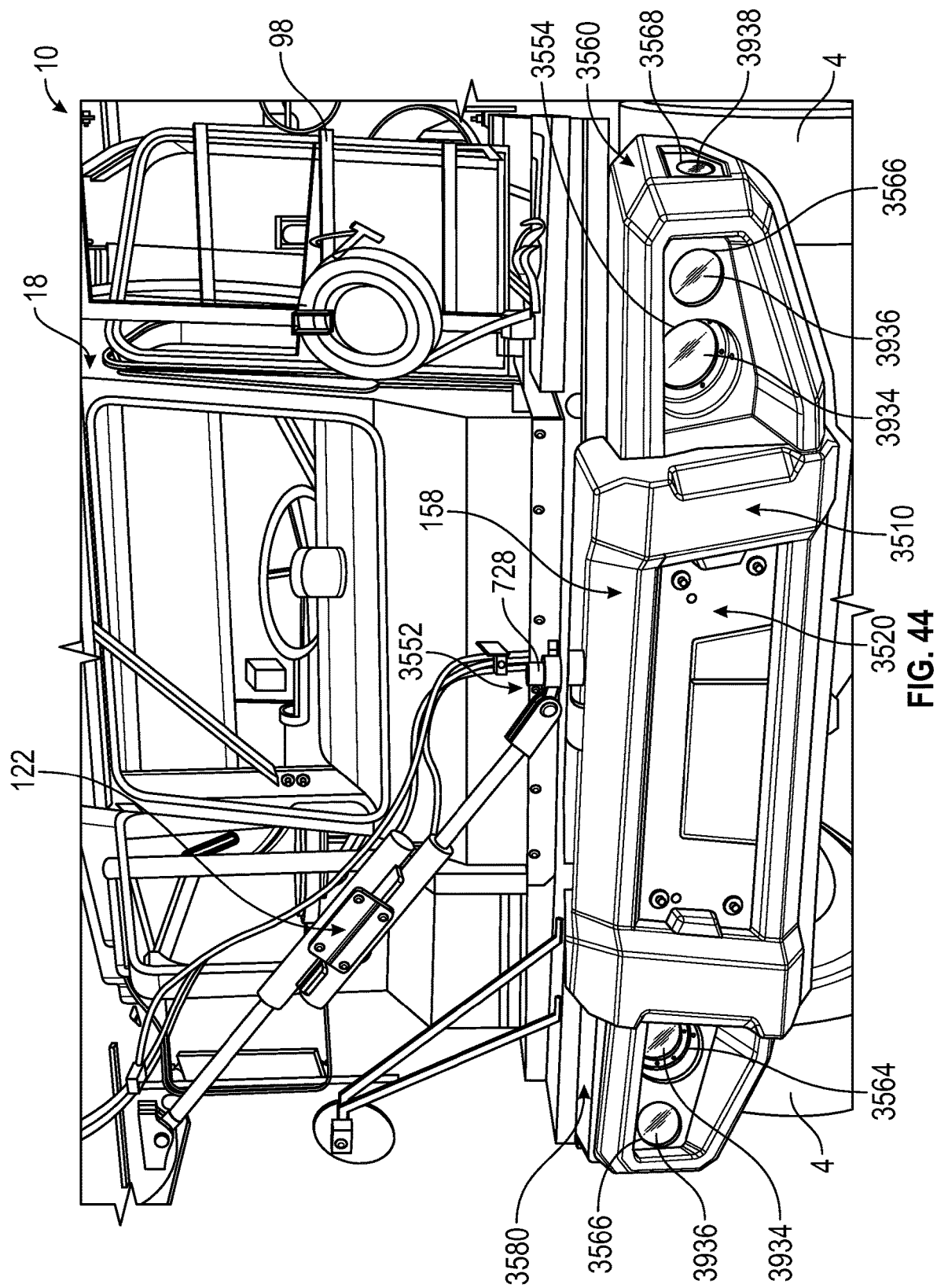
FIGS. 44 and 45 are various views of a front bumper of the concrete mixer truck of FIGS. 1-3, according to another exemplary embodiment.
Figure 45:
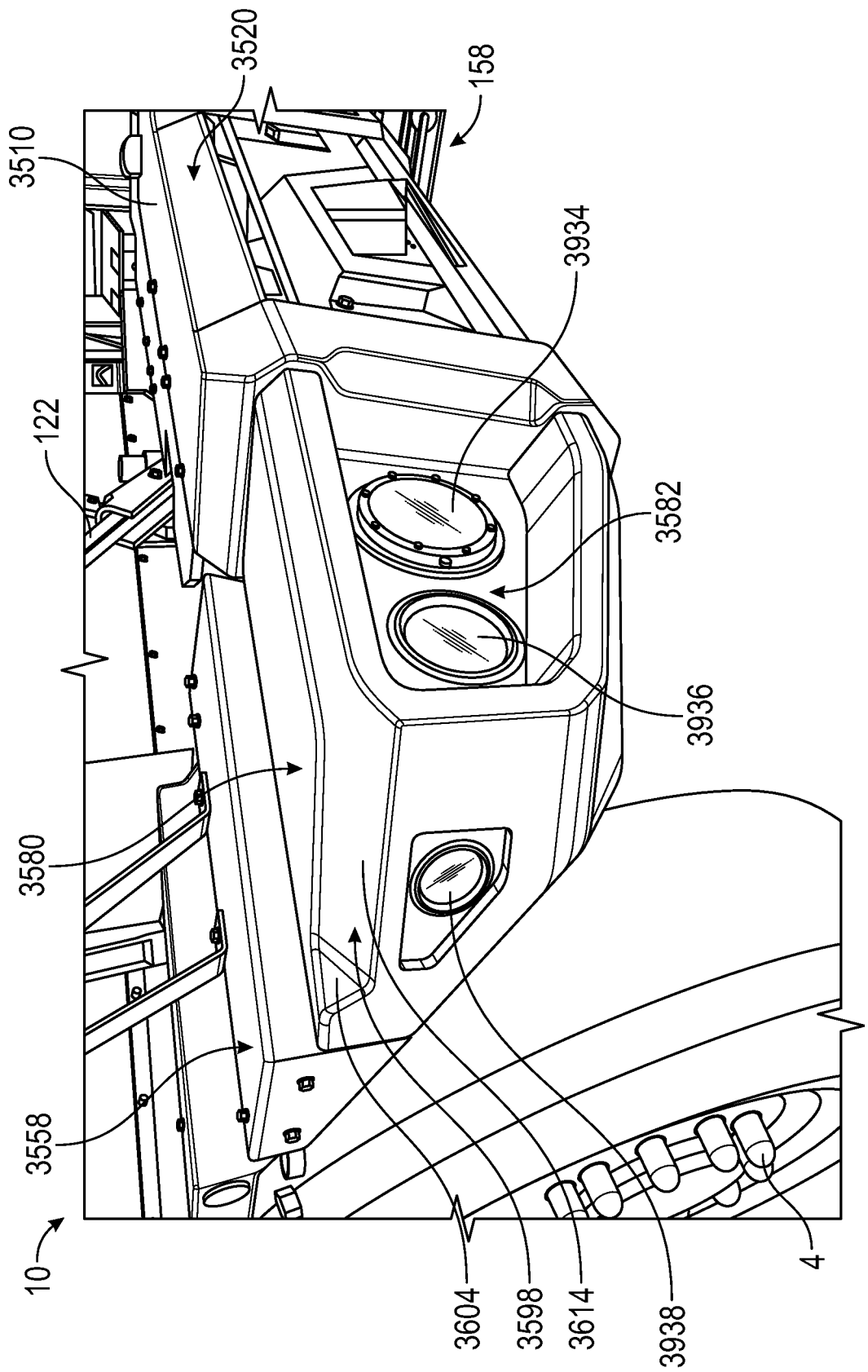

As shown in FIGS. 39 and 42, the central recessed portion 3542 is configured to receive the front cross-member 700 of the chassis 12 along an internal portion/wall of the central recessed portion 3542. As shown in FIG. 39, the base 702 of the front cross-member 700 is coupled to the central recessed portion 3542. The front cross-member 700 may be made from various materials (e.g., steel, aluminum, etc.) with various cross-sections (e.g., square tube, C-channel, angle, etc.). As shown, the base 702 is coupled to the central recessed portion 3542 at four locations with by fasteners, shown as coupling members 3548, such that the coupling members 3548 extend through the central recessed portion 3542 and the base 702. In some embodiments, four additional coupling members 3548 are used to couple a portion of the front cross-member 700, or a connected component, to an internal portion of the central top end 3530. In other embodiments, the front cross-member 700 is otherwise coupled (e.g., welded, bolted, etc.) to the front cross-member 700. As shown in FIG. 35, the central recessed portion 3542 defines an aperture, shown as lift member slot 3526, configured to receive the receiver 760 of the front cross-member 700. The receiver 760 may be used to affix, couple, or attach additional components or tools to the concrete mixer truck 10. By way of example, the receiver 760 may be coupled to a chain or strap to tow the concrete mixer truck 10, or the receiver 760 may be coupled to a jack or other lift device to lift the concrete mixer truck 10. In some embodiments, the central recessed portion 3542 may not include the lift member slot 3526, as shown in FIGS. 44 and 45.

Figure 36:
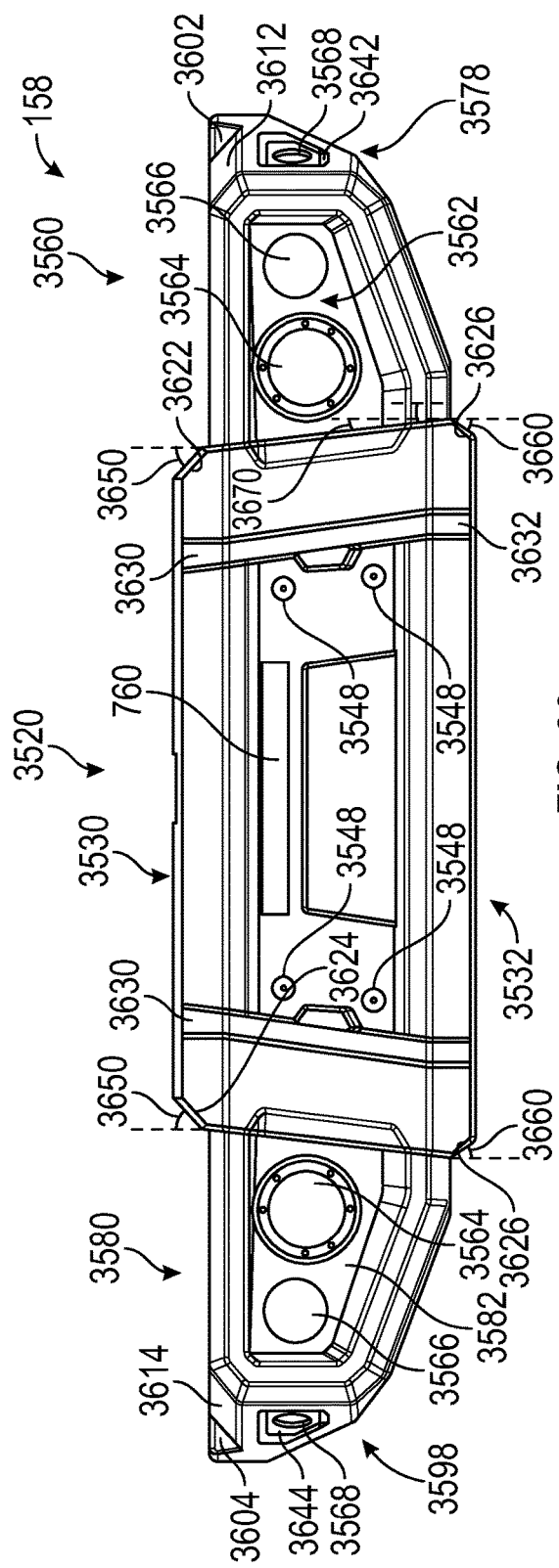

As shown in FIG. 36, the central top end 3530 may be narrower than the central bottom end 3532 such that the connecting outer surface of the central top end 3530 and the central bottom end 3532 has an angle 3670. In other words, the width of the central top end 3530 is shorter than the width of the central top end 3530 such that an angle 3670 is formed on each end due to the differences in width. In some embodiments, the angle 3670 is between 36-degrees and 15-degrees with respect to a normal axis. In other embodiments, a wide variety of widths, including the central top end 3530 being wider than the bottom central end, may be implemented within the central portion of the bumper frame 3510. The central top end 3530 may have angled end surfaces 3624 that are oriented at an angle 3650 with respect to the normal axis. Similarly, the central bottom end 3532 may have angled end surfaces 3626 that are oriented at an angle 3660 with respect to the normal axis. The central portion 3520 may include a pair of upper angled surfaces 3630 that transition an upper surface of the central portion 3520 outward to another surface at an angle. Similarly, the central portion 3520 may include a pair of lower angled surfaces 3632 that transition a lower surface of the central portion 3520 outward to another surface at an angle.

The first side portion 3560, which is disposed laterally outward from the central portion 3520 in the direction of the first lateral side 142 (e.g., to the left of an operator seated in the cab 18), includes a side top end 3570, a side bottom end 3572, a side front end 3574, and side rear end 3576. As shown in FIG. 38, the side front end 3574 is an angled surface with a first front end 3850 and a second front end 3860 displaced a distance 3830 longitudinally rearward from the first front end 3850 toward the rear bumper end 3508. The side rear end 3576 is an angled surface with a first back end 3870 and a second back end 3880 displaced a distance 3840 longitudinally rearward from the first back end 3870 toward the rear bumper end 3508. Additionally, the side rear end 3576, which extends out to the second back end 3880, is wider than the side front end 3574, which extends out to the second front end 3860. As shown in FIGS. 35 and 36, a recessed portion 3562 is disposed on the side front end 3574 of the first side portion 3560. The recessed portion 3562 defines a first light aperture 3564 and a second light aperture 3566 configured to receive a first light and a second light, respectively. In some embodiments, the first light aperture 3564 is inset from the surface of the recessed portion 3562 toward the rear bumper end 3508.

The top side of the first side portion 3560 includes an angled side portion 3578. The angled side portion 3578 includes a top angled surface 3612, a bottom angled surface 3812, and a side recessed portion 3642 disposed on a surface that extends from the outermost edge of the top angled surface 3612 and the bottom angled surface 3812. The side recessed portion 3642 includes a third light aperture 3568 configured to receive a third light. The top angled surface 3612 extends from the top portion of the second front end 3860 toward the top portion of the second back end 3880. Similarly, a bottom side of the first side portion 3560 includes the bottom angled surface 3812 that extends from the bottom portion of the second front end 3860 toward the bottom portion of the second back end 3880. The top angled surface 3612 includes a notch 3602 or angled surface near the side rear end 3576. In some embodiments, the notch 3602 extends from the top angled surface 3612 upward to align with the first wheel covering 3556 such that the two portions are substantially flush. As shown in FIG. 37, the top angled surface 3612 extends at an angle 3710 with respect to a longitudinal axis. The angle 3710 may be in the range of 20-degrees to 40-degrees.

As shown in FIG. 38, the first side portion 3560 includes a first coupling surface 3802 that extends from an internal surface of the side front end 3574 to an internal surface of the top angled surface 3612. As shown in FIG. 39, the first side portion 3560 is configured to couple with a first brace 3702 using a plurality of first brace coupling members 3712 or fasteners. The first brace 3702 is coupled to a portion of the frame rail 40 with the plurality of first brace coupling members 3712. The first brace 3702 provides additional support to the front bumper 158 through the connection with the side panels of the frame rail 40.

The second side portion 3580, which is disposed laterally away from the central portion 3520 in the direction of the second lateral side 144, includes a side top end 3590, a side bottom end 3592, a side front end 3594, and side rear end 3596. As shown in FIG. 38, the side front end 3594 is an angled surface with a first front end 3850 and a second front end 3860 displaced a distance 3830 longitudinally rearward from the first front end 3850 toward the rear bumper end 3508. The side rear end 3596 is an angled surface with a first back end 3870 and a second back end 3880 displaced a distance 3840 longitudinally rearward from the first back end 3870 toward the rear bumper end 3508. Additionally, the side rear end 3596, which extends out to the second back end 3880, is wider than the side front end 3594, which extends out to the second front end 3860. As shown in FIGS. 35 and 36, a recessed portion 3582 is disposed on the side front end 3594 of the second side portion 3580. The recessed portion 3582 includes a first light aperture 3584 and a second light aperture 3586 configured to receive a first light and a second light, respectively. In some embodiments, the first light aperture 3584 extends inward toward the rear bumper end 3508.

The top side of the second side portion 3580 includes an angled side portion 3598. The angled side portion 3598 includes a top angled surface 3614, a bottom angled surface 3814, and a side recessed portion 3644 disposed on a surface that extends from the outermost edge of the top angled surface 3614 and the bottom angled surface 3814. The side recessed portion 3644 includes a third light aperture 3568 configured to receive a third light. The top angled surface 3614 extends from the top portion of the second front end 3860 toward the top portion of the second back end 3880. Similarly, a bottom side of the second side portion 3580 includes a bottom angled surface 3814 that extends from the bottom portion of the second front end 3860 toward the bottom portion of the second back end 3880. The top angled surface 3614 includes a notch 3604 or angled surface near the side rear end 3596. In some embodiments, the notch 3604 extends from the top angled surface 3614 upward to align with the first wheel covering 3556 such that the two portions are substantially flush. As shown in FIG. 37, the top angled surface 3614 is angled at an angle 3710 with respect to a longitudinal axis. The angle 3710 may be in the range of 20-degrees to 40-degrees.

As shown in FIG. 38, the second side portion 3580 includes a first coupling surface 3804 that extends from an internal surface of the side front end 3594 to an internal surface of the top angled surface 3614. As shown in FIG. 39, the second side portion 3580 is configured to couple with a second brace 3704 using a plurality of second brace coupling members 3714 or fasteners. The second brace 3704 is coupled to a portion of the frame rail 40 with the plurality of second brace coupling members 3714. The second brace 3704 provides additional support to the front bumper 158 through the connection with the side panels of the frame rail 40.

Figure 43:
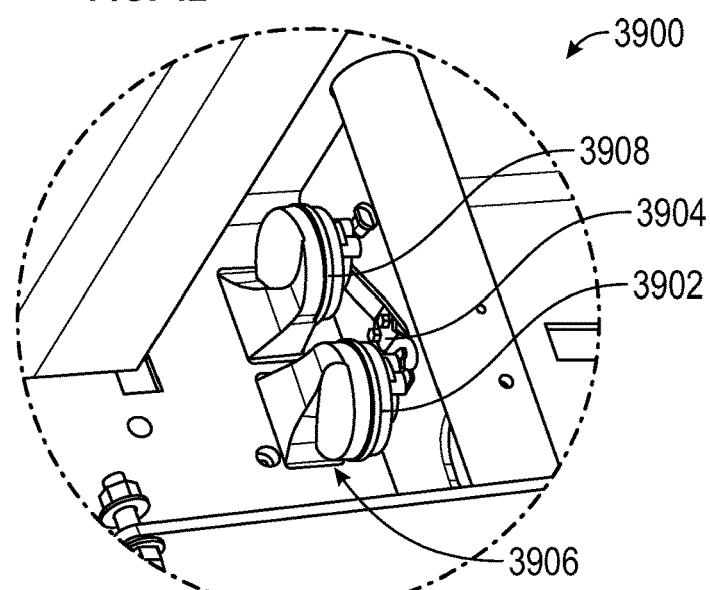
FIG. 43 is a detailed view of the noise emitting system of FIG. 42, according to an exemplary embodiment.

Referring to FIG. 42, a rear perspective view of a portion of the concrete mixer truck 10 is shown. In some embodiments, a noise emitting system 3902 (e.g., a horn, a siren, etc.) is coupled to an internal surface of the base 702 that is adjacent to the central recessed portion 3542. A portion 3900 of the base 702 with the noise emitting system 3902 is shown in FIG. 43. The noise emitting system 3902 includes a coupling member 3904, a noise generating element 3908, and a noise amplifying device 3906 (e.g., a horn or bell). The coupling member 3904 couples the noise emitting system 3902 to the front cross-member 700. The noise amplifying device 3906 is adjacent to the base 702 and central recessed portion 3542 and configured to amplify the noise generated from the noise generating element 3908. The noise emitting system 3902 may be a horn controlled by an operator in the cab 18.

FIGS. 44 and 45 show a pair of environmental view of the front bumper 158 installed on a concrete mixer truck 10. The front bumper 158 may be substantially similar to the front bumper 158 of FIGS. 35-43 except as otherwise specified. The front bumper 158 of FIGS. 44 and 45 does not include a lift member slot 3526, and the front cross-member of FIGS. 44 and 45 does not include the receiver 760 of the front cross-member 700. As shown in FIGS. 44 and 45, the first light aperture 3564, second light aperture 3566, and third light aperture 3568 have a first light 3934, a second light 3936, and a third light 3938, respectively, disposed within them. Similarly, the first light aperture 3584, second light aperture 3586, and third light aperture 3588, have a first light 3934, a second light 3936, and a third light 3938, respectively, disposed within them. In some embodiments, the first light 3934 and second light 3936 are located to the left of the cab 18 (e.g., as viewed by a drive) on the first side portion 3560 and the first light 3934 and second light 3936 are located to the right of the cab 18 on the second side portion 3580. The third lights 3938 are positioned to provide lighting toward the front sides of the concrete mixer truck 10. In alternative embodiments, the positions of the headlights may be different. Similar to the front bumper 158, the front bumper 158 can be removed by unfastening eight bolt and threaded member connections and one connector piece.

Hood

As a general overview, the hood 86 of the engine module 110 provides improved airflow through the engine module and rear accessibility of components disposed within the hood 86. The hood is configured to direct airflow (i) into a cooling system and (ii) into an air intake and air cleaner of the engine 74. The front end of the hood 86 is configured to capture air flowing along the top and sides of the mixing drum 14. In some embodiments, the hood 86 is configured to optimize airflow into the cooling system at driving velocities (e.g., 50-70 miles per hour). The improved airflow through the cooling system facilitates reducing fan speed and improving cooling efficiency. Beneficially, the hood 86 provides improvements over conventional hood designs by providing more air to the cooling system. The front end of the hood 86 may be tailored to pull (e.g., capture) air from above, thereby reducing the likelihood of the hood 86 capturing dirt, dust, and other undesired particles and introducing them to the cooling system. An airflow inlet cavity at the front end of the hood 86 includes one or more features with angled and overlapping surfaces to reduce rain intrusion into the interior of the hood 86. Beneficially, the design of the airflow inlet cavity at the front end minimizes the introduction of water into the air intake and air cleaner to reduce restriction within the air cleaner.

The rear end of the hood 86 includes a hatch having hatch door and a conical-shaped internal housing extending from an interior of the hatch door. The hatch door is movable between an open and closed position. The hatch door may be movable via a gas strut and provides ease of access for the operator to various components disposed within the hood 86 including, for example, a battery box, a DEF tank, DEF fill apparatus, a cooling system, fan, a hydraulic motor, various electronic components, and/or still other components. The conical-shaped internal housing is configured to direct and diffuse hot air flowing out of the hood from the fan rearward and/or slightly upward to not disturb dust on the ground outside of the concrete mixer truck 10, to reduce recirculation, and to improve efficiency of the airflow through the hood 86. A grill disposed on the hatch door is configured to provide low airflow restriction.

Figure 46:
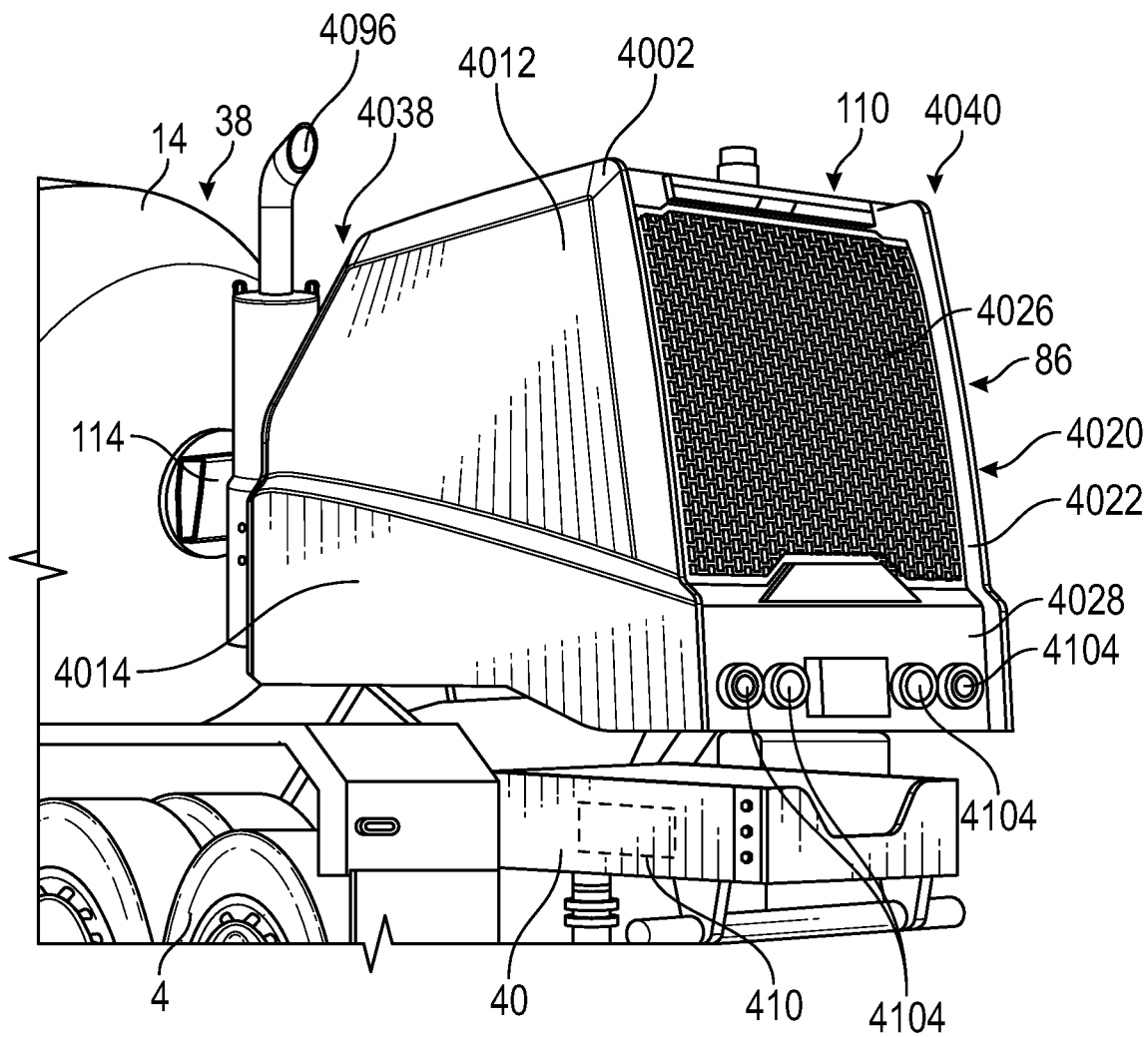
FIG. 46 is perspective view of an engine module of the concrete mixer truck of FIGS. 1-3 having a hood, according to an exemplary embodiment.
Figure 47:
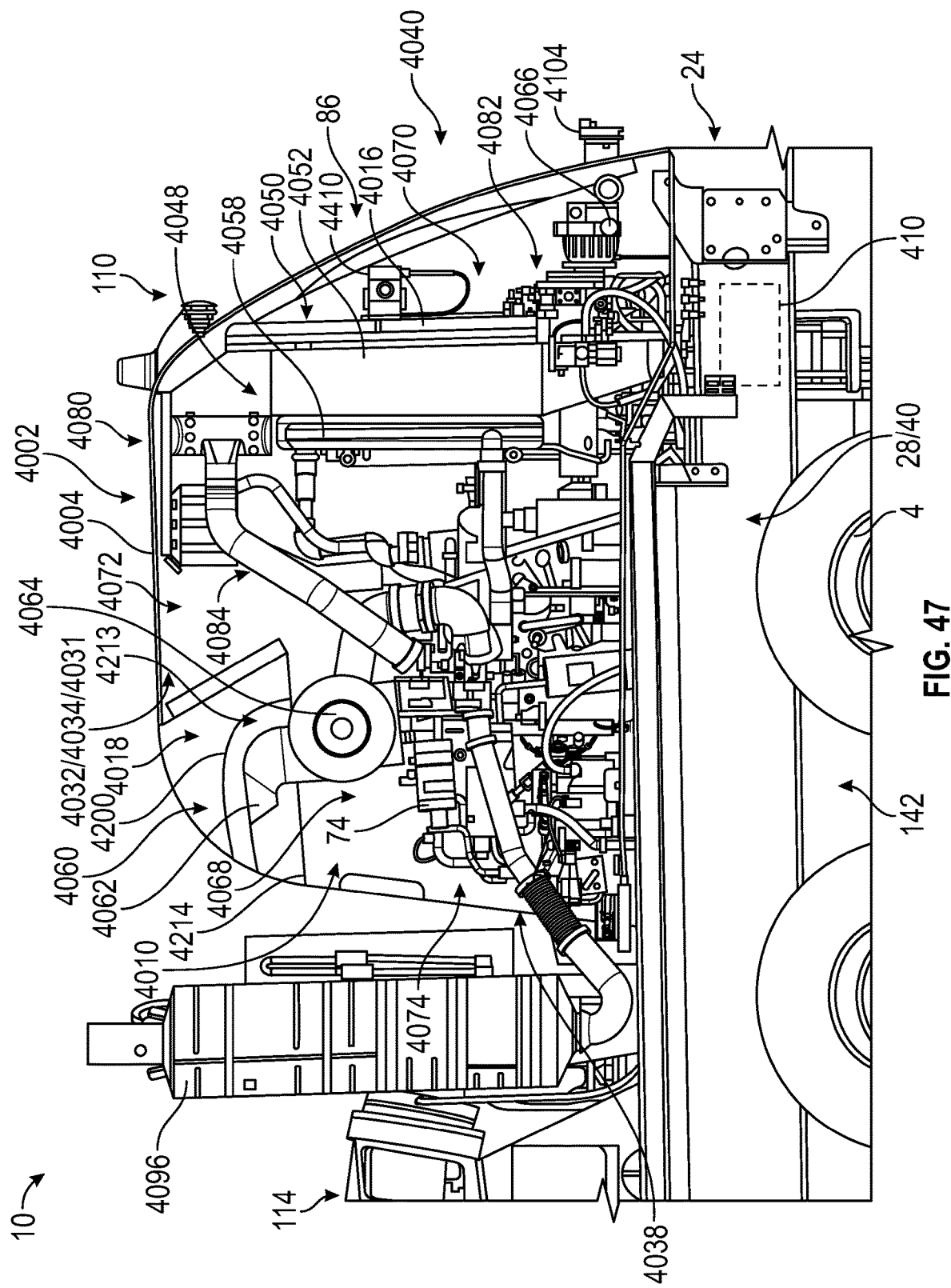
FIG. 47 is a side cross-sectional view of the engine module of FIG. 46, according to an example embodiment.
Figure 48:
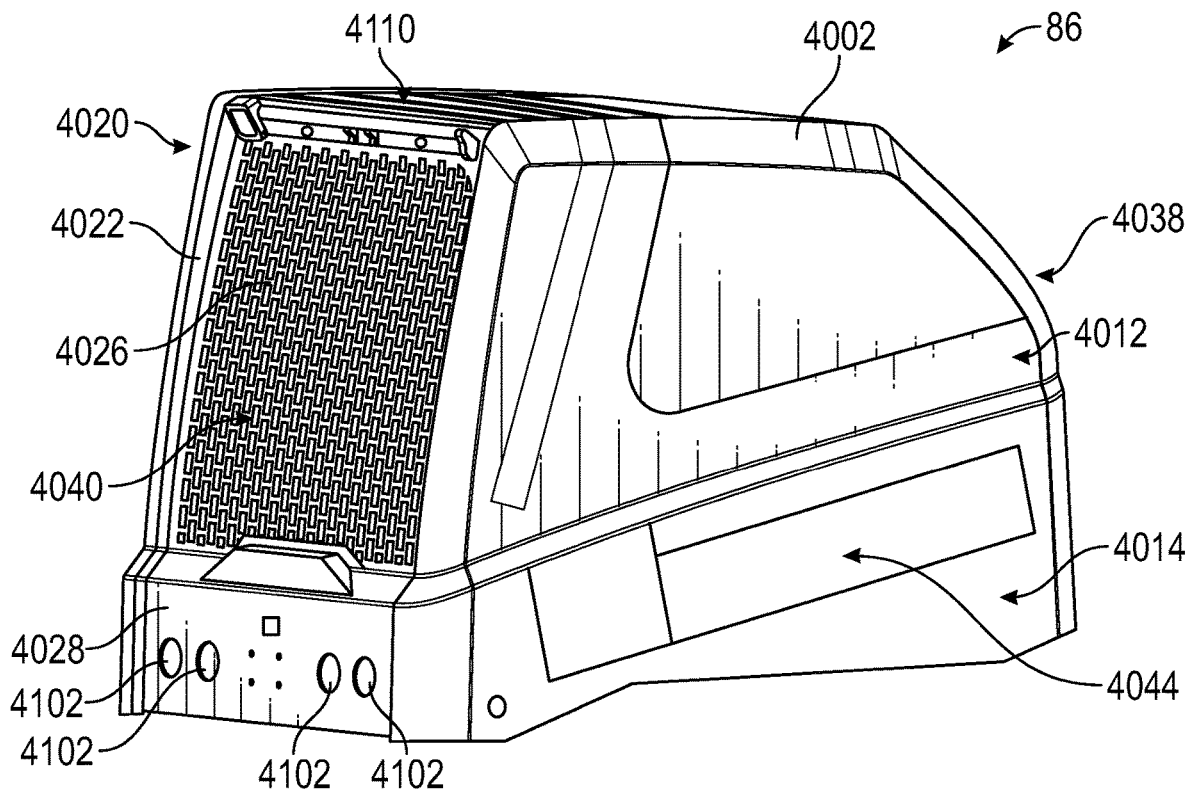
FIGS. 48-50 are various views of the hood of FIG. 46, according to an exemplary embodiment.
Figure 50:
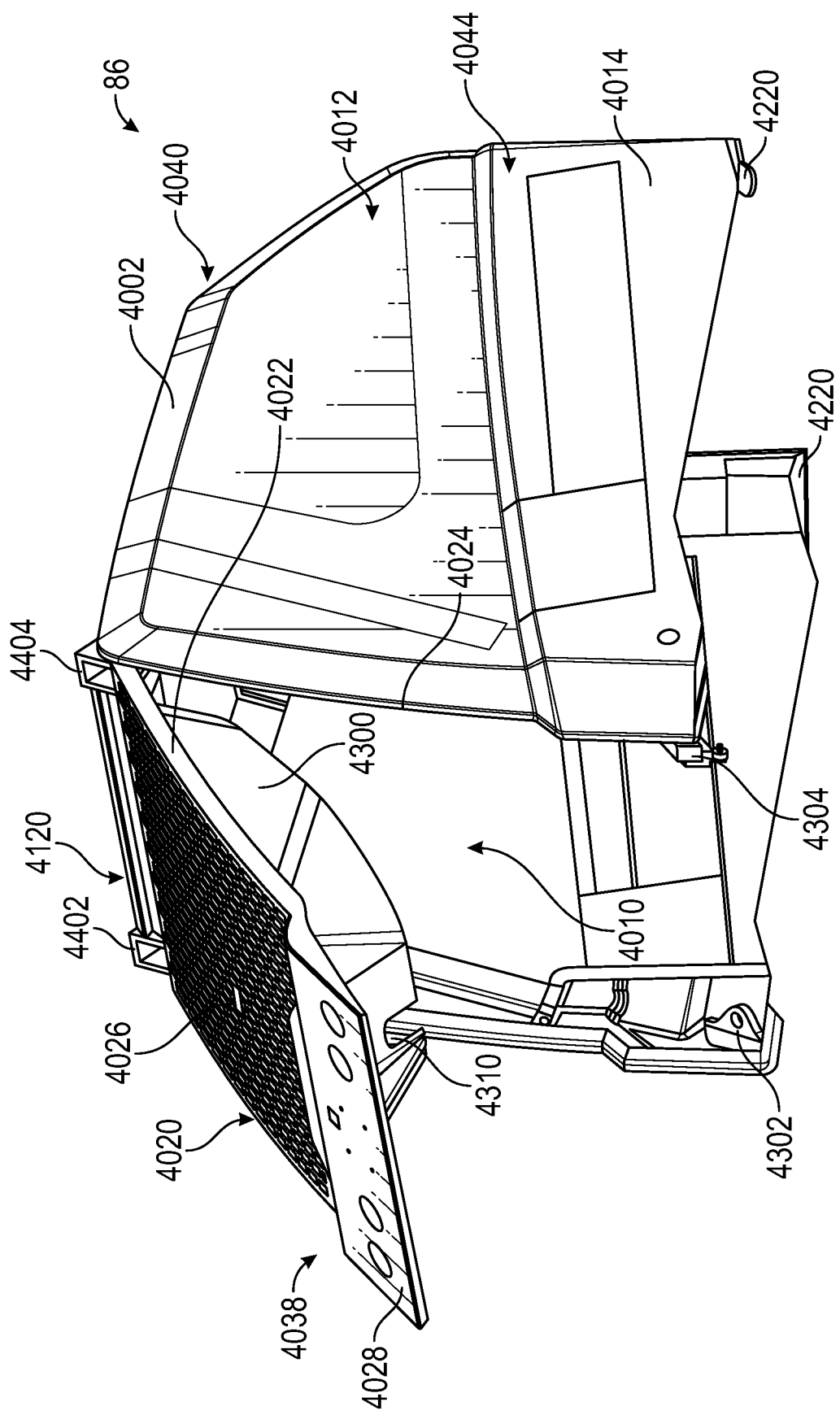
Figure 51:
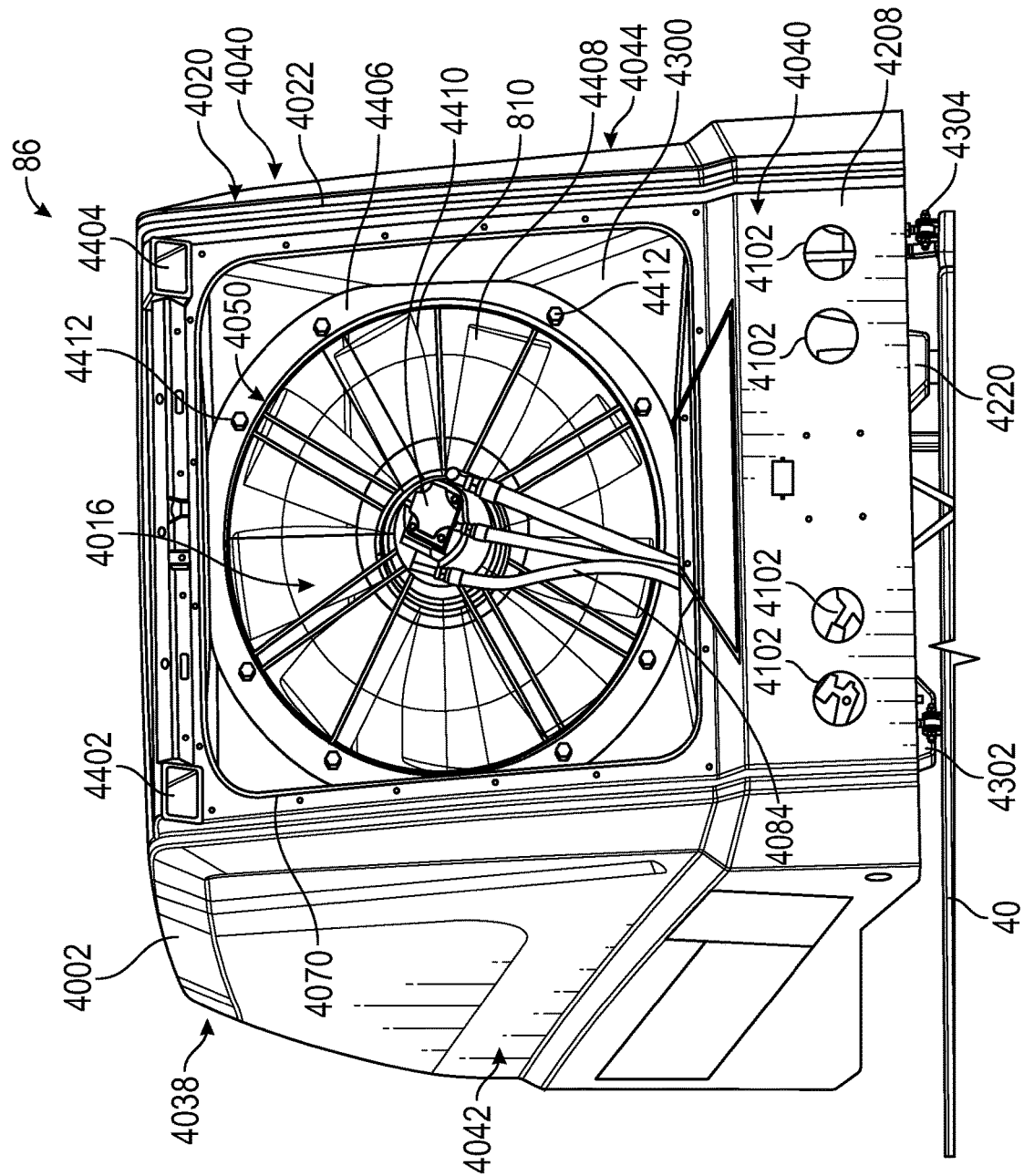
FIGS. 51 and 52 are various view of a cooling system disposed within the hood of the engine module of FIG. 46, according to an exemplary embodiment.
Figure 52:
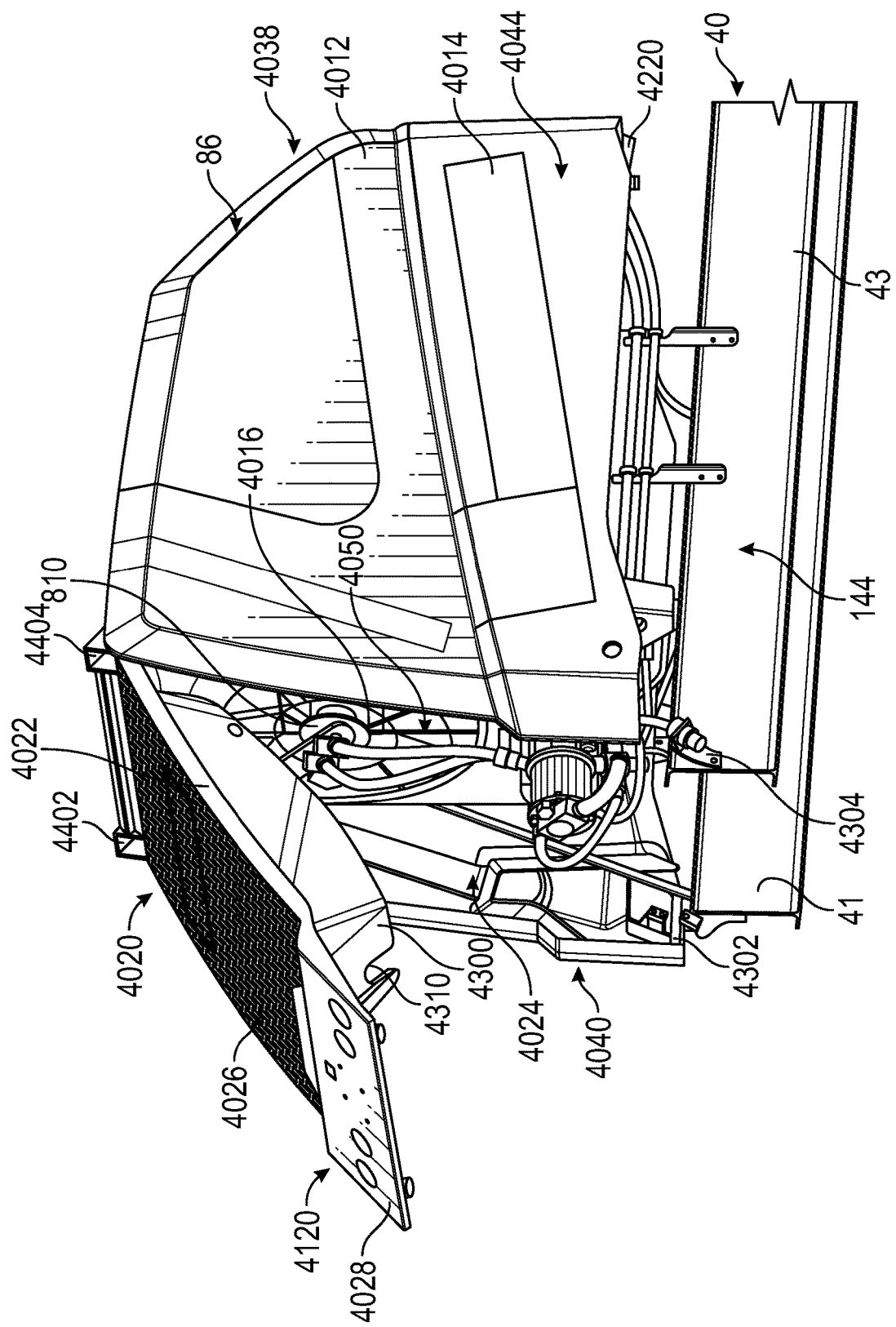

Referring to FIGS. 46-52, the hood 86 and the engine module 110 are shown, according to an exemplary embodiment. As shown in FIGS. 46, 47, and 52, the hood 86 of the engine module 110 is coupled to the frame rails 40 and/or other portions of the chassis 12. As shown in FIGS. 49-52, the hood 86 is configured to be coupled to the frame rails 40 by (i) first coupling members 4220 positioned along the bottom of the first hood sidewall 4042 and the second hood sidewall 4044 proximate the front hood end 4038 thereof (ii) second coupling members 4302 positioned along the bottom of the first hood sidewall 4042 and the second hood sidewall 4044 proximate the rear hood end 4040 thereof. The hood 86 may be configured to engage a cross member disposed proximate the rear end 24 of the chassis 12.

As shown in FIGS. 46-52, the hood 86 includes an external housing 4002 having a front hood end 4038 positioned rearward of the second end 38 of the mixing drum 14, a rear hood end 4040 positioned proximate the rear end 24 of the chassis 12, a first hood sidewall 4042 adjacent the first lateral side 142, a second hood sidewall 4044 adjacent the second lateral side 144, and a top surface 4004 extending between the front hood end 4038, the rear hood end 4040, the first hood sidewall 4042, and the second hood sidewall 4044. As shown in FIGS. 46 and 48-52, the external housing 4002 includes an upper portion 4012 and a lower portion 4014. As shown in FIG. 47, the external housing 4002 defines an internal cavity 4010 that receives various components of the engine module 110 including the engine 74, a cooling system 4080, a plurality of electronic components 4082, and/or various other components. The hood 86 may, thereby, cover and protect the various components of the engine module 110. The internal cavity 4010 includes various chambers such as a lower chamber 4074, an upper chamber 4072, and a rear chamber 4070. The upper chamber 4072 is disposed above the engine and the cooling system 4080 within the upper portion 4012 of the external housing 4002. The rear chamber 4070 is disposed downstream of the fan assembly 4050. The lower chamber 4074 is disposed between the front hood end 4038 and the cooling system 4080 within the lower portion 4014 of the external housing 4002.

According to an exemplary embodiment, the cooling system 4080 is configured to thermally regulate (e.g., cool, etc.) the engine 74. In some embodiments, the cooling system 4080 may absorb thermal energy from the engine 74 and transport the thermal energy to another location where it can be expelled to the surrounding environment. As shown in FIG. 47, the cooling system 4080 includes a radiator assembly 4048 and a fan assembly 4050. The radiator assembly 4048 includes a radiator 4058 and a plurality of conduits 4084 fluidly coupling the radiator 4058 to the engine 74.

The radiator 4058 (e.g., a heat exchanger) is configured to receive incoming air to reduce the temperature of a fluid (e.g., coolant, etc.) within the radiator assembly 4048 to facilitate cooling the engine 74. The heated air then disperses (e.g., through forced or natural convection, etc.), transferring the thermal energy to the surrounding environment. The radiator 4058 is thermally conductive and has a large surface area (e.g., formed through a number of fins, etc.). In some embodiments, the radiator 4058 is liquid-cooled, rather than air-cooled. The plurality of conduits 4084 (e.g., fluid conduits) extend from the engine 74 to the radiator 4058 and are configured to deliver fluid cooled by the radiator 4058 to the engine 74 to thermally regulate the engine 74. In some embodiments, the plurality of conduits 4084 are configured to deliver coolants from one or more tanks to the engine 74. For example, a coolant circuit includes a thermal energy interface (e.g., water jacket) and is configured to transfer thermal energy from the engine 74 into the coolant through the plurality of conduits 4084.

As shown in FIG. 47, the fan assembly 4050 is positioned rearward of the radiator 4058. In other embodiments, the fan assembly 4050 is positioned forward of the radiator 4058. As shown in FIGS. 47, 51, and 52, the fan assembly 4050 includes a fan frame 4052, a fan 4016 having a plurality of fan blades 4408, a fan motor 4410, and a plurality of conduits 4414. The fan frame 4052 supports the fan 4016 and positions the fan 4016 proximate the radiator 4058. The fan motor 4410 is positioned to drive (i.e., rotate) the fan blades 4408 to draw air through the radiator 4058 to cool the coolant flowing therethrough. According to an exemplary embodiment, the fan motor 4410 is a hydraulic motor coupled to the hydraulic pump 4066 by the plurality of conduits 4414. Accordingly, the hydraulic motor is driven by the hydraulic pump 4066. In one embodiment, the hydraulic pump 4066 is driven by the engine 74 (e.g., via a power-take-off, etc.). Alternatively, the hydraulic pump 4066 may be indirectly coupled to the engine 74 through one or more power transmission devices (e.g., a transmission, a belt assembly, a geared connection, etc.). In other embodiments, the fan motor 4410 is an electrically driven motor.

Figure 49:
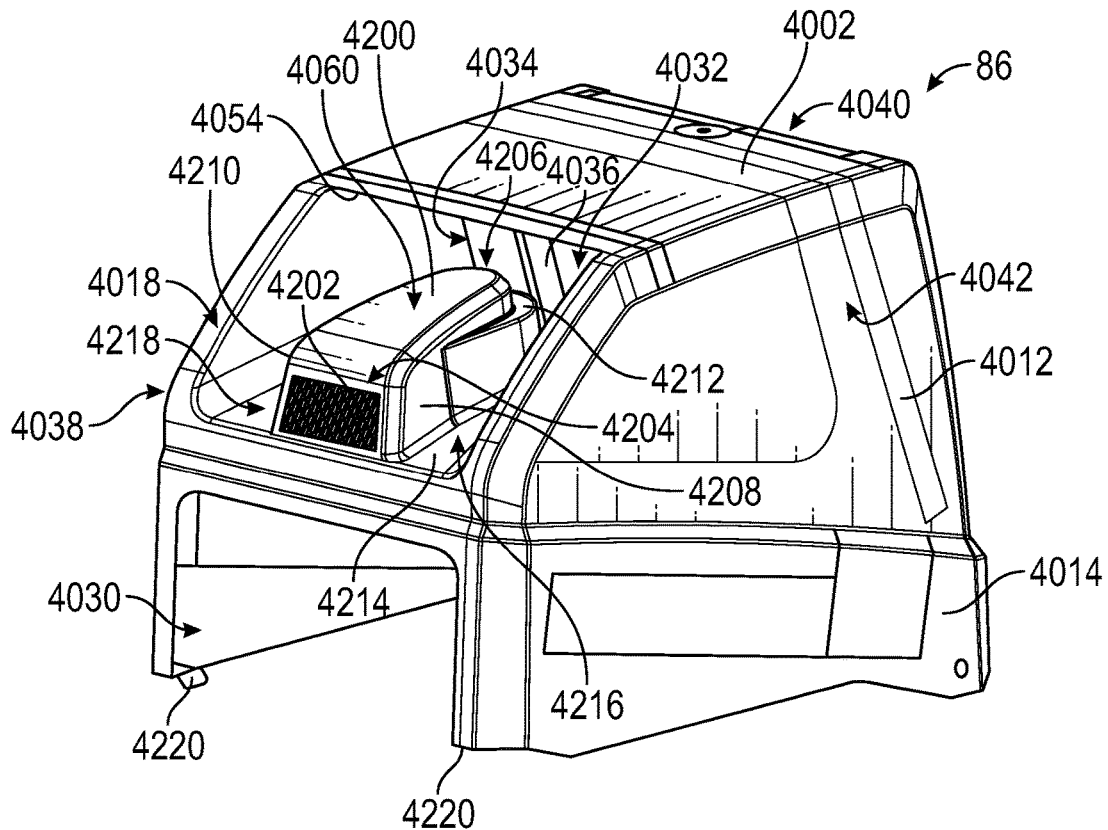

As shown in FIGS. 47 and 49, the front hood end 4038 of (i) the lower portion 4014 of the external housing 4002 defines an opening 4030 connected to the lower chamber 4074 and (ii) the upper portion 4012 of the external housing 4002 defines an inlet airflow cavity 4018 connected to the upper chamber 4072. As shown in FIG. 47, piping of an exhaust system 4096 and/or other components (e.g., fuel lines extending from the container 126, etc.) extend through the opening 4030, into the lower chamber 4074, and connects to the engine 74. Accordingly, combustion gases (i.e., exhaust) from the engine 74 can flow along the piping of the exhaust system 4096 and be expelled into the surrounding environment outside of the hood 86.

As shown in FIGS. 47 and 49, the inlet airflow cavity 4018 has a bottom surface 4214 and an air inlet 4031 positioned between the top surface 4004 of the external housing 4002 and the bottom surface 4214 of the inlet airflow cavity 4018. The air inlet 4031 connects the inlet airflow cavity 4018 to the upper chamber 4072 of the internal cavity 4010. According to the exemplary embodiment shown in FIG. 47, the bottom surface 4214 of the inlet airflow cavity 4018 is sloped such that an end of the bottom surface 4214 positioned proximate the front hood end 4038 of the external housing 4002 is lower than an opposing end of the bottom surface 4214 positioned proximate the air inlet 4031. In other embodiments, the bottom surface 4214 is substantially flat. As shown in FIG. 49, the top surface 4004 of the external housing 4002 includes an extended edge 4054 that at least partially overhangs the inlet airflow cavity 4018, extending forward past the air inlet 4031. As shown in FIG. 49, the hood 86 includes a dividing fin 4036 that (i) extends between the bottom surface 4214 of the inlet airflow cavity 4018 and the top surface 4004 of the external housing 4002 and (ii) separates the air inlet 4031 into a first air inlet 4032 and a second air inlet 4034.

As shown in FIGS. 47 and 49, the hood 86 includes divider/intake 4060. The divider/intake 4060 includes an intake housing 4200 extending upward from the bottom surface 4214 of the inlet airflow cavity 4018. As shown in FIG. 49, the intake housing 4200 separates the inlet airflow cavity 4018 into a first airflow channel 4216 aligned with the first air inlet 4032 and a second airflow channel 4218 aligned with the second air inlet 4034. As shown in FIG. 49, the intake housing 4200 has a first end 4204 positioned proximate the front hood end 4038 of the external housing 4002, an opposing second end 4206 positioned proximate the air inlet 4031, and sidewalls 4208, 4210 extending from the first end 4204 and the opposing second end 4206. As shown in FIGS. 47 and 49, the intake housing 4200 defines an air intake chamber 4213 and a third air inlet 4202 positioned along the first end 4204. The third air inlet 4202 connects to the air intake chamber 4213. In some embodiments, the first air inlet 4032, the second air inlet 4034, and/or the third air inlet 4202 includes a screen and/or filter disposed thereon. The divider/intake 4060 includes a curved protrusion 4212 extending from the sidewalls 4208, 4210 of the intake housing 4200 and around the opposing second end 4206 of the intake housing 4200. According to an exemplary embodiment, the curved protrusion 4212 is configured to direct airflow to the first air inlet 4032 and the second air inlet 4034.

As shown in FIG. 47, the engine 74 includes an air intake assembly 4062 extending from the engine 74, through the bottom surface 4214 of the inlet airflow cavity 4018, and into the air intake chamber 4213 of the intake housing 4200. The air intake assembly 4062 includes an air filter 4064 disposed between an inlet thereof and the engine 74. The air filter 4064 is configured to filter air prior to entering the engine 74. According to an exemplary embodiment, the inlet airflow cavity 4018 is configured to direct an airflow (i) along the first airflow channel 4216 and through the first air inlet 4032 into the upper chamber 4072 of the internal cavity 4010 and along the second airflow channel 4218 and through the second air inlet 4034 into the upper chamber 4072 of the internal cavity 4010 to interact with the cooling system 4080 (bypassing over the engine 74) and (ii) through the third air inlet 4202 and into the air intake chamber 4213 of the intake housing 4200 to flow into the engine 74 through the air intake assembly 4062.

As shown in FIGS. 50 and 52, the rear hood end 4040 of the external housing 4002 defines a hatch opening 4024. As shown in FIGS. 46, 48, and 50-52, the hood 86 includes a hatch 4020 including a hatch door 4022 (i) coupled to the rear hood end 4040 of the external housing 4002 about a first hatch coupling member 4402 near the first lateral side 142 and a second hatch coupling member 4404 near the second lateral side 144 and (ii) selectively pivotable between an open position 4120 where the rear chamber 4070 is exposed and a closed position 4110 where the hatch door 4022 encloses the hatch opening 4024. In the open position, various components of the engine module 110 (e.g., the cooling system 4080, the radiator assembly 4048, the fan assembly 4050, the DEF tank 410, the plurality of electronic components 4082, etc.) may be easily accessible for inspection and maintenance. In some embodiments, the first hatch coupling member 4402 and the second hatch coupling member 4404 are configured to assist in moving the hatch door 4022 from the closed position 4110 to the open position 4120. In some embodiments, the first hatch coupling member 4402 and the second hatch coupling member 4404 include gas struts that utilize gas pressure internal to the strut to provide a push or pull force depending on configuration and contain a dampening circuit typically to control the speed of motion through one or both directions of travel. In some embodiments, the first hatch coupling member 4402 and the second hatch coupling member 4404 include springs, pistons, shocks, or other compression and dampening members.

As shown in FIGS. 46, 48, and 50-52, the hatch door 4022 includes a grille 4026 that covers an air outlet defined by the hatch door 4022 and a bottom hatch portion 4028. The air outlet is positioned to permit air to flow out the rear hood end 4040 of the external housing 4002 through the hatch door 4022 and the grille 4026. The grille 4026 extends from the bottom hatch portion 4028 axially toward the top of the hatch door 4022. The grille 4026 is positioned to prevent objects from entering the rear chamber 4070 through the air outlet defined by the hatch door 4022. The bottom hatch portion 4028 defines a plurality of light apertures 4102 configured to receive a plurality of lights 4104. The light apertures 4102 may be positioned near an electrical and control system to provide power for lights and to control the brightness, illumination, and/or flickering of the plurality of lights 4104.

As shown in FIGS. 50-52, the hatch 4020 includes a conical-shaped or tapered internal housing 4300 that protrudes or extends from an interior surface of the hatch door 4022 into the rear chamber 4070. As shown in FIG. 52, the internal housing 4300 defines a slot 4310 positioned to accommodate the plurality of conduits 4414 extending between the hydraulic pump 4066 and the fan motor 4410.

As shown in FIG. 51, the internal housing 4300 includes a fan ring 4406 coupled to an interior surface thereof by a plurality of coupling members 4412 (e.g., bolts, etc.). The fan ring 4406 defines an aperture that interfaces with the fan 4016 when the hatch door 4022 is in the closed position 4110 to provide a snug, interface fit. In other embodiments, the fan ring 4406 is coupled directly to the fan assembly 4050.

According to an exemplary embodiment, the shape of the internal housing 4300 is configured to direct/diffuse hot air out of the hood 86 from the fan 4016 rearward and/or or slightly upward to not disturb dust on the ground outside of the concrete mixer truck 10. The shape of the internal housing 4300 may reduce recirculation and improve efficiency of the airflow through the hood 86. Further, the shape/configuration of the internal housing 4300 may facilitate operating the fan 4016 at a reduced fan speed relative to conventional systems, while still properly cooling the engine module 110. The grille 4026 is configured to provide low restriction around the internal housing 4300.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the concrete mixer truck 10 and the components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A concrete mixer vehicle comprising:
   a chassis having a front end and a rear end;
   a cab coupled to the front end of the chassis;
   a mixer drum assembly coupled to the chassis and positioned rearward of the cab; and
   an engine module coupled to the chassis and positioned rearward of the mixer drum assembly proximate the rear end of the chassis, the engine module including:
      an engine;
      a cooling system positioned rearward of the engine, the cooling system including:
         a radiator fluidly coupled to the engine; and
         a fan assembly positioned rearward of the radiator, the fan assembly including a fan; and
      a hood including:
         an external housing having a first end positioned proximate the mixer drum assembly, an opposing second end positioned proximate the rear end of the chassis, and a top surface, the external housing defining an internal cavity within which the engine and the cooling system are disposed, the first end of the external housing defining an inlet airflow cavity having a bottom surface and an air inlet positioned between the top surface and the bottom surface, the air inlet connecting the inlet airflow cavity to the internal cavity, the opposing second end of the external housing defining an opening; and
         a door pivotally coupled to the opposing second end of the external housing and positioned to selectively enclose the opening.

2. The concrete mixer vehicle of claim 1, wherein the hood includes a divider extending upward from the bottom surface of the inlet airflow cavity, the divider separating the inlet airflow cavity into a first airflow channel and a second airflow channel.

3. The concrete mixer vehicle of claim 2, wherein the external housing includes a dividing fin (i) extending between the bottom surface and the top surface and (ii) separating the air inlet into a first air inlet aligned with the first airflow channel and a second air inlet aligned with the second airflow channel.

4. The concrete mixer vehicle of claim 3, wherein the divider defines an air intake chamber and a third air inlet positioned proximate the first end of the external housing, and wherein the engine includes an air intake extending from the engine, through the bottom surface of the inlet airflow cavity, and into the air intake chamber of the divider.

5. The concrete mixer vehicle of claim 4, wherein the divider includes a curved protrusion extending from sidewalls of the divider and around an end of the divider opposite the third air inlet.

6. The concrete mixer vehicle of claim 3, wherein the bottom surface of the inlet airflow cavity is sloped such that an end of the bottom surface positioned proximate the first end of the external housing is lower than an opposing end of the bottom surface positioned proximate the air inlet.

7. The concrete mixer vehicle of claim 3, wherein the top surface of the external housing at least partially overhangs the inlet airflow cavity, extending forward past the air inlet.

8. The concrete mixer vehicle of claim 1, wherein the door defines an air outlet positioned to permit air to flow out the opposing second end of the external housing.

9. The concrete mixer vehicle of claim 8, wherein the hood includes a conical-shaped housing extending from an interior side of the door, wherein the conical-shaped housing is positioned to selectively engage the fan assembly, and wherein the conical-shaped housing is configured to diffuse the air flowing out of the air outlet.

10. The concrete mixer vehicle of claim 1, wherein the door is pivotable between a closed position and an open position, and wherein the fan assembly is accessible when the door is in the open position.

11. The concrete mixer vehicle of claim 1, wherein the top surface of the external housing at least partially overhangs the inlet airflow cavity, extending forward past the air inlet, the bottom surface of the inlet airflow cavity sloped such that an end of the bottom surface positioned proximate the first end of the external housing is lower than an opposing end of the bottom surface positioned proximate the air inlet, wherein the door defines an air outlet positioned to permit air to flow out the opposing second end of the external housing, and wherein the hood includes:
   a dividing fin (i) extending between the bottom surface and the top surface and (ii) separating the air inlet into a first air inlet and a second air inlet;
   a divider extending upward from the bottom surface of the inlet airflow cavity, the divider separating the inlet airflow cavity into a first airflow channel and a second airflow channel, the divider defines an air intake chamber and a third air inlet positioned proximate the first end of the external housing, the divider includes a curved protrusion extending from sidewalls of the divider and around an end of the divider opposite the third air inlet; and
   a conical-shaped housing extending from an interior side of the door, the conical-shaped housing is configured to diffuse the air flowing out of the air outlet.

* * * * *